(12) United States Patent
Cho et al.

(10) Patent No.: US 12,492,235 B2
(45) Date of Patent: Dec. 9, 2025

(54) CYTOKINES AND USE THEREOF

(71) Applicant: THE CATHOLIC UNIVERSITY OF KOREA INDUSTRY—ACADEMIC COOPERATION FOUNDATION, Seoul (KR)

(72) Inventors: Mi-La Cho, Seoul (KR); Chul-Woo Yang, Seoul (KR); Sung-Hwan Park, Seoul (KR); Seon-Yeong Lee, Seoul (KR); Young-Mee Moon, Incheon (KR); Seung-Ki Kwok, Seoul (KR); Hyeon-Beom Seo, Seoul (KR); Jun-Geol Ryu, Seoul (KR); Eun-Kyung Kim, Seoul (KR)

(73) Assignee: THE CATHOLIC UNIVERSITY OF KOREA FOUNDATION INDUSTRY-ACADEMIC COOPERATION, Seoul (KR)

( * ) Notice: Subject to any disclaimer, the term of this patent is extended or adjusted under 35 U.S.C. 154(b) by 1135 days.

(21) Appl. No.: 17/416,829

(22) PCT Filed: Dec. 20, 2019

(86) PCT No.: PCT/KR2019/018214
§ 371 (c)(1),
(2) Date: Jun. 21, 2021

(87) PCT Pub. No.: WO2020/130711
PCT Pub. Date: Jun. 25, 2020

(65) Prior Publication Data
US 2022/0064246 A1    Mar. 3, 2022

(30) Foreign Application Priority Data
Dec. 21, 2018   (KR) .................. 10-2018-0167857

(51) Int. Cl.
| C07K 14/00 | (2006.01) |
| A61P 1/00 | (2006.01) |
| A61P 19/02 | (2006.01) |
| A61P 37/06 | (2006.01) |
| C07K 14/54 | (2006.01) |
| G01N 33/68 | (2006.01) |
| A61K 38/00 | (2006.01) |

(52) U.S. Cl.
CPC ............ *C07K 14/5434* (2013.01); *A61P 1/00* (2018.01); *A61P 19/02* (2018.01); *A61P 37/06* (2018.01); *C07K 14/54* (2013.01); *G01N 33/6869* (2013.01); *A61K 38/00* (2013.01); *C07K 2319/00* (2013.01); *C07K 2319/30* (2013.01); *G01N 2333/54* (2013.01); *G01N 2333/5434* (2013.01)

(58) Field of Classification Search
CPC ............... C07K 14/5434; C07K 14/54; C07K 2319/00; C07K 2319/30; A61P 37/06; A61P 19/02; A61P 1/00; G01N 33/6869; G01N 2333/54; G01N 2333/5434; A61K 38/00
See application file for complete search history.

(56) References Cited

U.S. PATENT DOCUMENTS

| 5,891,680 A * | 4/1999 | Lieschke ............ C07K 14/5434 |
| 2002/0193570 A1 | 12/2002 | Gillies et al. |

FOREIGN PATENT DOCUMENTS

| KR | 10-0827757 B1 | 5/2008 |
| KR | 10-1566002 B1 | 11/2015 |
| KR | 10-1791770 B1 | 10/2017 |
| KR | 10-2018-0004094 A | 1/2018 |
| KR | 10-2018-0108886 A | 10/2018 |
| KR | 10-1950035 B1 | 2/2019 |
| KR | 10-1963923 B1 | 3/2019 |
| KR | 10-2101819 B1 | 4/2020 |
| KR | 10-2259085 B1 | 6/2021 |
| KR | 10-2277469 B1 | 7/2021 |
| KR | 10-2469450 B1 | 11/2022 |
| WO | 97/20062 A1 | 6/1997 |
| WO | WO 2016/073704 A1 * | 5/2016 ........... C07K 14/705 |
| WO | 2017/106795 A1 | 6/2017 |

OTHER PUBLICATIONS

Hasegawa H, et al. Expanding diversity in molecular structures and functions of the IL-6/IL-12 heterodimeric cytokine family. Frontiers in immunology. Nov. 4, 2016;7:479. (Year: 2016).*
Notification of Reason for Refusal dated Nov. 17, 2021 from the Korean Patent Office in Korean Application No. 10-2018-0167857.
International Search Report for PCT/KR2019/018214, dated Apr. 14, 2020.

\* cited by examiner

*Primary Examiner* — Janet L Epps-Smith
*Assistant Examiner* — Estella M. Gustilo
(74) *Attorney, Agent, or Firm* — Sughrue Mion, PLLC

(57) ABSTRACT

The present invention relates to a novel complex that is formed by linking p40 subunit and EBI3 subunit via a linker and has excellent anti-inflammatory effects and immunomodulatory effects.

21 Claims, 46 Drawing Sheets
Specification includes a Sequence Listing.

[FIG. 1]
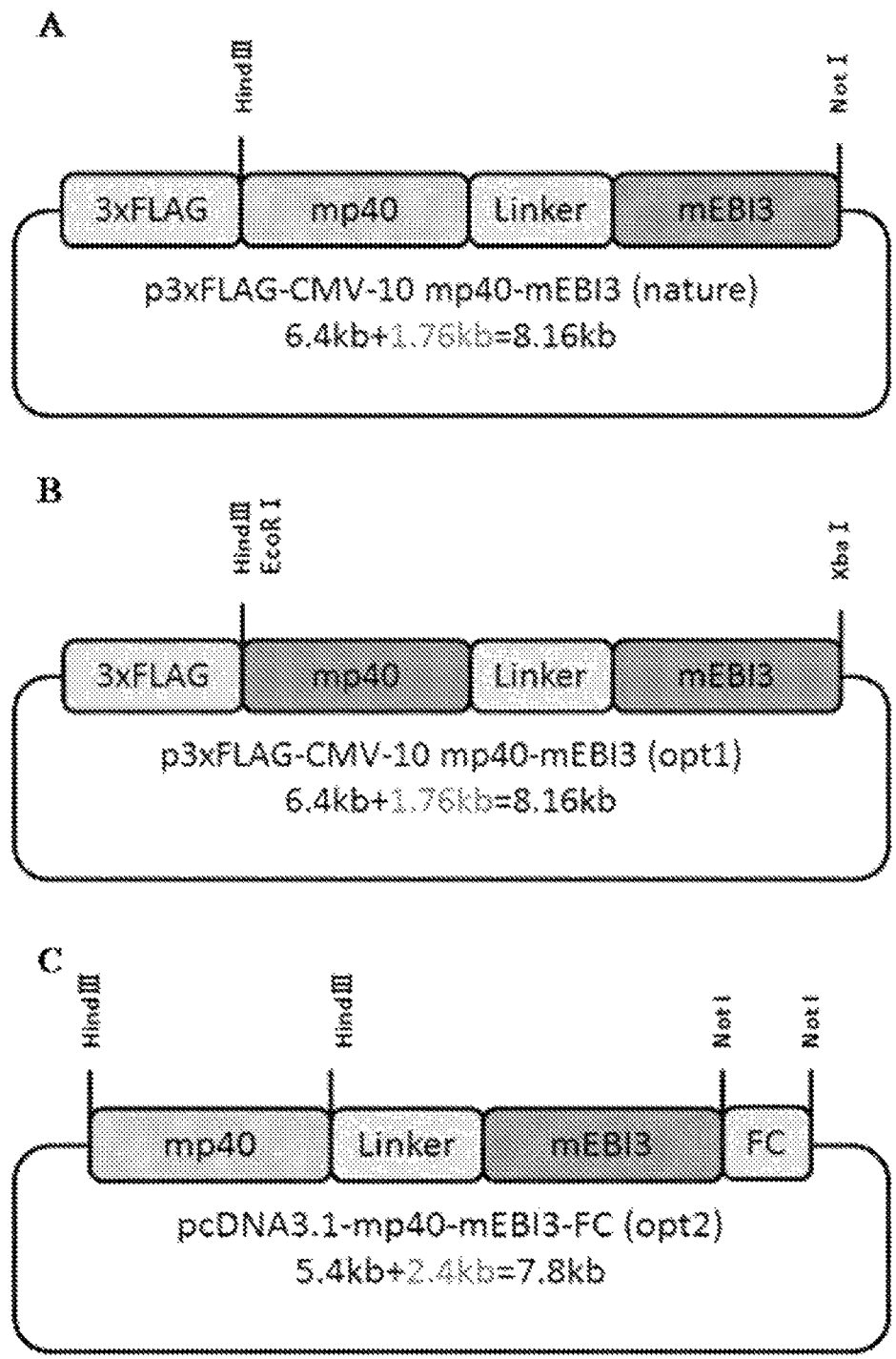

FIG. 2A

AAGCTT`GAATTC``atg`gtgtcctcagaagtaaccatctcctgtttgctgtgtctcactcatgtccatgtgggagctggagaaagacgtttatgttgtaga
ggtggactggactccgatcccgatcctgagccctggagaaactgaacctcacctgtgacacgtgaaccatgaccaagacatgagtagtcatagctc
tgaaagaccctgaccatcactgtcagatgttctagatgctgcagtacactgccagtgagactcgagcggttcacgtgtcatggcgtggtgcaagaagaa
aatgaattggtcactgaaattaaaaaaattcaaaaacaagactttctgggagtgtgaagcaccaatgtggtctctgtcgacgttcacgtgtcaagaaaca
tggacttgaagttcaacatcaagagacagtcagttcagtcagtcgagagagaccccctcgccattgaactgacctgcgtttggaagcacgagcagcagaataaaatgagaactac
agcaccagcttcttcatcaggatctgcaggaggatcatcaaaccagaccgcccaagaacttcagatgaagcctttgaagaactcacagtgagctgtcagcctgactctg
gagcactcccattcctacttctcccaagttctttgttgaatcagcgggaatgtctgcgtgcaagctcaggattcagcaggagtatgtgttcctcgcaggtccga
agaagacatatccgaagtcaaaggcggaatcagcttgttggtctgcggctctgtgcggcgggctcgggcgggctctctatgtccaagctgctcactgccgggatccca
tccGgcgggcggctctggcggcgggcgggctctgccggcgggctctatgtccaagctgctcactgccgggatcacgt
acagctctgtgcttcaagcagccagatgcaatgtcaccgtttctgtatccgtgccgtgactcctccaactccaccagatcacgt
ccttcattgccacttacaggtcggttgtgccaccaggtcaccagcagcaggcccggcatcccgtcttcctggacctttgtggctgagtcagccctccgaaggcgtgc
cggtgcctacacagtctaaatgtcactgacacgctcaggcgcctgcagtgctctgcagtgtctcaggtgtctgcagcatcttcctcaagtattcaagtaccgactccagctcctcctactccgctctcaagcgcctaccggccgaggagct
ctcacttcgcaggtgggaccattgaagcacgactttcaccctgggaactgaaaccccagtgcaccccatagaagcagccatgcacgtcatccacaccccataaagcctgaCTCGAG`GCGGCCGC`
aaccaagtgactgagcctccctgggcaagtagaaagtgcaccaagtagaaaagtgaattgaagcaagattaggga ☐ = Cloning MCS site
| | = Linker
▨ = Start and Stop codon

FIG. 2B start mp40-Linker- start EBI3

MCPQKLTISWFAIVLLVSPLMAMWELEKDVYVVEVDWTPDAPGETVNLTCDTPEEDDITWTSDQRHGVIGSGKTLTITVKEFLDAGQYT
CHKGGETLSHSHLLLHKKENGIWSTEILKNFKNKTFLKCEAPNYSGRFTCSWLVQRNMDLKFNIKSSSSPDSRAVTCGMASLSAEKVTL
DQRDYEKYSVSCQEDVTCPTAEETLPIELALEARQQNKYENYSTSFFIRDIIKPDPPKNLQMKPLKNSQVEVSWEYPDSWSTPHSYFSLKF
FVRIQRKKEKMKETEEGCNQKGAFLVEKTSTEVQCKGGNVCVQAQDRYNSSCSKWACVPCRVRSGGGGSGGGGSGGGGS
MSKILLFLSLALWASRSPGYTETALVALSQPRVQCHASRYPVAVDCSWTPLQAPNSTRSTSFIATYRLGVATQQQSQPCLQRSPQASRCTI
PDVHLFSTVPYMLNVTAVHPGASSSLLAFVAERIIKPDPPEGVRLRTAGQRLQVLWHPPASWPFPDIFSLKYRLRYRRRGASHFRQVGP
IEATTFTLRNSKPHAKYCIQVSAQDLTDYGKPSDWSLPGQVESAPHKP

FIG. 3A

AAGCTTGAATTCAGTGGATGTGCCCTTCAGAAACTCACTATCTCATGGTTCGTATCGTGCTGTCTCACCTCATGGTATGTGGG
AACTGGAAAAGGAGGTGTATGTGGTCGAGTCGACTGGAGTCGACTCGACTGGAACCGTGAACTGACTTGGACACCCAGA
GGAAGACGATATCACTTGGACCTCAGATCAGAGACACGGCGGTGATCGGATCGGCAAGACCTGGCAAGACCCTGCATATTACCGTCAAAGAGTTCCTCG
ACGTGGCCAGTACACAGTGCAGAGGGGGAGAAACTTGAGCCACTCCATCTGCCTGCATAAGAAAGAGAACGGAATCTGGAG
CACAGAAATTCTGAAGAACAGAGACCTTCAAGAACAAGAGACACCTAATTATAGCGGGAGGTTCACCTGTTCCTGGCTGG
TGCAAGAGAAACATGGACTCAAGATCAAGAGCTCCTAGTTCACCAGAGAGTGTGACCTGGGCATGCATCTCTG
AGTGCCGAGAAGGTGACACTGACCAGCGGATTACGAGGAGAAATATTCAGTGAGCTGCCAGAAGACGTGACATGTCCTACTGCCGAGG
AAACTCTGCCAATCGAGCTGCCCTGGAAGTCGAGTCTTTGTGCAGATGAAGCCCTCAAAATCCAGAGGAGAGTACAGAACAAGCCAATCAG
AGCCAGATACCCCTATTTCTCTGAAGTCTTGGAGAAAAACCTGAAGGGGAATCAGTTCAGTGTCCGAATACCCGACAGTGGTCAAC
ACCTCACTCACTTGTGGGAGAACATCAGCCTTGTCGCATGCCATGCCTTGTGCAGTCACTGCTGGCCAAGCTGATCAGCTACTATA
AGGGAGCCTTTCTGTCTAAATGGCATGGCTCGTTCTCTCCGTGCCGATCGCGGAGGGTAGTGGCGGAGGGGGTTCAGGCGGAGG
ATAGTCTCTGTCCAAGCTCCATTCCTGGCACTGGCCAAGCTGAGACCGAGACAGCTCTGGTGGTGCCACTCTG
GGTAGCATGCAGCCTGGCGTCCAGTCGCCAAGCTTCTCGATATCCAGTGGCAGTGACTGTAGTGGACACTGAGCCCCAAACAGCACCAGGA
GCACCAGTCAGTTCATCGAACTACCGCCGTCACTGTCAGAGCAGCAGGCCGTCAATGACGGGAGCTTCAGTCACTCA
GGTACCATTCCGATGTGCTGAGGCGCATCATTAAGCCTGGCACTGTCCTGGACCCACCACCGGAAGGGTGCAGCCGAGATCAGGCTCAGGTCTCT
CTGCCTTTGTGGAGCTCAGCCTCTTGGCCCTTCCTGATATCTTTAGTCTGAAGTATAGACTCAGATATAGAACCGCCGGAGACGGGGCCTCTCACTCGACA
GGCATCCTCCAGCCCTGCTACCACCATCGAGGCGTACTACGTGTTCGCTAATACTGTAAATACTCACCCTGGAGGAAATCCAAGCTGAACAGCAATGTGTGCACAGGACCCTGAC
AGTGGGACCCATCGAGCTTGCCAGGACACAGTGGAAGTGTTGCCAGGACACAGTGGAAGTGCAGGGCCCTCCACTCCCTGGAGGACAGTGGGACTCCACTGCCCCCTCACTCCGACA
TGATTATGGGAAGCCATCGCCGATTGGAGTCGTGCCAGGACAGTGGAAAGCGCCCCTCACAAACCATAATCTAGA

FIG. 3B

MCPQKLTISWFAIVLLVSPLMAMWELEKDVYVVEVDWTPDAPGETVNLTCDTPEEDDITWTSDQRHGVIGSGKTLTIT
VKEFLDAGQYTCHKGGETLSHSHLLHKKENGIWSTEILKNFKNKTFLKCEAPNYSGRFTCSWLVQRNMDLKFNIKSSSS
SPDSRAVTCGMASLSAEKVTLDQRDYEKYSVSCQEDVTCPTAEETLPIELALEARQQNKYENYSTSFFIRDIIKPDPPKNL
QMKPLKNSQVEVSWEYPDSWSTPHSYFSLKFFVRIQRKKEKMKETEEGCNQKGAFLVEKTSTEVQCKGGNVCVQAQD
RYYNSSCSKWACVPCRVRSGGGGSGGGGSGGGGS
MSKLLFLSLALWASRSPGYTETALVALSQPRVQCHASRYPVAVDCSWTPLQAPNSTRSTSFIATYRLGVATQQOSQPCL
QRSPQASRCTIPDVHLFSTVPYMLNVTAVHPGGASSSLLAFVAERIIKPDPPEGVRLRTAGQRLQVLWHPPASWPFPDIF
SLKYRLRYRRRGASHFRQVGPIEATTFTLRNSKPHAKYCIQVSAQDLTDYGKPSDWSLPGQVESAPHKP start mp40-Linker- start EBI3

FIG. 4A

AAGCTTAGTGGATTGCCCCCAGAAGTGACCATCAGTGGTTGCCATGCGTGTGGTGAGCCCC
CTGATGGCCATGTGGGAGCTGGAGAAGGACGTGTACGTGGAGTGGACTGGACCCGATGCCCC
CGGGAGACCGTGAACCTGGACACCCCGAGGAGGAGGACATCACTGGAGCAGCAGACCAGA
GACAGGGGTGATCGGCAGGGGCAAGGGCTGACCATCACCGTGAAGGAGTTCCTGACGCCGGCCAG
TACACCTGCCACAGGGGCCCAGAGATCCTGAGCCACCTGTGCTGCACAAGGAGAACGG
CATCTGGAGCACCGAGATTCCTGCAGTGCTGAAGAACAAGACTTCCTGCAGAGCCCCAACTA
CAGGGCAGATTCACCTGCAGTGCTGGTGCAGAAGAAACATGACGAAGTCAACATCAAGTCTAG
CTCCAGCAGCGACACAGCAGAGCCGTGACCTGGGCCAGCTGAGCGCCGAGAAGGTGACCC
TGGACCAGAGAGACTACGAAGTACGAGAAGGCGTGAGCCTGAGCTGACCTGCCCACCGCCGA
GGAGACCCTGCCATCGAGCACACATCATCAGACATTCAGAACACCTGAAGCCTCAGAACA
GTTCTTCATCAGAGACTACCCGAGGTGCCCAGCAGCCAACAAGTGAGAGCTACTTCAGCTGAAG
GCCAGTTGGAGGTGAGCTGGGAGTACCCGACAGTGGAGCACCCACAGTGCCACGGGAGGGC
TCTTTGTGAGAATCAAGAAGAGGAAGAAGAAGGAGAGCAACCAGAGAGGGTGCAACGTGTGCAGGC
GCGCCTTCCTGGTGGAGAAGACCAGCACCGAGTGCAGCAAGTGGGCCTGCGTCGCTGCGCAGGC
CAGGACAGATACTACAACAAGTGGGCCTGCGTCGCCGAAGACCGTGCGTGCTGTGGGC
CTGAGCCAGCCAGTGCTGTGGTGGAGGCGGAAGTGGGCGGAGGAGGTTCTACAGAGACCGTGCGTGGAC
CCTGCAGGTCCAACAGCCAGCACCAGAGCTTCATCGTACTACAGACTGCTACCTGGGAGTGGTACCC
AGCAACAGCACCAGCCAAGCCGCTGCCAGAAGCCACCATCCCGCGTGCACATGTGCAC
CTGTTCAGCACCCTGCCCATACATGTGAACCGTGACCTGAACGGCGTGCACCGGAGGTGCCAGTCCAGCCTG
CTGGCCTTCAGGCGAGTGGCAGGTGTGCAGGAGATCATCAAGCACCTCACCCACAGTGACTCCAGCGAGA
ACAGAGACTGAGAGATACAGACAGGAGGAGCCCGCCAGCCACTCAGCGCCAGAGGACCGG
CAGGAGTGAGAGAAAACAGACCCCCACCCAAGCCAGCCCACCATCCCGCGACATCTTCAGCTGAAGTA
CAGCCCCTGAGAAACACAGCCCCACCGTGACCAAGAAGCAGCCCCATCCCAGCCAGTGTGAGCCTGAAGTA
TCACCCTGAGACAAGCCCACGCTGACCCGAAGCCTGAGGCCTGGAGGACGCCACAACCT
ACGGCAGACTGGAGAGCCTGGAGAGCCTGAGGTGAGAGCGCCCCTCACAAG

FIG. 4B

MCPQKLTISWFAIVLLVSPLMAMWELEKDVYVVEVDWTPDAPGETVNLTCDTPEEDDITWTSDQRHGVIG
SGKTLTITVKEFLDAGQYTCHKGGETLSHSHLLLHKKENGIWSTEILKNFKNKTFLKCEAPNYSGRFTCSWLVQ
RNMDLKFNIKSSSSPDSRAVTCGMASLSAEKVTLDQRDYEKYSVSCQEDVTCPTAEETLPIELALEARQQNK
YENYSTSFFIRDIIKPDPPKNLQMKPLKNSQVEVSWEYPDSWSTPHSYFSLKFFVRIQRKKEKMKETEEGCNQ
KGAFLVEKTSTEVQCKGGNVCVQAQDRYYNSSCSKWACVPCRVR[LL]GGGSGGGGSGGGGSTETALVAL
SQPRVQCHASRYPVAVDCSWTPLQAPNSTRSTSFIATYRLGVATQQQSQPCLQRSPQASRCTIPDVHLFSTV
PYMLNVTAVHPGGASSLLAFVAERIIKPDPPEGVRLRTAGQRLQVLWHPPASWPFPDIFSLKYRLRYRRRGA
SHFRQVGPIEATTFTLRNSKPHAKYCIQVSAQDLTDYGKPSDWSLPGQVESAPHK

FIG. 5A agctt gtggaatg gtcctagaagtaaccattcctggtttgctgtggtgtctccactcatggccatgtgggagctggagaaagacgtttatgtgtagagggtg
actggactcccgatgcccctggagaaacagtgaacctcacctgtgacacgtgaacctgaagaaatgacatcaccttggacctcagacaggagtcatgggtcatagagtctcggaaag
acctgaccatcactgtcaagagagtttagatgtctggccagtacacctgcccaaaggaggcgagactctgagcactcatctgtctccaagaagaaaatggaattt
ggtcactgaaatttaaaaatttaaaaacaagactttcctgaagtgaagcaccaaattactccgacgttcacgtgtcatggtgtgtcaaagaaacatgactgaag
ttcaacatcaagacagtagcagttcccctgactccgggcagtgacatggaatgcgtctctgtcgagagaacacgcagcagaagtcacactggacaaaggactatgagaagtattca
gtgtcctgccaggaggatgtcacctgcccaactgccgaggagaccctgcgttgaaatgctgccattgaactgcgtgccagcagaactgcacagcacgcacagcttcttc
atcaggacatcatcatcaaacagaccgccgccaagaactgcaatgaagacctttgaagaactcacagtgaggtcagtggagaccctgactcctgagcactcccattcct
acttccccaagtctttgttcgaatccagtctgcgtgcaagtctctattacaattcctcagcaagaaagtgctagaaacaaggtgcgttcctgtagagaagacatctaccgaa
gtccaatgcaaaggcgggaatgtctgcaagtctgcgtcaagtctcagaagtcctgtgcaagaagcatgttccctgcaggtcagggtcgatcCaagctt cctgtatccgtg
Ggcggcggctctggcggcggcggctctggcggcggctctactgaaacagctctgtggctctaacacgtcttcattgccaatcagtgcatgtcttctggtatcctgcctaca
gcggactgctcctggactccttccagctcctccaactcacgcatccaagatccacgtccacgtgtcctcccagctgacgcatgacagatctcaccgacagcaggaccaccagcagcagcctccta
acggagccccagccctccccgatgcaaccatcccgacgtgcacctgttctccacggtgcactaaatgtcactgcagtccgggacagcagcctgggcgcgcagcagcagcctcccg
gctttgtggctgagcgaattcatcaagcggacctccggaaggcgtgcgctgcgcagccgggagccttccattgacgccacgactttcacctcaggaactcgaaacccatgc
gacatctcttcttcaagtacggactctcaagtgctagcagtgcagcagaacaccgagaagcacagctccgccaagtgcacaagccatccggcaacagtgcacacgttcctattattctg
caagtattgcatccagtgtcatcaggtgcacagagcctcctggcaaacaagtgactgaggacctcctggcagtgaaagtgcaccatatggaaagtgacccatagctg
ggacaagaaaattgtccagggattgtggttgttagcttgcatagatccaaaggcaggcttcatcttctcccaaagcccaaggatgctcaccattactctg
actccaaggtcacgtgtgttgtgagacacttccgttcagtcagtgtagacatcagcaaggatgaacttccatcagcgagttcagtgaacatccagtccaggactcagtgcacaaaacccggag
gagcagttcaacagcacttccgttcagtcagtgtagacacttccgttcagtcagtgagacatcagcaaggcaagttcagtgaacatccagttcagccacctgaggtcacaagcagggtcacaatgcaagatgctctctctgtttccttgcccccatc
gagaaaaccatctccaaaccatctccaaaggcagccccgagaaccacaggtgtacaccctgcccccatcccgggatgagctgaccaagaaccagaggatgagcagctgtacagtgctgcagctacagtctgatcagtgctgcagctggatgtgataac
agactcttcctgtcaccaggctctcaggtgtggagttcagtcagctcaaaggcagggccagctccagcacctgcagcatagtaagggctcagtcgacctgcacgtgcagctgcagcagttggtactctctggtttactcgcagcctcttacagc
aagctcaatgtctccagcgtgatgcatcgaggctcacccagaagagcctctccttgcacttccctcactctgg
aatgtcccagggcggccgc

FIG. 5B

```
AAGCTTAGTGGGATGTGCCCCAGAAGCTGACCATCAGCTGGTTCGCCAGAAGCCATGTGGTGAGCCCTGTGGTGAGCTGGGAGGAAGGACTGT
ACGTGGGCAGGTGGACTGGGATGCCCCGATGCCGTGAACTGGAACCGTGAAGCTGTGACACATCACTGGAGCACTGGACCAGCGACCAGA
GACACGGCGGTGATCGGCAGCGGCAGACCCTGACCACGGCAAGACCTTCCTGACAGCACCGGACCTGCCACAAGGGCGGCAGACCTGAGCG
ACAGCCACCTGCTGCAAGAAGAGAACGGCATCTGGAGACAAACATGGACCTGAAGTTCAACATCAAGTCCAGCAGCAGCGTCAGACCGTGACCTG
ACAGGGCAGATTCACCTGCAGCTGCCCAGCCTGAGCCTGCCAGGAGCGTGAGCCTGGACATGAGAGACAGCGTGACCTGCCACCGCCG
CGGCATGGCCAGCTGCCTGCCATCGAGCTGCCTGCCTGAGATGAAGCCCTGGAGGCCCCTGGAACCGTGACCTTCTCATCAAGCCGACCCGCCG
AGGAGACCCTGGAGAACCTGCAGATGAAGCTGAAGATCCAGAGAAGAGAAGAGATCAGAGAACAGCAGTGGAGGTGAGCTGGGAGTACTTCAGCTGAA
TCCCAAGACGGCGTGCAACGTGCGTGAAGATCAACTACAGCTGCAACAATGAAGGTGCAGGTGCCTGCCACGAGATGGGCAGTGCCAGGGCTA
GTCTTTGTGAGAATCCAGAAGAAGAGAAGAACAGCCAGGTGGAGGTGAGCTGCCAGATACTACAACCAGTGGGGCCCTGCAGGACCAGAGCCAGCACCGAGG
TGCAAGGGCAACGTGCAACCTGTCCTGTTGAGCCCAGCAGCAGGGAAGTGCCTGGTGCCTGGCCCTGCAGAGCGCAGCACCGGAACTGTGCTCCAC
CTGGAGGCGGAGGTTCTGGTGGAGGCGGAAGTGGGAGGCGGAGGAGGTTCT ACAGAGATACCAAGACTGCTGGTGCCCAGGTGCCAGGCTA

GCCAGCAACACAGAGCCAGCTGCAGTGACTGGAGCCGGCACCAGAGCCACCATCCCGAGAGATCATTGCAGGCGTCCTACTACACGTGCCCTCATGTGACTGCTGAACGT
CCCAGCCTGCCAGCCCCTGGAGCCTGCCAGCGCCCTGCTGCAGATCCTGTGGCCAGGCCCTGCCAGCTTCAGCAGGCGTGCCCGAGGCCGTGAGAAGACTGAGAACGCC
GACGCCGCGTGACGGTCCAGGTGCGAGGTGTCAGGTGCAGCTGCCACGCCGACTGAAGCTGAAGGCCGGACACTGAGACTGAGAAGAGAGCCAGCG
GGAACAGAGGTGTGGCCAGATTGGGGACCCAAAGCTTCACCCTGGAAGACCTTCAGCTTCACCCTGAGAAAGCCCAAAGGATGCCAGGAAGATCAGGTGCATCAGGGAAGATCGTCATCCAGAAGATCCAGGTACATGAGCCGGCCAGCCCTGCCCAGAAGCCCAGGCCGTGCC
ACTTCAGAGACTTTGAGCCGACCATGGGAAGCCAGTTGCCCGAGGTGGTGCATCCTGAGCCACAGCACAGGATTCCCCAGGGCCTGAGCCGGCCTGAGCCCTGCC
AAGCCTGCTGCATCAGAAGGAGACCAGCAAGCAGGACCCTGACCGTGTTCATCTTCCTGACCAAGCCCCTCCCTCAAGCCGGTGTCAGCTGACCTGCCTCGGGTGCCGTG
GTGGCGACCAAAGGAAGCAGCAGCGTGCAGGGCCCATCATCATGGGAGAAGATACCAAGATCGACTGCAGCAGCACCAAGGAATCGCCAACAGGCACAGCCTCGGTTC
TCAGCGTCATCAGAAGAACAGCAACGAGTCCAACCGCAGCATCGTGACTCATCTAGCCTGAGCCCGTGCCAGACCATGAATGCCAGGCGTGTGGAGAAACAGCTGGATTGGCCAGGCAAGCCCATCATGGAC
CCATCGAGAGGAACACCAGCAAGCAATCAGAGACCATCTTCCCGAGAAGCCCCAGCATGGCCAGGAAGAATGGCCAAGGAGATTGCCAAGGAGTTCAAGCAAGGCCATGAACCCGCCATCATGGAC
TGACCTGCATGATCAAGGACTTCTTCCCAGAGGACATCACTGTGGAGTGGCAGTGGAACGGCCAGCCTGCAGAGAACTACAAGAACACCCAGCCCATCATGGAC
ACCGACGGCAGCTACTTCGTGTACAGCAAGCTGAACGTGCAGAAGAGCAACTGGGAGGCAGGCAACACCTTCACCTGCAGCGTGCTGCACGAGGGCCTGCA
AACCACGCCACGAGAAGAGCCTGAGCCATCGCCCCGGGCAAGTGATCCAGGCGGCCGCTAA
```

FIG. 5C

MCPQKLTISWFAIVLLVSPLMAMWELEKDVYVVEVDWTPDAPGETVNLTCDTPEEDDITWTSDQRHGVIGSGKTLTITVKEFLDAG
QYTCHKGGETLSHSHLLLHKKENGIWSTEILKNFKNKTFLKCEAPNYSGRFTCSWLVQRNMDLKFNIKSSSSPDSRAVTCGMASLS
AEKVTLDQRDYEKYSVSCQEDVTCPTAEETLPIELALEARQQNKYENYSTSFFIRDIIKPDPPKNLQMKPLKNSQVEVSWEYPDSWST
PHSYFSLKFFVRIQRKKEKMKETEEGCNQKGAFLVEKTSTEVQCKGGNVCVQAQDRYYNSSCSKWACVPCRVRLLGGGGSGGGG
SGGGGSTETALVALSQPRVQCHASRYPVAVDCSWTPLQAPNSTRSTSFIATYRLGVATQQQSOPCLQRSPQASRCTIPDVHLFSTVP
YMLNVTAVHPGGASSSLLAFVAERIIKPDPPEGVRLRTAGQRLQVLWHPPASWPFPDIFSLKYRLRYRRGASHFRQVGPIEATTFTLR
NSKPHAKYCIQVSAQDLTDYGKPSDWSLPGQVESAPHKAAA
DKKIVPRDCGCKPCICTVPEVSSVFIFPPKPKDVLTITLTPKVTCVVVDISKDDPEVQFSWFVDDVEVHTAQTKPREEQFNSTFRSVSEL
PIMHQDWLNGKEFKCRVNSAAFPAPIEKTISKTKGRPKAPQVYTIPPPKEQMAKDKVSLTCMITDFFPEDITVEWQWNGQPAENYK
NTQPIMDTDGSYFVYSKLNVQKSNWEAGNTFTCSVLHEGLHNHHTEKSLSHSPGKstop Hind III _start mp40-HindIII_Linker-EBI3-NotI-mFC stop_NotI

FIG. 6A

```
tgctgtcaccagcagttggtcatctcttggttttccctggttttttctggcatctcccctgtggccatatgggaactgaagaaagatgtttatgtcgtagaattggattggt
atccggatgccccctgggagaaatggtggtcctcacctgtgacaccctgaagaagatgtatcacctggacctggaccagagcagtgaggtcttaggctctggcaaa
accctgaccatccaagtcaaagagtttggagatgctggccagtacctgccagtaccacaaggaggcggaggttcaagccattcgtcctcgtgttcacaaaaaggaag
atggaatttggtccactgatatttaaaggaccagaagaaccaaaaaataagaccttctaagatgcggggtgtaagtggtgacgtgcagttcacctgctggtggc
tgacgcaatcagtactgatttgacattgagttgagtactcagtggatgccaggagtcagtgcctgaggagggtgacgtgccagctgcctactctctgcagagagtc
agagggacaacaaggagtatgagtactcagtggatgccaggagtcagtgcctgaggagagtctgccattgaggtcatggtgatgccgtt
cacaagtcaagtatgaaaactacaccagcagctttcttcatcaggacatcatcaaactgaccaccaagaactgcagctgaagcattaaagaattctggc
aggtggaggtcagctggggtacccctgacacctggggtactccacattccactcttccctgacattctgcgttcagttcaggccccaggaagcaagagagaagagaa
agatagagtcttcacggacaaagacctcagccacggtcatctgcgcaaaaatgcagcattagctgcgggccaggacgctactatagctcatcttggagcgaa
tgggcatctgtgcctgcagtggaggccgagagttcgtgggagagcggagaaagtggcggaggttcttccccgcagcttctcctggcctttgtcctctgggccag
ctgccccctgcagtgaaggaaggcccccagcagctcgatgactgcccggggtgcaatgccgagctcttcgaatgcctgtggatgctcctggaccc
tgccgcctgctccaaactccacacagccccgtgtccttcattgccacgtcaggctcggcatggcccctgccggggccacagctggcccctgctgcagcagacgccaacg
tccacagctgaccaccatcacggatgtcctgcagctgttctccatgtcaccgccgtcaccccggggtccaccctggggctccaggctggtgcctttcat
aacagagcacatcatcaagctgaccctcagaaggcgtgcgctcagagctgctgagcgcagtcaggtcatgtggaggcctcgggtcctggcctttc
ccagatcttttcactgaagtactggatcgttacaagctcaggggctgcgcttcaccgggtgggccattgaagcacgtccttcatcctcaggggctgtg
cggccccgagccaggtactagtccaagtggcggctcaagtggaggaacttacagactacggggaactgattgactgagtctcccgccactgccacaatgagcctggc
aag
```

FIG. 6B

ATGGCCATCAGCAGTCGTCATTTCTGGTTCAGCCTGGTGTTCCTGCAAGTCCACTGTGGTCGTATTTGGGAGTCAAGAAAGACG
TGTACGTGGTGAGCTGGACTGTATCCAGATGCCCCGGGAAATGGTGGTCCTGACTTGCGACACCCTGAGGAAGATGTATCA
CATGGACTCTGGACCAGAGTCGAAGTGCTCGGCTCGGAGCCACTCAGGTCAAAGAGACCTGACAATTCAGGTCAAAGAGAGGACGGCATCGTGGATGCTGGCCAG
TACACATGTCACAAGGGCGAGAGTGTGCAAGACAAAACTTCCTGCGATGCAAGCCAAGATTACTCTGAAGGTTACCTGTTGGTGGCTC
CTCAAGGATCAGAAGAGCTCAACAGACCTGACTTTCAGCGTGAAGTCTAGTCGCGGGTCATCTGATCCACAGGGAGTCACATGTGGAGCAGTACT
ACCACAATCTCAACAGACCTGACTTTCAGCGTGAAGTCTAGTCGCGGGTCATCTGATCCACAGGGAGTCACATGTGGAGCAGTACT
CTGAGCCGCGAGAGGGTGAGAGGGCGACAACAGGCAGTGGAATATAGCGTCACAAGCTGAAATACGAAAATCCAGGTGTCTGAGGTCCCGCAGCCG
AGGAATCCCTCCCTAAAAACCTGAGGTCATGTGGACCAGCAGTGCACACAGCTGAAAATACGAAAATCCAGGTGTGTCTGGAATACCCAGATACCT
ATTAAGCTGATCCCCTAAAAACCTCCAGGTCACCTTTGCGTCAGGGCAGTGCACACAGCTGAAATACGAAAATCCAGGTGTGTCTGGAATACCCAGATACCT
GGAGCACACCCCATAGCTATTCTCCCTGACCTTTGCGTCAGGGCAAGAGTAACGCGGTACTATAGTGAGAGCCAAGAGTAACGCGGTACTATAGTCAAGCTGGT
ACTGATAAGACCTCCGCCACAGTCTGTCGAAAAACGCATCTATTAGTGTGAGAGCCAAGAGTAACGCGGTACTATAGTCAAGCTGGT
CCGAGTGGGCTTCTGTGCTCTGTGCTTGTAGTGAATTCGGATCCGGAGGTGGAGGATCCGTGACCCTGCCACTGCCCCG
ACAGTGCTCTGGCTCGTCTGCAGGTCGATCTTGCCCACCGTAGTGGCCATCTGCCAGTGACTCTGCCCCTGCAGGGACCTCAGCTGCACTGCCCCG
AGTGGCAGTGCACATATAGGCTGGGATGGCCGTAGAGGTCACAGCTGGCCTTGCTGCAGCAGACTCCAACCTCCACATCTGTACTA
TTCATCGCCACAGACGTCTTTTCATGCAGCTCATATCATTAAGCCTGATCCACCCGAAGGCGTGCCGAAGGGCTGCGGCTCCGGTCCGAAGGGCGTCTAGTCATTCATTCGTCGCCT
TCACCGACGTCTTTTCATGCAGCTCATATCATTAAGCCTGATCCACCCGAAGGCGTGCCGAAGGGCTGCGGCTCCGGTCCGAAGGGCGTCTAGTCATTCATTCGTCGCCT
TTATTACCGAGCATATCATTAAGCCTGATCCACCCGAAGGCGTGCCGAAGGGCTGCCAGCCCTCGGCTGAGAGACAGGGAGCAGTCCAGGTCCAGTGGG
AACCTCCAGATCATGGCCAATTCCCGAAATCTTAGCTGCGGGAAGCCCTGCAAAATCTTAGCTGAGGGCCGTGCGCCGTCGATCTATGTCACGAGACC
GGGTGGGACCAATCGAGGCCACATCCTTATTCTGAGGGCCGTGCGCCGTCGATCTATGTCACGAGACC
TGACTGATTACGGGGAGCTCTGACTGAGTCTGCAGCCACAGCTACTATGTCTCGGAAGCAGGGTCTCGAGAACCCAAG
AGTTGCGATAAAACCATACATGCCCCCCTTGTCCTGCCCAGAA

FIG. 6C

[M]CHQQLVISWFSLVFLASPLVAIWELKKDVYVVELDWYPDAPGEMVVLTCDTPEEDGITWTLDQSSE
VLGSGKTLTIQVKEFGDAGQYTCHKGGEVLSHSLLLLHKKEDGIWSTDILKDQKEPKNKTFLRCEAKNYS
GRFTCWWLTTISTDLTFSVKSSRGSSDPQGVTCGAATLSAERVRGDNKEYEYSVECQEDSACPAAEESL
PIEVMVDAVHKLKYENYTSSFFIRDIIKPDPPKNLQLKPLKNSRQVEVSWEYPDTWSTPHSYFSLTFCVQ
VQGKSREKKDRVFTDKTSATVICRKNASISVRAQDRYYSSSWSEWASVPCSGGGGSGGGGSGGGGS
[M]TPQLLLALVLWASCPPCSGRKGPPAALTLPRVQCRASRYPIAVDCSWTLPPAPNSTSPVSFIATYRLGM
AARGHSWPCLQQTPTSTSCTITDVQLFSMAPYVLNVTAVHPWGSSSSFVPFITEHIIKPDPPEGVRLSPL
AERQLQVQWEPPGSWPFPEIFSLKYWIRYKRQGAARFHRVGPIEATSFILRAVRPRARYYVQVAAQDLT
DYGELSDWSLPATATMSLGK

[FIG. 7]
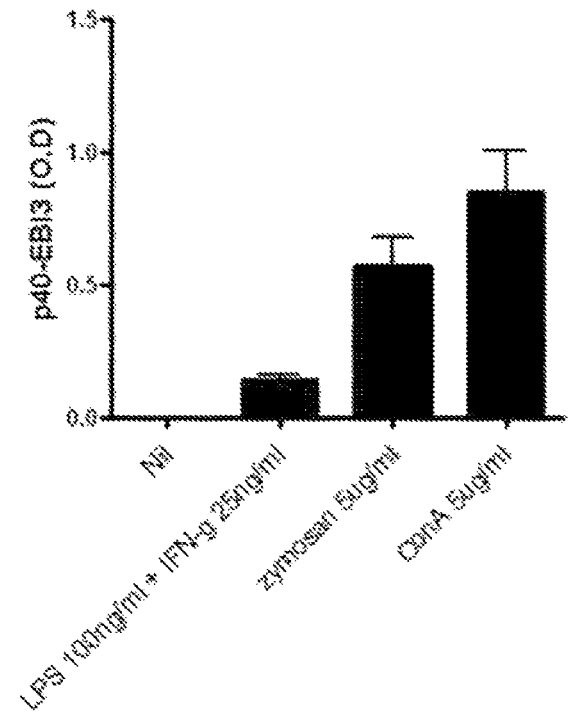
[FIG. 8]
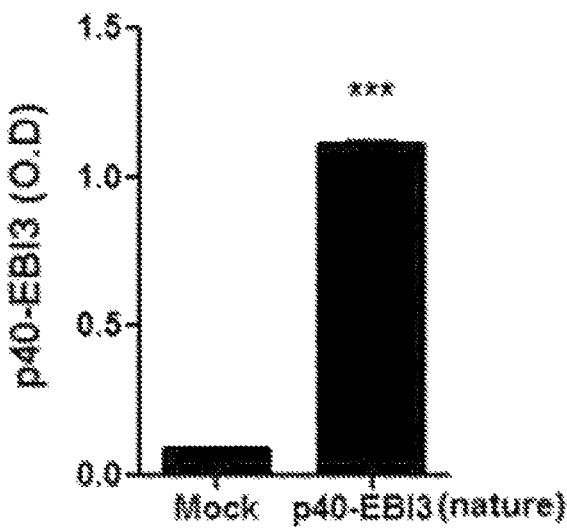

[FIG. 14]
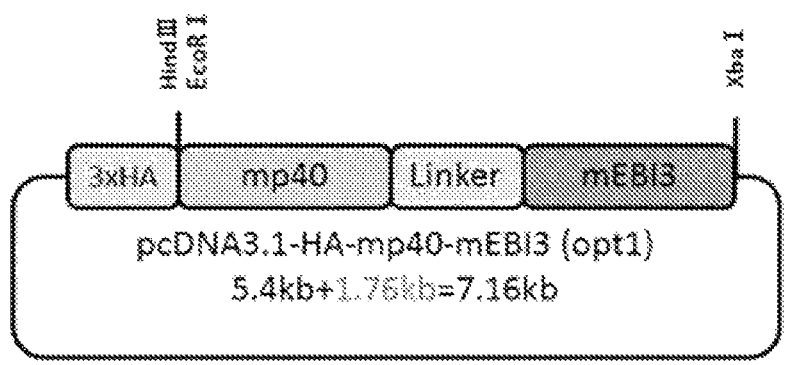
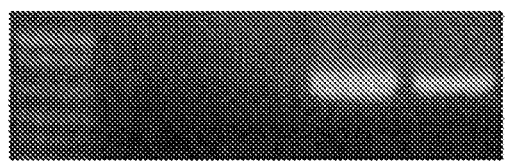
No : No loding
NC : Negetive control
PC : Transgene vector
Tg : T g tail lysate
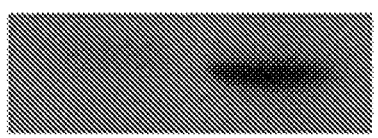

[FIG. 19]
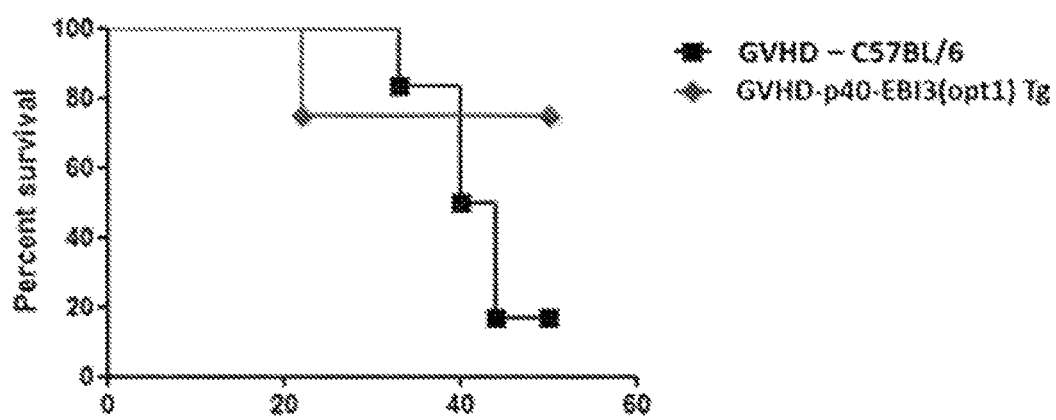
[FIG. 20]
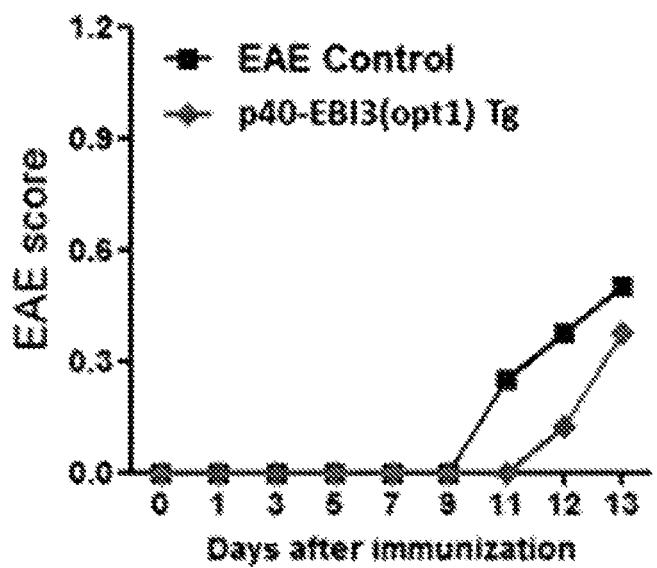

FIG. 21A
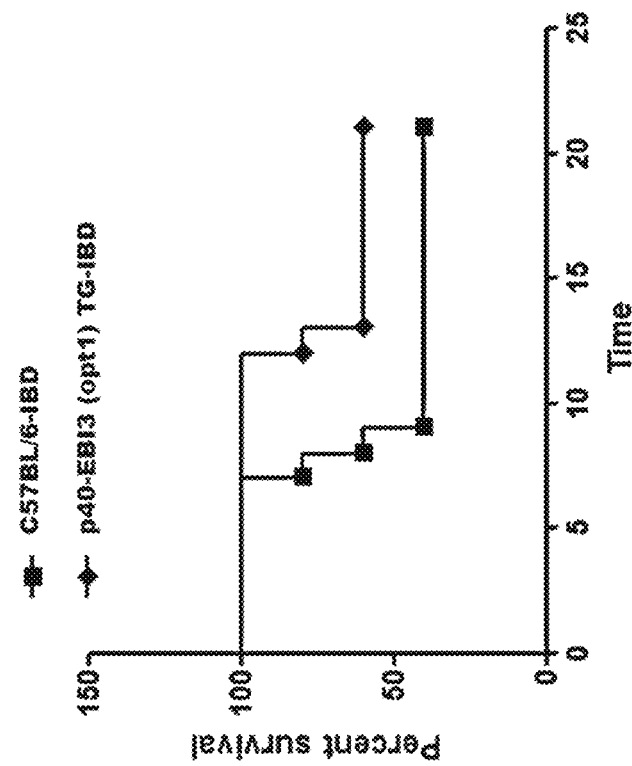
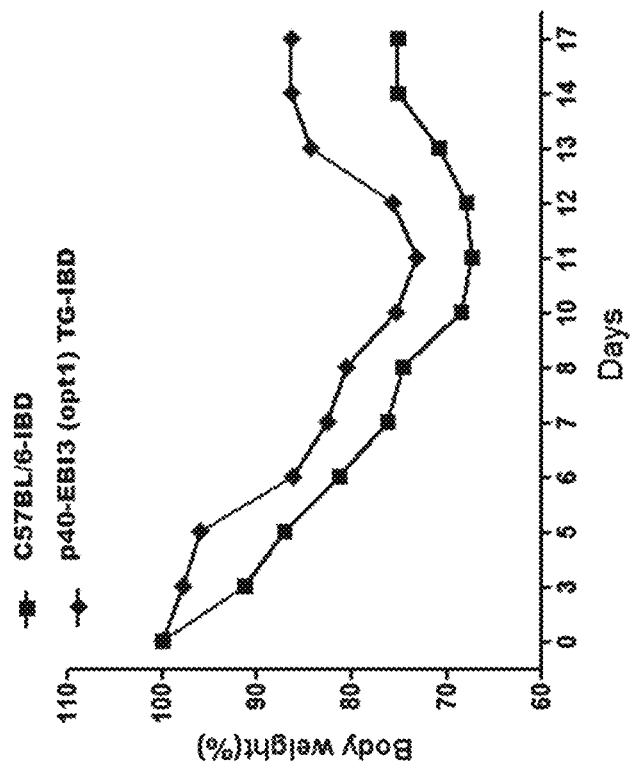

[FIG. 23]
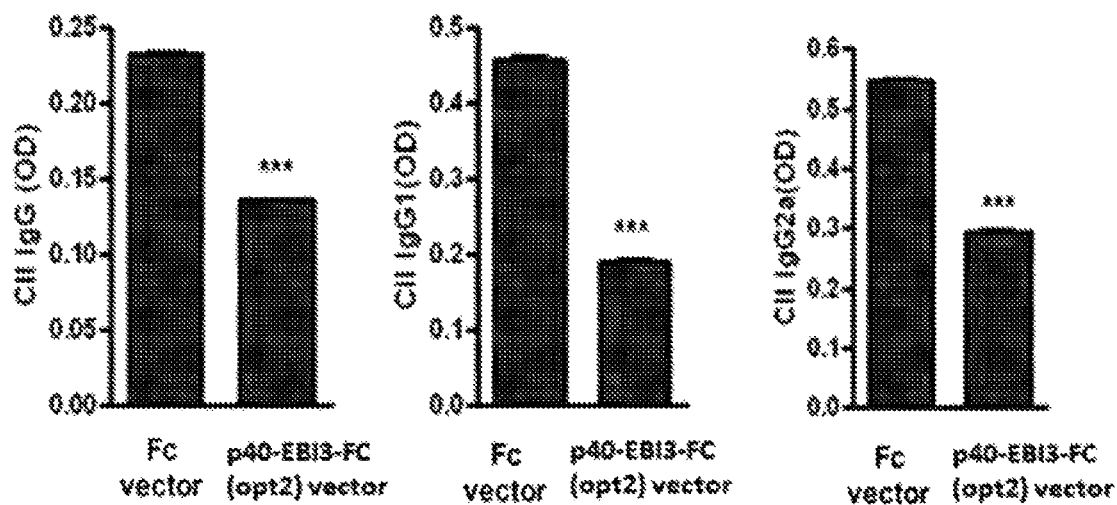
[FIG. 24]
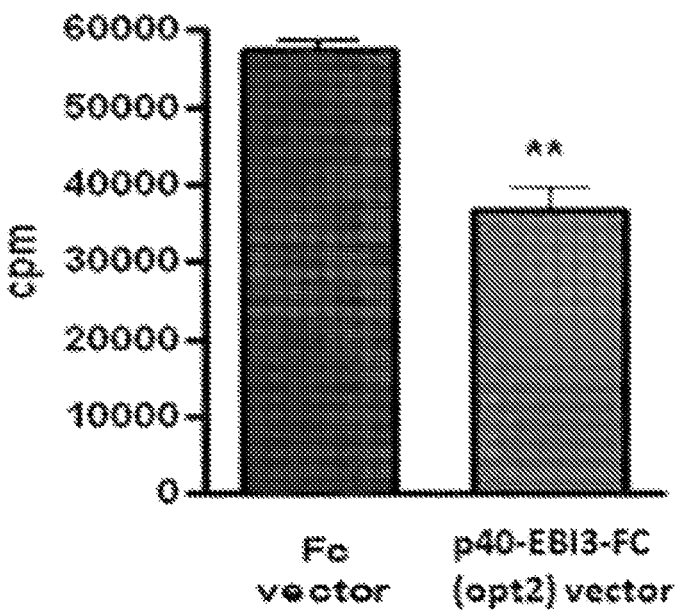

FIG. 27B gi|6652948  Mass: 38147  Score: 167  Matches: 5(2)  Sequences: 3(2)  emPAI: 0.33
interleukin 12b p40 subunit [Mus musculus]

| Query | Observed | Mr(expt) | Mr(calc) | Delta | Miss | Score | Expect | Rank | Unique | Peptide |
|---|---|---|---|---|---|---|---|---|---|---|
| 37 | 1285.6130 | 1288.6057 | 1288.6663 | -0.0606 | 0 | 15 | 94 | 3 | U | K.ENGIWSTEILK.N |
| 369 | 1437.4501 | 2872.8857 | 2873.2820 | -0.3963 | 0 | 94 | 1.2e-06 | 1 | U | K.NSQVEVSWEYPDSWSTPHSYFSLK.F |
| 370 | 1437.9566 | 2873.8987 | 2872.2980 | 1.6007 | 0 | (15) | 94 | 1 | U | K.NSQVEVSWEYPDSWSTPHSYFSLK.F |
| 420 | 1483.8721 | 2965.7297 | 2966.3889 | -0.6591 | 0 | 96 | 8.1e-07 | 1 | U | K.YSVSCQEAVTCPTAEETLPIELALEAR.Q |
| 521 | 1556.1601 | 3110.3057 | 3108.4831 | 1.8426 | 0 | (41) | 0.24 | 1 | U | K.YSVSCQEDVTCPTAEETLPIELALEAR.Q |

Proteins matching the same set of peptides:
gi|6680397  Mass: 38211  Score: 167  Matches: 5(2)  Sequences: 3(2)
interleukin-12 subunit beta precursor [Mus musculus]

--- gi|7652052  Mass: 25337  Score: 157  Matches: 16(4)  Sequences: 4(3)  emPAI: 1.32
interleukin-27 subunit beta precursor [Mus musculus]

| Query | Observed | Mr(expt) | Mr(calc) | Delta | Miss | Score | Expect | Rank | Unique | Peptide |
|---|---|---|---|---|---|---|---|---|---|---|
| 30 | 611.2761 | 1220.5377 | 1219.6925 | 0.8453 | 0 | 40 | 0.24 | 1 | U | R.IIKFDFFEGVR.L 33 32 |
| 43 | 716.7981 | 1431.5817 | 1431.7722 | -0.1905 | 0 | 52 | 0.017 | 1 | U | R.QVGFIEATTFLR.N 45 |
| 46 | 1433.7540 | 1432.7467 | 1431.7722 | 0.9745 | 0 | (13) | 1.4e+02 | 2 | U | R.QVGFIEATTFLR.N 44 |
| 77 | 858.0181 | 1714.0217 | 1713.8468 | 0.1749 | 0 | 64 | 0.0012 | 1 | U | R.LGVATQQQSQPCLQR.S |
| 78 | 858.1696 | 1714.3247 | 1712.8628 | 1.4619 | 0 | (45) | 0.085 | 1 | U | R.LGVATQQQSQPCLQR.S |
| 79 | 858.3856 | 1714.7567 | 1714.8308 | -0.0741 | 0 | (30) | 2.8 | 1 | U | R.LGVATQQQSQPCLQR.S |
| 80 | 865.4926 | 1728.9707 | 1727.8625 | 1.1083 | 0 | (28) | 4.9 | 1 | U | R.LGVATQQQSQPCLQR.S |
| 81 | 866.1541 | 1730.2937 | 1728.8465 | 1.4473 | 0 | (11) | 2.3e+02 | 2 | U | R.LGVATQQQSQPCLQR.S |
| 179 | 793.7312 | 2378.1717 | 2377.2623 | 0.9094 | 0 | (42) | 0.17 | 1 | U | R.LQVLWHPPASWFPDIFSLK.Y 178 |
| 181 | 1190.3066 | 2378.5987 | 2377.2623 | 1.3364 | 0 | 72 | 0.00019 | 1 | U | R.LQVLWHPPASWFPDIFSLK.Y 180 |

Proteins matching the same set of peptides:
gi|148651745  Mass: 23881  Score: 157  Matches: 16(4)  Sequences: 4(3)
Epstein-Barr virus induced gene 3, isoform CRA_a [Mus musculus]

--- gi|1195160  Mass: 23594  Score: 85  Matches: 6(2)  Sequences: 3(1)  emPAI: 0.35
immunoglobulin heavy chain C region [Mus musculus]

| Query | Observed | Mr(expt) | Mr(calc) | Delta | Miss | Score | Expect | Rank | Unique | Peptide |
|---|---|---|---|---|---|---|---|---|---|---|
| 29 | 1210.4880 | 1209.4807 | 1209.6758 | -0.1950 | 0 | 21 | 22 | 1 | U | K.APQVTIPPPK.E |
| 66 | 900.1571 | 1798.2997 | 1797.9335 | 0.3663 | 1 | 23 | 13 | 1 | U | K.APQVTIPPPKEQMAK.D |
| 115 | 991.6676 | 1981.3207 | 1981.8615 | -0.5408 | 0 | 68 | 0.00048 | 1 | U | K.NTQPIMDTDGSYFVYSK.L 118 |
| 119 | 992.2876 | 1982.5607 | 1980.8775 | 1.6832 | 0 | (57) | 0.0063 | 1 | U | K.NTQPIMDTDGSYFVYSK.L 117 |

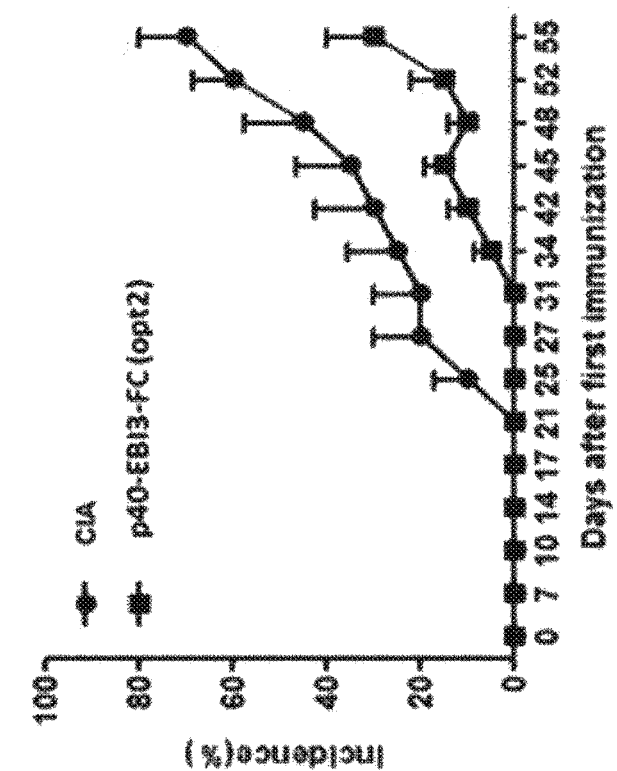
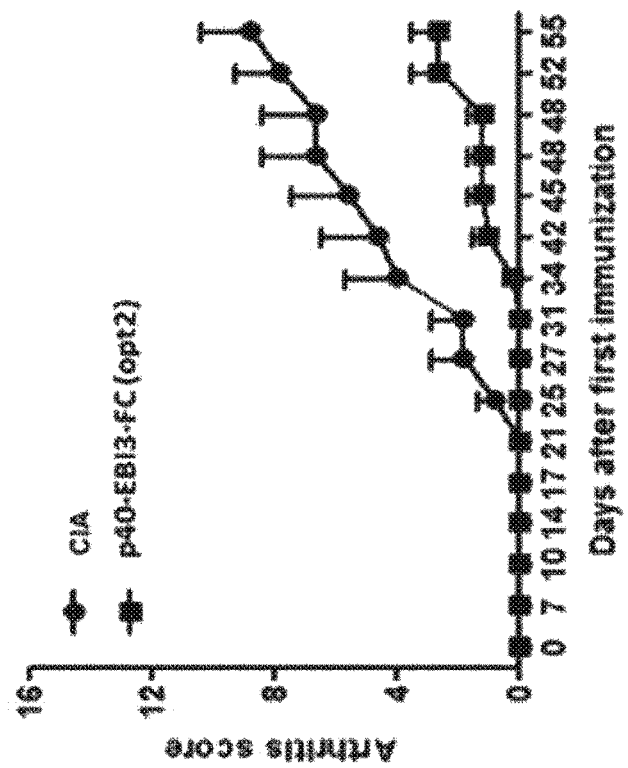
FIG. 33

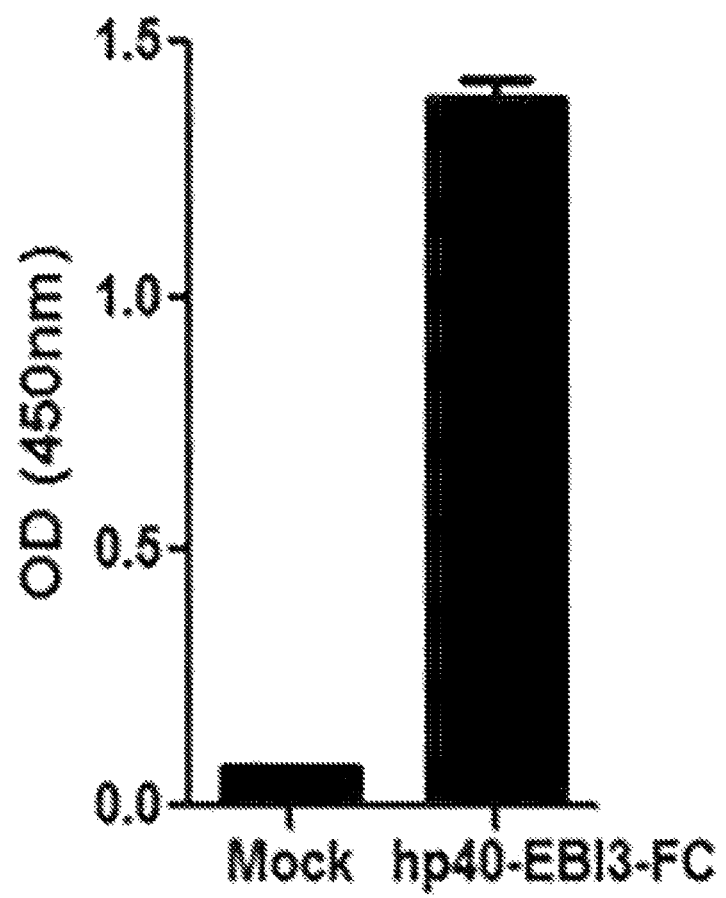
[FIG. 41]

SEQUENCE LISTING

```
<160> NUMBER OF SEQ ID NOS: 12

<210> SEQ ID NO 1
<211> LENGTH: 1763
<212> TYPE: DNA
<213> ORGANISM: Artificial Sequence
<220> FEATURE:
<223> OTHER INFORMATION: p40-EBi3 complex

<400> SEQUENCE: 1
aagcttgaat tcatgtgtcc tcagaagcta accatctcct ggtttgccat cgttttgctg      60
gtgtctccac tcatggccat gtgggagctg gagaaagacg tttatgttgt agaggtggac     120
tggactcccg atgcccctgg agaaacagtg aacctcacct gtgacacgcc tgaagaagat     180
gacatcacct ggacctcaga ccagagacat ggagtcatag gctctggaaa gaccctgacc     240
atcactgtca aagagtttct agatgctggc cagtacacct gccacaaagg aggcgagact     300
ctgagccact cacatctgct gctccacaag aaggaaaatg gaatttggtc cactgaaatt     360
ttaaaaaatt tcaaaaacaa gactttcctg aagtgtgaag caccaaatta ctccggacgg     420
ttcacgtgct catggctggt gcaaagaaac atggacttga gttcaacat caagagcagt     480 agcagttccc ctgactctcg ggcagtgaca tgtggaatgg cgtctctgtc tgcagagaag     540
gtcacactgg accaaaggga ctatgagaag tattcagtgt cctgccagga ggatgtcacc     600
tgcccaactg ccgaggagac cctgcccatt gaactggcgt tggaagcacg gcagcagaat     660
aaatatgaga actacagcac cagcttcttc atcagggaca tcatcaaacc agaccgcc     720 aagaacttgc agatgaagcc tttgaagaac tcacaggtgg aggtcagctg ggagtaccct     780
gactcctgga gcactcccca ttcctacttc tcccctcaagt tctttgttcg aatccagcgc     840
aagaaagaaa agatgaagga gacagaggag gggtgtaacc agaaaggtgc gttcctcgta     900
gagaagacat ctaccgaagt ccaatgcaaa ggcgggaatg tctgcgtgca agctcaggat     960
cgctattaca attcctcatg cagcaagtgg gcatgtgttc cctgcagggt ccgatccggc    1020
ggcggcggct ctggcggcgg cggctctggc ggcggcggct ctatgtccaa gctgctcttc    1080
```

```
ctgtcacttg ccctctgggc cagccgctcc cctggttaca ctgaaacagc tctcgtggct    1140
ctaagccagc ccagagtgca atgccatgct tctcggtatc ccgtggccgt ggactgctcc    1200
tggactcctc tccaggctcc caactccacc agatccacgt ccttcattgc cacttacagg    1260
ctcggtgtgg ccacccagca gcagagccag ccctgcctac aacggagccc ccaggcctcc    1320
cgatgcacca tccccgacgt gcacctgttc tccacggtgc cctacatgct aaatgtcact    1380
gcagtgcacc caggcggcgc cagcagcagc ctcctagcct tgtggctga gcgaatcatc    1440 aagccggacc ctccggaagg cgtgcgcctg cgcacagcgg acagcgcct gcaggtgctc    1500 tggcatcccc ctgcttcctg gcccttcccg gacatcttct ctctcaagta ccgactccgc    1560
taccggcgcc gaggagcctc tcacttccgc caggtgggac ccattgaagc cacgactttc    1620
accctcagga actcgaaacc ccatgccaag tattgcatcc aggtgtcagc tcaggacctc    1680
acagattatg ggaaaccaag tgactggagc ctccctgggc aagtagaaag tgcaccccat    1740
aagccctgac tcgaggcggc cgc                                           1763
```

<210> SEQ ID NO 2
<211> LENGTH: 578
<212> TYPE: PRT
<213> ORGANISM: Artificial Sequence
<220> FEATURE:
<223> OTHER INFORMATION: p40-EBi3 complex

<400> SEQUENCE: 2

```
Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
                20                  25                  30

Val Glu Val Asp Trp Thr Pro Asp Ala Pro Gly Glu Thr Val Asn Leu
            35                  40                  45

Thr Cys Asp Thr Pro Glu Glu Asp Ile Thr Trp Thr Ser Asp Gln
        50                  55                  60

Arg His Gly Val Ile Gly Ser Gly Lys Thr Leu Thr Ile Thr Val Lys
65                  70                  75                  80

Glu Phe Leu Asp Ala Gly Gln Tyr Thr Cys His Lys Gly Gly Glu Thr
                85                  90                  95

Leu Ser His Ser His Leu Leu Leu His Lys Lys Glu Asn Gly Ile Trp
            100                 105                 110

Ser Thr Glu Ile Leu Lys Asn Phe Lys Asn Lys Thr Phe Leu Lys Cys
        115                 120                 125

Glu Ala Pro Asn Tyr Ser Gly Arg Phe Thr Cys Ser Trp Leu Val Gln
    130                 135                 140

Arg Asn Met Asp Leu Lys Phe Asn Ile Lys Ser Ser Ser Ser Pro
145                 150                 155                 160

Asp Ser Arg Ala Val Thr Cys Gly Met Ala Ser Leu Ser Ala Glu Lys
                165                 170                 175

Val Thr Leu Asp Gln Arg Asp Tyr Glu Lys Tyr Ser Val Ser Cys Gln
            180                 185                 190

Glu Asp Val Thr Cys Pro Thr Ala Glu Glu Thr Leu Pro Ile Glu Leu
        195                 200                 205

Ala Leu Glu Ala Arg Gln Gln Asn Lys Tyr Glu Asn Tyr Ser Thr Ser
    210                 215                 220

Phe Phe Ile Arg Asp Ile Ile Lys Pro Asp Pro Pro Lys Asn Leu Gln
225                 230                 235                 240
```

```
Met Lys Pro Leu Lys Asn Ser Gln Val Glu Val Ser Trp Glu Tyr Pro
                245                 250                 255

Asp Ser Trp Ser Thr Pro His Ser Tyr Phe Ser Leu Lys Phe Phe Val
        260                 265                 270

Arg Ile Gln Arg Lys Lys Glu Lys Met Lys Glu Thr Glu Glu Gly Cys
    275                 280                 285

Asn Gln Lys Gly Ala Phe Leu Val Glu Lys Thr Ser Thr Glu Val Gln
290                 295                 300

Cys Lys Gly Gly Asn Val Cys Val Gln Ala Gln Asp Arg Tyr Tyr Asn
305                 310                 315                 320

Ser Ser Cys Ser Lys Trp Ala Cys Val Pro Cys Arg Val Arg Ser Gly
            325                 330                 335

Gly Gly Gly Ser Gly Gly Gly Ser Gly Gly Gly Gly Ser Met Ser
            340                 345                 350

Lys Leu Leu Phe Leu Ser Leu Ala Leu Trp Ala Ser Arg Ser Pro Gly
                355                 360                 365

Tyr Thr Glu Thr Ala Leu Val Ala Leu Ser Gln Pro Arg Val Gln Cys
370                 375                 380

His Ala Ser Arg Tyr Pro Val Ala Val Asp Cys Ser Trp Thr Pro Leu
385                 390                 395                 400

Gln Ala Pro Asn Ser Thr Arg Ser Thr Ser Phe Ile Ala Thr Tyr Arg
                405                 410                 415

Leu Gly Val Ala Thr Gln Gln Ser Gln Pro Cys Leu Gln Arg Ser
                    420                 425                 430

Pro Gln Ala Ser Arg Cys Thr Ile Pro Asp Val His Leu Phe Ser Thr
            435                 440                 445

Val Pro Tyr Met Leu Asn Val Thr Ala Val His Pro Gly Gly Ala Ser
450                 455                 460

Ser Ser Leu Leu Ala Phe Val Ala Glu Arg Ile Ile Lys Pro Asp Pro
465                 470                 475                 480

Pro Glu Gly Val Arg Leu Arg Thr Ala Gly Gln Arg Leu Gln Val Leu
                485                 490                 495

Trp His Pro Pro Ala Ser Trp Pro Phe Pro Asp Ile Phe Ser Leu Lys
            500                 505                 510

Tyr Arg Leu Arg Tyr Arg Arg Gly Ala Ser His Phe Arg Gln Val
            515                 520                 525

Gly Pro Ile Glu Ala Thr Thr Phe Thr Leu Arg Asn Ser Lys Pro His
        530                 535                 540

Ala Lys Tyr Cys Ile Gln Val Ser Ala Gln Asp Leu Thr Asp Tyr Gly
545                 550                 555                 560

Lys Pro Ser Asp Trp Ser Leu Pro Gly Gln Val Glu Ser Ala Pro His
                565                 570                 575

Lys Pro

<210> SEQ ID NO 3
<211> LENGTH: 1761
<212> TYPE: DNA
<213> ORGANISM: Artificial Sequence
<220> FEATURE:
<223> OTHER INFORMATION: p40-EBi3 complex

<400> SEQUENCE: 3
aagcttgaat tcagtgggat gtgccctcag aaactcacta tctcatggtt cgctatcgtg      60
ctgctcgtct cacctctcat ggctatgtgg gaactggaaa aggacgtgta tgtggtcgag     120
```

-continued

| | |
|---|---|
| gtcgactgga ctccagatgc ccccggcgaa accgtgaacc tgacttgcga caccccagag | 180 |
| gaagacgata tcacttggac ctcagatcag agacacggcg tgatcggatc tggcaagacc | 240 |
| ctgactatta ccgtcaaaga gttcctcgac gctggccagt acacatgtca aagggcgga | 300 |
| gaaactctga gccactccca tctgctcctg cataagaaag agaacggaat ctggagcaca | 360 |
| gaaattctga agaacttcaa gaacaagacc ttcctgaaat gcgaggcacc taattatagc | 420 |
| gggaggttca cctgttcctg gctggtgcag agaaacatgg acctcaagtt caacatcaag | 480 |
| agctcctcta gttcaccaga tagcagagct gtgacctgcg gcatggcatc tctgagtgcc | 540 |
| gagaaggtga cactcgacca gcgggattac gagaaatatt cagtgagctg ccaggaagac | 600 |
| gtgacatgtc ctactgccga ggaaactctg ccaatcgagc tcgccctgga agctagacag | 660 |
| cagaacaagt acgagaatta ttccacctct ttctttattc gggacatcat taagccagat | 720 |
| ccccctaaaa acctgcagat gaagcccctc aaaaatagcc aggtggaggt ctcctgggaa | 780 |
| taccccgaca gttggtcaac acctcactcc tatttctctc tgaagttctt tgtgcgaatc | 840 |
| cagaggaaga aagagaagat gaaagaaacc gaggaaggct gcaatcagaa gggagccttt | 900 |
| ctggtggaga aacatccac tgaagtccag tgcaagggcg gcaacgtgtg cgtgcaggct | 960 |
| caggatcgct actataatag ctcctgttct aaatgggcat gcgtgccttg tcgcgtccga | 1020 |
| tctggcggag ggggtagtgg cggaggggggt tcaggcggag ggggtagcat gtccaagctc | 1080 |
| ctgttcctct ccctggcact ctgggcaagc aggagccctg ctacaccga dacagctctg | 1140 |
| gtggcactct cccagcctcg cgtccagtgc cacgcttctc gatatccagt ggcagtcgac | 1200 |
| tgtagttgga cacctctgca ggccccaaac agcaccagga gcaccagctt catcgcaacc | 1260 |
| taccgcctgg gagtggccac acagcagcag agccagccat gcctgcagag aagtccccag | 1320 |
| gcttcacggt gtaccattcc cgatgtgcac ctgttcagca ctgtcccta tatgctcaat | 1380 |
| gtgaccgccg tccatccagg cggagcttct agttcactcc tggcctttgt ggctgagcgc | 1440 |
| atcattaagc ctgaccccac cgaaggggtg aggctgagaa ccgccggtca gcgactgcag | 1500 |
| gtcctctggc atcctccagc ctcttggccc ttccctgata tctttagtct gaagtataga | 1560 |
| ctcagatata ggagacgggg cgcctctcac ttccgacaag tgggacccat cgaggctacc | 1620 |
| accttcaccc tgaggaactc caagcctcat gctaaatact gtattcaggt gtctgcacag | 1680 |
| gacctgactg attatgggaa gccatccgat tggagtctgc caggacaggt ggaaagcgcc | 1740 |
| cctcacaaac cataatctag a | 1761 |

<210> SEQ ID NO 4
<211> LENGTH: 578
<212> TYPE: PRT
<213> ORGANISM: Artificial Sequence
<220> FEATURE:
<223> OTHER INFORMATION: p40-EBi3 complex

<400> SEQUENCE: 4

Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
            20                  25                  30

Val Glu Val Asp Trp Thr Pro Asp Ala Pro Gly Glu Thr Val Asn Leu
        35                  40                  45

Thr Cys Asp Thr Pro Glu Glu Asp Asp Ile Thr Trp Thr Ser Asp Gln
    50                  55                  60

Arg His Gly Val Ile Gly Ser Gly Lys Thr Leu Thr Ile Thr Val Lys

```
                65                  70                  75                  80
        Glu Phe Leu Asp Ala Gly Gln Tyr Thr Cys His Lys Gly Gly Glu Thr
                        85                  90                  95
        Leu Ser His Ser His Leu Leu His Lys Lys Glu Asn Gly Ile Trp
                    100                 105                 110
        Ser Thr Glu Ile Leu Lys Asn Phe Lys Asn Lys Thr Phe Leu Lys Cys
                    115                 120                 125
        Glu Ala Pro Asn Tyr Ser Gly Arg Phe Thr Cys Ser Trp Leu Val Gln
                    130                 135                 140
        Arg Asn Met Asp Leu Lys Phe Asn Ile Lys Ser Ser Ser Ser Pro
        145                 150                 155                 160
        Asp Ser Arg Ala Val Thr Cys Gly Met Ala Ser Leu Ser Ala Glu Lys
                        165                 170                 175
        Val Thr Leu Asp Gln Arg Asp Tyr Glu Lys Tyr Ser Val Ser Cys Gln
                    180                 185                 190
        Glu Asp Val Thr Cys Pro Thr Ala Glu Glu Thr Leu Pro Ile Glu Leu
                    195                 200                 205
        Ala Leu Glu Ala Arg Gln Gln Asn Lys Tyr Glu Asn Tyr Ser Thr Ser
                    210                 215                 220
        Phe Phe Ile Arg Asp Ile Ile Lys Pro Asp Pro Lys Asn Leu Gln
        225                 230                 235                 240
        Met Lys Pro Leu Lys Asn Ser Gln Val Glu Val Ser Trp Glu Tyr Pro
                        245                 250                 255
        Asp Ser Trp Ser Thr Pro His Ser Tyr Phe Ser Leu Lys Phe Phe Val
                    260                 265                 270
        Arg Ile Gln Arg Lys Lys Glu Lys Met Lys Glu Thr Glu Glu Gly Cys
                    275                 280                 285
        Asn Gln Lys Gly Ala Phe Leu Val Glu Lys Thr Ser Thr Glu Val Gln
                    290                 295                 300
        Cys Lys Gly Gly Asn Val Cys Val Gln Ala Gln Asp Arg Tyr Tyr Asn
        305                 310                 315                 320
        Ser Ser Cys Ser Lys Trp Ala Cys Val Pro Cys Arg Val Arg Ser Gly
                        325                 330                 335
        Gly Gly Gly Ser Gly Gly Gly Gly Ser Gly Gly Gly Gly Ser Met Ser
                    340                 345                 350
        Lys Leu Leu Phe Leu Ser Leu Ala Leu Trp Ala Ser Arg Ser Pro Gly
                    355                 360                 365
        Tyr Thr Glu Thr Ala Leu Val Ala Leu Ser Gln Pro Arg Val Gln Cys
                    370                 375                 380
        His Ala Ser Arg Tyr Pro Val Ala Val Asp Cys Ser Trp Thr Pro Leu
        385                 390                 395                 400
        Gln Ala Pro Asn Ser Thr Arg Ser Thr Ser Phe Ile Ala Thr Tyr Arg
                        405                 410                 415
        Leu Gly Val Ala Thr Gln Gln Ser Gln Pro Cys Leu Gln Arg Ser
                    420                 425                 430
        Pro Gln Ala Ser Arg Cys Thr Ile Pro Asp Val His Leu Phe Ser Thr
                    435                 440                 445
        Val Pro Tyr Met Leu Asn Val Thr Ala Val His Pro Gly Gly Ala Ser
                    450                 455                 460
        Ser Ser Leu Leu Ala Phe Val Ala Glu Arg Ile Ile Lys Pro Asp Pro
        465                 470                 475                 480
        Pro Glu Gly Val Arg Leu Arg Thr Ala Gly Gln Arg Leu Gln Val Leu
                        485                 490                 495
```

```
Trp His Pro Pro Ala Ser Trp Pro Phe Pro Asp Ile Phe Ser Leu Lys
            500                 505                 510

Tyr Arg Leu Arg Tyr Arg Arg Gly Ala Ser His Phe Arg Gln Val
        515                 520                 525

Gly Pro Ile Glu Ala Thr Thr Phe Thr Leu Arg Asn Ser Lys Pro His
            530                 535                 540

Ala Lys Tyr Cys Ile Gln Val Ser Ala Gln Asp Leu Thr Asp Tyr Gly
545             550                 555                 560

Lys Pro Ser Asp Trp Ser Leu Pro Gly Gln Val Glu Ser Ala Pro His
                565                 570                 575

Lys Pro

<210> SEQ ID NO 5
<211> LENGTH: 1692
<212> TYPE: DNA
<213> ORGANISM: Artificial Sequence
<220> FEATURE:
<223> OTHER INFORMATION: p40-EBi3 complex

<400> SEQUENCE: 5
aagcttagtg ggatgtgccc ccagaagctg accatcagct ggttcgccat cgtgctgctg        60
gtgagccccc tgatggccat gtgggagctg gagaaggacg tgtacgtggt ggaggtggac       120
tggacccccg atgccccccgg cgagaccgtg aacctgacct gcgacacccc cgaggaggac       180 gacatcaccct ggaccagcga ccagagacac ggcgtgatcg gcagcggcaa gaccctgacc       240
atcaccgtga aggagttcct ggacgccggc cagtacacct gccacaaggg cggcgagacc       300
ctgagccaca gccacctgct gctgcacaag aaggagaacg gcatctggag caccgagatc       360
ctgaagaact tcaagaacaa gaccttcctg aagtgcgagg cccccaacta cagcggcaga       420
ttcacctgca gctggctggt gcagagaaac atggacctga gttcaacat caagtctagc       480 tccagcagcc ccgacagcag agccgtgacc tgcggcatgg ccagcctgag cgccgagaag       540
gtgaccctgg accagagaga ctacgagaag tacagcgtga gctgccagga ggacgtgacc       600 tgcccccaccg ccgaggagac cctgcccatc gagctggccc tggaggccag acagcagaac       660
aagtacgaga actacagcac cagcttcttc atcagagaca tcatcaagcc cgaccctccc       720
aagaacctgc agatgaagcc cctgaagaac agccaggtgg aggtgagctg ggagtacccc       780
gacagctgga gcacccccca gctgtacttc agcctgaagt tctttgtgag aatccagaga       840
aagaaggaga gatgaagga gaccgaggag ggctgcaacc agaagggcgc cttcctggtg       900
gagaagacca gcaccgaggt gcagtgcaag ggcggcaacg tgtgcgtgca ggcccaggac       960
agatactaca cagcagctg cagcaagtgg gcctgcgtgc cctgcagagt gagaagcaag      1020
cttggaggcg gaggttctgg tggaggcgga agtggcggag aggttctac agagaccgct      1080 ctggtggccc tgagccagcc cagagtgcag tgccacgcca gcagataccc cgtggccgtg      1140
gactgcagtt ggacacccct gcaggctccc aacagcacca gaagcaccag cttcatcgct      1200
acctacagac tgggagtggc tacccagcaa cagagccagc cctgcctgca gagaagcccc      1260
caggccagca gatgcaccat cccgacgtg cacctgttca gcaccgtgcc ctacatgctg      1320
aacgtgaccg ccgtgcaccc cggaggtgcc agctccagcc tgctggcctt cgtggccgag      1380
agaatcatca gcccgaccc tcccgagggc gtgagactga gaaccgccgg acagagactg      1440
caggtgctgt ggacacccac cgccagttgg cccttccccg acatcttcag cctgaagtac      1500
agactgagat acagacggag aggagccagc cacttcgac aggtgggacc catcgaggcc      1560
```

```
acaaccttca ccctgagaaa cagcaagccc cacgccaagt actgcatcca ggtgagcgcc   1620
caggacctga ccgactacgg caagcccagc gactggagcc tgcccggaca ggtggagagc   1680
gcccctcaca ag                                                       1692
```

<210> SEQ ID NO 6
<211> LENGTH: 560
<212> TYPE: PRT
<213> ORGANISM: Artificial Sequence
<220> FEATURE:
<223> OTHER INFORMATION: p40-EBi3 complex

<400> SEQUENCE: 6

Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
            20                  25                  30

Val Glu Val Asp Trp Thr Pro Asp Ala Pro Gly Glu Thr Val Asn Leu
        35                  40                  45

Thr Cys Asp Thr Pro Glu Glu Asp Ile Thr Trp Thr Ser Asp Gln
    50                  55                  60

Arg His Gly Val Ile Gly Ser Gly Lys Thr Leu Thr Ile Thr Val Lys
65                  70                  75                  80

Glu Phe Leu Asp Ala Gly Gln Tyr Thr Cys His Lys Gly Gly Glu Thr
                85                  90                  95

Leu Ser His Ser His Leu Leu Leu His Lys Lys Glu Asn Gly Ile Trp
            100                 105                 110

Ser Thr Glu Ile Leu Lys Asn Phe Lys Asn Lys Thr Phe Leu Lys Cys
        115                 120                 125

Glu Ala Pro Asn Tyr Ser Gly Arg Phe Thr Cys Ser Trp Leu Val Gln
    130                 135                 140

Arg Asn Met Asp Leu Lys Phe Asn Ile Lys Ser Ser Ser Ser Ser Pro
145                 150                 155                 160

Asp Ser Arg Ala Val Thr Cys Gly Met Ala Ser Leu Ser Ala Glu Lys
                165                 170                 175

Val Thr Leu Asp Gln Arg Asp Tyr Glu Lys Tyr Ser Val Ser Cys Gln
            180                 185                 190

Glu Asp Val Thr Cys Pro Thr Ala Glu Glu Thr Leu Pro Ile Glu Leu
        195                 200                 205

Ala Leu Glu Ala Arg Gln Gln Asn Lys Tyr Glu Asn Tyr Ser Thr Ser
    210                 215                 220

Phe Phe Ile Arg Asp Ile Ile Lys Pro Asp Pro Pro Lys Asn Leu Gln
225                 230                 235                 240

Met Lys Pro Leu Lys Asn Ser Gln Val Glu Val Ser Trp Glu Tyr Pro
                245                 250                 255

Asp Ser Trp Ser Thr Pro His Ser Tyr Phe Ser Leu Lys Phe Phe Val
            260                 265                 270

Arg Ile Gln Arg Lys Lys Glu Lys Met Lys Glu Thr Glu Glu Gly Cys
        275                 280                 285

Asn Gln Lys Gly Ala Phe Leu Val Glu Lys Thr Ser Thr Glu Val Gln
    290                 295                 300

Cys Lys Gly Gly Asn Val Cys Val Gln Ala Gln Asp Arg Tyr Tyr Asn
305                 310                 315                 320

Ser Ser Cys Ser Lys Trp Ala Cys Val Pro Cys Arg Val Arg Ser Leu
                325                 330                 335

```
Leu Gly Gly Gly Gly Ser Gly Gly Gly Ser Gly Gly Gly Ser
            340                 345                 350

Thr Glu Thr Ala Leu Val Ala Leu Ser Gln Pro Arg Val Gln Cys His
        355                 360                 365

Ala Ser Arg Tyr Pro Val Ala Val Asp Cys Ser Trp Thr Pro Leu Gln
    370                 375                 380

Ala Pro Asn Ser Thr Arg Ser Thr Ser Phe Ile Ala Thr Tyr Arg Leu
385                 390                 395                 400

Gly Val Ala Thr Gln Gln Ser Gln Pro Cys Leu Gln Arg Ser Pro
                405                 410                 415

Gln Ala Ser Arg Cys Thr Ile Pro Asp Val His Leu Phe Ser Thr Val
            420                 425                 430

Pro Tyr Met Leu Asn Val Thr Ala Val His Pro Gly Gly Ala Ser Ser
            435                 440                 445

Ser Leu Leu Ala Phe Val Ala Glu Arg Ile Ile Lys Pro Asp Pro Pro
    450                 455                 460

Glu Gly Val Arg Leu Arg Thr Ala Gly Gln Arg Leu Gln Val Leu Trp
465                 470                 475                 480

His Pro Pro Ala Ser Trp Pro Phe Pro Asp Ile Phe Ser Leu Lys Tyr
                485                 490                 495

Arg Leu Arg Tyr Arg Arg Arg Gly Ala Ser His Phe Arg Gln Val Gly
            500                 505                 510

Pro Ile Glu Ala Thr Thr Phe Thr Leu Arg Asn Ser Lys Pro His Ala
        515                 520                 525

Lys Tyr Cys Ile Gln Val Ser Ala Gln Asp Leu Thr Asp Tyr Gly Lys
    530                 535                 540

Pro Ser Asp Trp Ser Leu Pro Gly Gln Val Glu Ser Ala Pro His Lys
545                 550                 555                 560

<210> SEQ ID NO 7
<211> LENGTH: 2410
<212> TYPE: DNA
<213> ORGANISM: Artificial Sequence
<220> FEATURE:
<223> OTHER INFORMATION: p40-EBi3-Fc complex

<400> SEQUENCE: 7
agcttagtgg gatgtgtcct cagaagctaa ccatctcctg gtttgccatc gttttgctgg      60
tgtctccact catggccatg tgggagctgg agaaagacgt ttatgttgta gaggtggact     120
ggactcccga tgcccctgga gaaacagtga acctcacctg tgacacgcct gaagaagatg     180
acatcacctg gacctcagac cagagacatg gagtcatagg ctctggaaag accctgacca     240
tcactgtcaa agagtttcta gatgctggcc agtacacctg ccacaaagga gcgagactc     300 tgagccactc acatctgctg ctccacaaga ggaaaatgg aatttggtcc actgaaattt     360
taaaaatttc aaaaacaag actttcctga agtgtgaagc accaaattac tccggacggt     420
tcacgtgctc atggctggtg caaagaaaca tggacttgaa gttcaacatc aagagcagta     480
gcagttcccc tgactctcgg gcagtgacat gtggaatggc gtctctgtct gcagagaagg     540
tcacactgga ccaaagggac tatgagaagt attcagtgtc ctgccaggag gatgtcacct     600
gcccaactgc cgaggagacc ctgcccattg aactggcgtt ggaagcacgg cagcagaata     660
aatatgagaa ctacagcacc agcttcttca tcagggacat catcaaacca gacccgccca     720
agaacttgca gatgaagcct ttgaagaact cacaggtgga ggtcagctgg gagtaccctg     780
```

-continued

```
actcctggag cactccccat tcctacttct ccctcaagtt ctttgttcga atccagcgca    840
agaaagaaaa gatgaaggag acagaggagg ggtgtaacca gaaaggtgcg ttcctcgtag    900
agaagacatc taccgaagtc caatgcaaag gcgggaatgt ctgcgtgcaa gctcaggatc    960
gctattacaa ttcctcatgc agcaagtggg catgtgttcc ctgcagggtc cgatccaagc   1020
ttggcggcgg cggctctggc ggcggcggct ctggcggcgg cggctctact gaaacagctc   1080
tcgtggctct aagccagccc agagtgcaat gccatgcttc tcggtatccc gtggccgtgg   1140
actgctcctg gactcctctc caggctccca actccaccag atccacgtcc ttcattgcca   1200
cttacaggct cggtgtggcc acccagcagc agagccagcc ctgcctacaa cggagccccc   1260
aggcctcccg atgcaccatc cccgacgtgc acctgttctc cacggtgccc tacatgctaa   1320
atgtcactgc agtgcaccca gcggcgcca gcagcagcct cctagccttt gtggctgagc   1380
gaatcatcaa gccggaccct ccggaaggcg tgcgcctgcg cacagcggga cagcgcctgc   1440
aggtgctctg gcatcccct gcttcctggc ccttcccgga catcttctct ctcaagtacc   1500
gactccgcta ccggcgccga ggagcctctc acttccgcca ggtgggaccc attgaagcca   1560
cgactttcac cctcaggaac tcgaaacccc atgccaagta ttgcatccag gtgtcagctc   1620
aggacctcac agattatggg aaaccaagtg actggagcct ccctgggcaa gtagaaagtg   1680
caccccataa ggcggccgcg gacaagaaaa ttgtgcccag ggattgtggt tgtaagcctt   1740
gcatatgtac agtcccagaa gtatcatctg tcttcatctt ccccccaaag cccaaggatg   1800
tgctcaccat tactctgact cctaaggtca cgtgtgttgt ggtagacatc agcaaggatg   1860
atcccgaggt ccagttcagc tggtttgtag atgatgtgga ggtgcacaca gctcagacaa   1920
aaccccggga ggagcagttc aacagcactt tccgttcagt cagtgaactt cccatcatgc   1980
accaggactg gctcaatggc aaggagttca atgcagggt caacagtgca gctttccctg   2040
cccccatcga gaaaaccatc tccaaaacca aggcagacc gaaggctcca caggtgtaca   2100
ccattccacc tcccaaggag cagatggcca aggataaagt cagtctgacc tgcatgataa   2160
cagacttctt ccctgaagac attactgtgg agtggcagtg gaatgggcag ccagcggaga   2220
actacaagaa cactcagccc atcatggaca cagatggctc ttacttcgtc tacagcaagc   2280
tcaatgtgca gaagagcaac tgggaggcag gaaatacttt cacctgctct gtgttacatg   2340
agggcctgca caaccaccat actgagaaga gcctctccca ctctcctggt aaatgatccc   2400
aggcggccgc                                                         2410
```

<210> SEQ ID NO 8
<211> LENGTH: 2411
<212> TYPE: DNA
<213> ORGANISM: Artificial Sequence
<220> FEATURE:
<223> OTHER INFORMATION: p40-EBi3-Fc complex

<400> SEQUENCE: 8

```
aagcttagtg ggatgtgccc ccagaagctg accatcagct ggttcgccat cgtgctgctg     60
gtgagccccc tgatggccat gtgggagctg gagaaggacg tgtacgtggt ggaggtggac    120
tggacccccg atgccccccgg cgagaccgtg aacctgacct cgacaccccc cgaggaggac    180
gacatcacct ggaccagcga ccagagacac ggcgtgatcg gcagcggcaa gaccctgacc    240
atcaccgtga aggagttcct ggacgccggc cagtacacct gccacaaggg cggcgagacc    300
ctgagccaca gccacctgct gctgcacaag aaggagaacg gcatctggag caccgagatc    360
ctgaagaact tcaagaacaa gaccttcctg aagtgcgagg cccccaacta cagcggcaga    420
```

```
ttcacctgca gctggctggt gcagagaaac atggacctga agttcaacat caagtctagc    480
tccagcagcc ccgacagcag agccgtgacc tgcggcatgg ccagcctgag cgccgagaag    540
gtgaccctgg accagagaga ctacgagaag tacagcgtga gctgccagga ggacgtgacc    600
tgccccaccg ccgaggagac cctgcccatc gagctggccc tggaggccag acagcagaac    660
aagtacgaga actacagcac cagcttcttc atcagagaca tcatcaagcc cgaccctccc    720
aagaacctgc agatgaagcc cctgaagaac agccaggtgg aggtgagctg ggagtacccc    780
gacagctgga gcaccccca cagctacttc agcctgaagt tctttgtgag aatccagaga    840
aagaaggaga agatgaagga gaccgaggag ggctgcaacc agaagggcgc cttcctggtg    900
gagaagacca gcaccgaggt gcagtgcaag ggcggcaacg tgtgcgtgca ggcccaggac    960
agatactaca cagcagctg cagcaagtgg gcctgcgtgc cctgcagagt gagaagcaag   1020
cttggaggcg aggttctgg tggaggcgga agtggcggag gaggttctac agagaccgct   1080
ctggtggccc tgagccagcc cagagtgcag tgccacgcca gcagataccc cgtggccgtg   1140
gactgcagtt ggacccccct gcaggctccc aacagcacca gaagcaccag cttcatcgct   1200
acctacagac tgggagtggc tacccagcaa cagagccagc cctgcctgca gagaagcccc   1260
caggccagca gatgcaccat ccccgacgtg cacctgttca gcaccgtgcc ctacatgctg   1320
aacgtgaccg ccgtgcaccc cggaggtgcc agctccagcc tgctggcctt cgtggccgag   1380
agaatcatca agcccgaccc tcccgagggc gtgagactga gaaccgccgg acagagactg   1440
caggtgctgt ggcacccacc cgccagttgg cccttccccg acatcttcag cctgaagtac   1500
agactgagat acagacggag aggagccagc cacttcagac aggtgggacc catcgaggcc   1560
acaaccttca ccctgagaaa cagcaagccc acgccaagt actgcatcca ggtgagcgcc   1620
caggacctga ccgactacgg caagcccagc gactggagcc tgcccggaca ggtggagagc   1680 gccctcaca aggcggccgc ggacaagaag atcgtgccca gagactgcgg ctgcaagccc   1740
tgcatctgca ccgtgcccga ggtgagcagc gtgttcatct ccctcccaa gcccaaggac   1800 gtgctgacca tcaccctgac ccccaaggtg acctgcgtgg tggtggacat cagcaaggac   1860 gacccccgagg tgcagttcag ctggttcgtg gacgacgtgg aggtgcacac cgcccagacc   1920
aagcccagag aggagcagtt caacagcacc ttcagaagcg tgagcgagct gcccatcatg   1980
caccaggact ggctgaacgg caaggagttc aagtgcagag tgaacagcgc tgccttcccc   2040
gctcccatcg agaagaccat cagcaagacc aagggcagac ccaaggcccc ccaggtgtac   2100
accatccccc ctcccaagga gcagatggcc aaggacaagg tgagcctgac ctgcatgatc   2160
accgacttct tcccgagga catcaccgtg gagtggcagt ggaacggcca gcccgccgag   2220
aactacaaga cacccagcc catcatggac accgacggca gctacttcgt gtacagcaag   2280
ctgaacgtgc agaagagcaa ctgggaggcc ggcaacacct tcacctgcag cgtgctgcac   2340
gagggcctgc acaaccacca caccgagaag agcctgagcc acagcccgg caagtgatcc   2400 caggcggccg c                                                       2411
```

<210> SEQ ID NO 9
<211> LENGTH: 794
<212> TYPE: PRT
<213> ORGANISM: Artificial Sequence
<220> FEATURE:
<223> OTHER INFORMATION: p40-EBi3-Fc complex

<400> SEQUENCE: 9

```
Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
            20                  25                  30

Val Glu Val Asp Trp Thr Pro Asp Ala Pro Gly Glu Thr Val Asn Leu
            35                  40                  45

Thr Cys Asp Thr Pro Glu Glu Asp Asp Ile Thr Trp Thr Ser Asp Gln
50                  55                  60

Arg His Gly Val Ile Gly Ser Gly Lys Thr Leu Thr Ile Thr Val Lys
65                  70                  75                  80

Glu Phe Leu Asp Ala Gly Gln Tyr Thr Cys His Lys Gly Gly Glu Thr
                85                  90                  95

Leu Ser His Ser His Leu Leu Leu His Lys Lys Glu Asn Gly Ile Trp
            100                 105                 110

Ser Thr Glu Ile Leu Lys Asn Phe Lys Asn Lys Thr Phe Leu Lys Cys
            115                 120                 125

Glu Ala Pro Asn Tyr Ser Gly Arg Phe Thr Cys Ser Trp Leu Val Gln
            130                 135                 140

Arg Asn Met Asp Leu Lys Phe Asn Ile Lys Ser Ser Ser Ser Ser Pro
145                 150                 155                 160

Asp Ser Arg Ala Val Thr Cys Gly Met Ala Ser Leu Ser Ala Glu Lys
                165                 170                 175

Val Thr Leu Asp Gln Arg Asp Tyr Glu Lys Tyr Ser Val Ser Cys Gln
            180                 185                 190

Glu Asp Val Thr Cys Pro Thr Ala Glu Glu Thr Leu Pro Ile Glu Leu
            195                 200                 205

Ala Leu Glu Ala Arg Gln Gln Asn Lys Tyr Glu Asn Tyr Ser Thr Ser
            210                 215                 220

Phe Phe Ile Arg Asp Ile Ile Lys Pro Asp Pro Lys Asn Leu Gln
225                 230                 235                 240

Met Lys Pro Leu Lys Asn Ser Gln Val Glu Val Ser Trp Glu Tyr Pro
            245                 250                 255

Asp Ser Trp Ser Thr Pro His Ser Tyr Phe Ser Leu Lys Phe Phe Val
            260                 265                 270

Arg Ile Gln Arg Lys Lys Glu Lys Met Lys Glu Thr Glu Glu Gly Cys
            275                 280                 285

Asn Gln Lys Gly Ala Phe Leu Val Glu Lys Thr Ser Thr Glu Val Gln
            290                 295                 300

Cys Lys Gly Gly Asn Val Cys Val Gln Ala Gln Asp Arg Tyr Tyr Asn
305                 310                 315                 320

Ser Ser Cys Ser Lys Trp Ala Cys Val Pro Cys Arg Val Arg Ser Leu
                325                 330                 335

Leu Gly Gly Gly Gly Ser Gly Gly Gly Ser Gly Gly Gly Gly Ser
            340                 345                 350

Thr Glu Thr Ala Leu Val Ala Leu Ser Gln Pro Arg Val Gln Cys His
            355                 360                 365

Ala Ser Arg Tyr Pro Val Ala Val Asp Cys Ser Trp Thr Pro Leu Gln
            370                 375                 380

Ala Pro Asn Ser Thr Arg Ser Thr Ser Phe Ile Ala Thr Tyr Arg Leu
385                 390                 395                 400

Gly Val Ala Thr Gln Gln Ser Gln Pro Cys Leu Gln Arg Ser Pro
            405                 410                 415

Gln Ala Ser Arg Cys Thr Ile Pro Asp Val His Leu Phe Ser Thr Val
```

```
                    420             425             430
Pro Tyr Met Leu Asn Val Thr Ala Val His Pro Gly Gly Ala Ser Ser
                435             440             445

Ser Leu Leu Ala Phe Val Ala Glu Arg Ile Ile Lys Pro Asp Pro Pro
450             455             460

Glu Gly Val Arg Leu Arg Thr Ala Gly Gln Arg Leu Gln Val Leu Trp
465             470             475             480

His Pro Pro Ala Ser Trp Pro Phe Pro Asp Ile Phe Ser Leu Lys Tyr
                485             490             495

Arg Leu Arg Tyr Arg Arg Gly Ala Ser His Phe Arg Gln Val Gly
                500             505             510

Pro Ile Glu Ala Thr Thr Phe Thr Leu Arg Asn Ser Lys Pro His Ala
                515             520             525

Lys Tyr Cys Ile Gln Val Ser Ala Gln Asp Leu Thr Asp Tyr Gly Lys
                530             535             540

Pro Ser Asp Trp Ser Leu Pro Gly Gln Val Glu Ser Ala Pro His Lys
545             550             555             560

Ala Ala Ala Asp Lys Lys Ile Val Pro Arg Asp Cys Gly Cys Lys Pro
                565             570             575

Cys Ile Cys Thr Val Pro Glu Val Ser Ser Val Phe Ile Phe Pro Pro
                580             585             590

Lys Pro Lys Asp Val Leu Thr Ile Thr Leu Thr Pro Lys Val Thr Cys
                595             600             605

Val Val Val Asp Ile Ser Lys Asp Asp Pro Glu Val Gln Phe Ser Trp
                610             615             620

Phe Val Asp Asp Val Glu Val His Thr Ala Gln Thr Lys Pro Arg Glu
625             630             635             640

Glu Gln Phe Asn Ser Thr Phe Arg Ser Val Ser Glu Leu Pro Ile Met
                645             650             655

His Gln Asp Trp Leu Asn Gly Lys Glu Phe Lys Cys Arg Val Asn Ser
                660             665             670

Ala Ala Phe Pro Ala Pro Ile Glu Lys Thr Ile Ser Lys Thr Lys Gly
                675             680             685

Arg Pro Lys Ala Pro Gln Val Tyr Thr Ile Pro Pro Lys Glu Gln
                690             695             700

Met Ala Lys Asp Lys Val Ser Leu Thr Cys Met Ile Thr Asp Phe Phe
705             710             715             720

Pro Glu Asp Ile Thr Val Glu Trp Gln Trp Asn Gly Gln Pro Ala Glu
                725             730             735

Asn Tyr Lys Asn Thr Gln Pro Ile Met Asp Thr Asp Gly Ser Tyr Phe
                740             745             750

Val Tyr Ser Lys Leu Asn Val Gln Lys Ser Asn Trp Glu Ala Gly Asn
                755             760             765

Thr Phe Thr Cys Ser Val Leu His Glu Gly Leu His Asn His His Thr
                770             775             780

Glu Lys Ser Leu Ser His Ser Pro Gly Lys
785                 790

<210> SEQ ID NO 10
<211> LENGTH: 1716
<212> TYPE: DNA
<213> ORGANISM: Artificial Sequence
<220> FEATURE:
<223> OTHER INFORMATION: human p40-EBi3 complex
```

<400> SEQUENCE: 10

```
atgtgtcacc agcagttggt catctcttgg ttttccctgg tttttctggc atctcccctc      60
gtggccatat gggaactgaa gaaagatgtt tatgtcgtag aattggattg gtatccggat     120
gcccctggag aaatggtggt cctcacctgt gacacccctg aagaagatgg tatcacctgg     180
accttggacc agagcagtga ggtcttaggc tctggcaaaa ccctgaccat ccaagtcaaa     240
gagtttggag atgctggcca gtacacctgt cacaaggag  gcgaggttct aagccattcg     300
ctcctgctgc ttcacaaaaa ggaagatgga atttggtcca ctgatatttt aaaggaccag     360
aaagaaccca aaaataagac ctttctaaga tgcgaggcca agaattattc tggacgtttc     420
acctgctggt ggctgacgac aatcagtact gatttgacat tcagtgtcaa aagcagcaga     480
ggctcttctg acccccaagg ggtgacgtgc ggagctgcta cactctctgc agagagagtc     540
agagggaca  acaaggagta tgagtactca gtggagtgcc aggaggacag tgcctgccca     600
gctgctgagg agagtctgcc cattgaggtc atggtggatg ccgttcacaa gctcaagtat     660
gaaaactaca ccagcagctt cttcatcagg gacatcatca aacctgaccc acccaagaac     720
ttgcagctga agccattaaa gaattctcgg caggtggagg tcagctggga gtaccctgac     780
acctggagta ctccacattc ctacttctcc ctgacattct gcgttcaggt ccagggcaag     840
agcaagagag aaaagaaaga tagagtcttc acggacaaga cctcagccac ggtcatctgc     900
cgcaaaaatg ccagcattag cgtgcgggcc caggaccgct actatagctc atcttggagc     960
gaatgggcat ctgtgccctg cagtggaggc ggaggttctg gtggaggcgg aagtggcgga    1020
ggaggttcta tgaccccgca gcttctcctg gcccttgtcc tctgggccag ctgcccgccc    1080
tgcagtggaa ggaaagggcc cccagcagct ctgacactgc cccgggtgca atgccgagcc    1140
tctcggtacc cgatcgccgt ggattgctcc tggacccctgc cgcctgctcc aaactccacc    1200
agccccgtgt ccttcattgc cacgtacagg ctcggcatgg ctgcccgggg ccacagctgg    1260
ccctgcctgc agcagacgcc aacgtccacc agctgcacca tcacggatgt ccagctgttc    1320
tccatggctc cctacgtgct caatgtcacc gccgtccacc cctgggctc  cagcagcagc    1380
ttcgtgcctt tcataacaga gcacatcatc aagcccgacc ctccagaagg cgtgcgccta    1440
agcccctcg  ctgagcgcca gctacaggtg cagtgggagc ctcccgggtc ctggccttc     1500
ccagagatct tctcactgaa gtactggatc cgttacaagc gtcagggagc tgcgcgcttc    1560
caccgggtgg ggcccattga agccacgtcc ttcatcctca gggctgtgcg gccccgagcc    1620
aggtactacg tccaagtggc ggctcaggac ctcacagact acgggga act  gagtgactgg    1680
agtctccccg ccactgccac aatgagcctg ggcaag                              1716
```

<210> SEQ ID NO 11
<211> LENGTH: 1788
<212> TYPE: DNA
<213> ORGANISM: Artificial Sequence
<220> FEATURE:
<223> OTHER INFORMATION: human p40-EBi3 complex

<400> SEQUENCE: 11

```
atgtgccatc agcagctcgt catttcctgg ttcagcctgg tgttcctcgc aagtccactg      60
gtcgctattt gggagctcaa gaaagacgtg tacgtggtcg agctggactg gtatccagat     120
gcccccgggg aaatggtggt cctgacttgc gacacccctg aggaagatgg tatcacatgg     180
actctggacc agagctccga agtgctcggc tccggaaaga ccctgacaat tcaggtcaaa     240
gagttcgggg atgctggcca gtacacatgt cacaagggcg agaagtgct  gagccactcc     300
```

```
ctgctcctgc tccataagaa agaggacggc atctggtcca cagacattct caaggatcag    360
aaagagccaa agaacaaaac tttcctgcga tgcgaagcca agaattactc tggaaggttt    420
acctgttggt ggctcaccac aatctcaaca gacctgactt tcagcgtgaa gtctagtcgc    480
gggtcatctg atccacaggg agtcacatgt ggagcagcta ctctgagcgc cgagagggtg    540
agaggcgaca acaaggagta cgaatatagc gtcgagtgcc aggaagattc cgcttgtccc    600
gcagccgagg aatccctccc tatcgaggtc atggtggacg cagtgcacaa gctgaaatac    660
gaaaactaca tcctcttt ctttattcgc gacatcatta agcctgatcc ccctaaaaac     720
ctccagctga agccactgaa aaattccagg caggtcgagg tgtcttggga atacccagat    780
acctggagca cacccatag ctatttctcc ctgacctttt gcgtccaggt gcagggcaag     840
agtaaacgcg agaagaaaga ccgagtgttc actgataaga cctccgccac agtcatctgt    900
cggaaaaacg catctattag tgtgagagcc caggaccggt actatagttc aagctggtcc    960
gagtgggctt ctgtgccttg tagtgaattc ggggtggcg gatccggagg tggaggatct    1020
ggaggtggag gatccatgac cccacagctg ctcctggctc tcgtgctgtg gcatcttgc    1080 ccaccctgta gtggccgcaa gggacctcca gctgcactca cactgccccg agtgcagtgc    1140
agggctagta gatacccatat cgcagtcgat tgttcatgga ctctgccccc tgcacccaac    1200
tcaaccagcc ccgtgagctt catcgccaca taggctgg ggatggccgc tagaggtcac      1260
agctggcctt gcctgcagca gactccaacc tccacatctt gtactatcac cgacgtgcag    1320
ctcttttcta tggccccta cgtcctgaat gtgactgctg tccacccatg gggctcctct    1380
agttcattcg tgcccttat taccgagcat atcattaagc ctgatccacc cgaaggcgtg    1440
cggctcagcc ctctggctga gacagctg caggtccagt gggaacctcc aggatcatgg     1500
ccattccccg aaatctttag cctgaagtac tggattcggt ataaagaca gggagcagca    1560 agattccaca gggtgggacc aatcgaggcc acatccttta ttctgagggc cgtgcggcca    1620
cgcgctcgat actatgtcca ggtggctgca caggacctga ctgattacgg ggagctctct    1680
gactggagtc tgccagccac agctactatg tctctcggga gcagggtct cgaggaaccc     1740 aagagttgcg ataaaaccca tacatgcccc ccttgtcctg ccccagaa                 1788
```

<210> SEQ ID NO 12
<211> LENGTH: 572
<212> TYPE: PRT
<213> ORGANISM: Artificial Sequence
<220> FEATURE:
<223> OTHER INFORMATION: human p40-EBi3 complex

<400> SEQUENCE: 12

```
Met Cys His Gln Gln Leu Val Ile Ser Trp Phe Ser Leu Val Phe Leu
1               5                   10                  15

Ala Ser Pro Leu Val Ala Ile Trp Glu Leu Lys Lys Asp Val Tyr Val
                20                  25                  30

Val Glu Leu Asp Trp Tyr Pro Asp Ala Pro Gly Glu Met Val Val Leu
            35                  40                  45

Thr Cys Asp Thr Pro Glu Glu Asp Gly Ile Thr Trp Thr Leu Asp Gln
        50                  55                  60

Ser Ser Glu Val Leu Gly Ser Gly Lys Thr Leu Thr Ile Gln Val Lys
65                  70                  75                  80

Glu Phe Gly Asp Ala Gly Gln Tyr Thr Cys His Lys Gly Gly Glu Val
                85                  90                  95
```

-continued

Leu Ser His Ser Leu Leu Leu His Lys Lys Glu Asp Gly Ile Trp
            100                 105                 110

Ser Thr Asp Ile Leu Lys Asp Gln Lys Glu Pro Lys Asn Lys Thr Phe
    115                 120                 125

Leu Arg Cys Glu Ala Lys Asn Tyr Ser Gly Arg Phe Thr Cys Trp Trp
130                 135                 140

Leu Thr Thr Ile Ser Thr Asp Leu Thr Phe Ser Val Lys Ser Ser Arg
145                 150                 155                 160

Gly Ser Ser Asp Pro Gln Gly Val Thr Cys Gly Ala Ala Thr Leu Ser
                165                 170                 175

Ala Glu Arg Val Arg Gly Asp Asn Lys Glu Tyr Glu Tyr Ser Val Glu
            180                 185                 190

Cys Gln Glu Asp Ser Ala Cys Pro Ala Ala Glu Glu Ser Leu Pro Ile
        195                 200                 205

Glu Val Met Val Asp Ala Val His Lys Leu Lys Tyr Glu Asn Tyr Thr
    210                 215                 220

Ser Ser Phe Phe Ile Arg Asp Ile Ile Lys Pro Asp Pro Pro Lys Asn
225                 230                 235                 240

Leu Gln Leu Lys Pro Leu Lys Asn Ser Arg Gln Val Glu Val Ser Trp
                245                 250                 255

Glu Tyr Pro Asp Thr Trp Ser Thr Pro His Ser Tyr Phe Ser Leu Thr
            260                 265                 270

Phe Cys Val Gln Val Gln Gly Lys Ser Lys Arg Glu Lys Lys Asp Arg
        275                 280                 285

Val Phe Thr Asp Lys Thr Ser Ala Thr Val Ile Cys Arg Lys Asn Ala
    290                 295                 300

Ser Ile Ser Val Arg Ala Gln Asp Arg Tyr Tyr Ser Ser Ser Trp Ser
305                 310                 315                 320

Glu Trp Ala Ser Val Pro Cys Ser Gly Gly Gly Ser Gly Gly Gly
                325                 330                 335

Gly Ser Gly Gly Gly Gly Ser Met Thr Pro Gln Leu Leu Leu Ala Leu
            340                 345                 350

Val Leu Trp Ala Ser Cys Pro Pro Cys Ser Gly Arg Lys Gly Pro Pro
        355                 360                 365

Ala Ala Leu Thr Leu Pro Arg Val Gln Cys Arg Ala Ser Arg Tyr Pro
    370                 375                 380

Ile Ala Val Asp Cys Ser Trp Thr Leu Pro Pro Ala Pro Asn Ser Thr
385                 390                 395                 400

Ser Pro Val Ser Phe Ile Ala Thr Tyr Arg Leu Gly Met Ala Ala Arg
                405                 410                 415

Gly His Ser Trp Pro Cys Leu Gln Gln Thr Pro Thr Ser Thr Ser Cys
            420                 425                 430

Thr Ile Thr Asp Val Gln Leu Phe Ser Met Ala Pro Tyr Val Leu Asn
        435                 440                 445

Val Thr Ala Val His Pro Trp Gly Ser Ser Ser Ser Phe Val Pro Phe
    450                 455                 460

Ile Thr Glu His Ile Ile Lys Pro Asp Pro Pro Glu Gly Val Arg Leu
465                 470                 475                 480

Ser Pro Leu Ala Glu Arg Gln Leu Gln Val Gln Trp Glu Pro Pro Gly
                485                 490                 495

Ser Trp Pro Phe Pro Glu Ile Phe Ser Leu Lys Tyr Trp Ile Arg Tyr
            500                 505                 510

Lys Arg Gln Gly Ala Ala Arg Phe His Arg Val Gly Pro Ile Glu Ala

```
            515                 520                 525
Thr Ser Phe Ile Leu Arg Ala Val Arg Pro Arg Ala Arg Tyr Tyr Val
    530                 535                 540

Gln Val Ala Ala Gln Asp Leu Thr Asp Tyr Gly Glu Leu Ser Asp Trp
545                 550                 555                 560

Ser Leu Pro Ala Thr Ala Thr Met Ser Leu Gly Lys
                565                 570
```

CYTOKINES AND USE THEREOF

CROSS REFERENCE TO RELATED APPLICATIONS

This application is a National Stage of Application No. PCT/KR2019/018214 filed Dec. 20, 2019, claiming priority based on Korean Patent Application No. 10-2018-0167857 filed Dec. 21, 2018, the entire disclosures of which are incorporated herein by reference.

TECHNICAL FIELD

The present invention relates to a complex formed by linking a p40 subunit and an EBI3 subunit by a linker, a polypeptide encoding the complex, a vector including the polypeptide, and a use for the prevention or treatment of immune diseases thereof.

BACKGROUND ART

As the family of cytokine IL-12, IL-12, IL-23, IL-27, and IL-35 are important regulators of inflammatory diseases as well as mediate T cell-dependent immunity. Each of these is in the form of a heterodimeric complex composed of two subunits whose expression is independently regulated. IL-12 is a heterodimeric protein form formed by linking two polypeptide subunits of p35 and p40 by disulfide bonds, of which the p40 subunit can exist as a homodimer and a monomer and act as an antagonist of IL-12 function. IL-23 is a heterodimer composed of p40 and p19, and IL-27 is a heterodimer composed of EBI3 (Epstein-Barr virus-induced gene 3) and p28. IL-35 is the most recently identified cytokine member, consisting of p35 and EBI3.

EBI3 (Epstein-Barr virus-induced gene 3), also known as IL-27 subunit beta (IL-27β), is a protein which is encoded by the EBI3 gene. It is a member of the hematopoietin receptor family related to the p40 subunit of IL-12 and is secreted by glycoproteins. EBI3 exists as a subunit of IL27 and IL35, and the formation of a heterodimeric complex with several subunits has been studied.

DISCLOSURE

Technical Problem

An object of the present invention is to provide a complex formed by linking the p40 subunit and the EBI3 subunit by a linker.

Another object of the present invention is to provide a polynucleotide including a gene sequence encoding the complex, a vector including the same, and a host cell including the vector.

Another object of the present invention is to provide a pharmaceutical composition for preventing or treating immune diseases including the complex.

Another object of the present invention is to provide a standard protein complex for quantitative analysis of the p40 subunit and EBI3 subunit complex including the complex.

Another object of the present invention is to provide a kit for detecting the p40 subunit and EB13 subunit complex.

Another object of the present invention is to provide a kit for quantifying the p40 subunit and EB13 subunit complex.

Another object of the present invention is to provide a method for preventing and treating immune diseases, including administering the pharmaceutical composition to an individual.

Technical Solution

In order to achieve the above object, the present invention provides a complex formed by linking the p40 subunit and the EBI3 subunit by a linker.

In one embodiment of the present invention, the complex may include an amino acid sequence selected from the group consisting of amino acid sequences represented by SEQ ID NOs: 2, 4, 6 and 12.

In one embodiment of the present invention, the complex may be encoded by a polynucleotide sequence selected from the group consisting of polynucleotide sequences represented by SEQ ID NOs: 1, 3, 5, 10 and 11.

In one embodiment of the present invention, the linker may be used without limitation as long as it is a linker commonly used to link amino acids in the art. For example, the linker may be a suitable amino acid sequence, for example, an amino acid sequence of 1 to 50, preferably 1 to 30, such as 1 to 10 amino acid residues. An example of the linker may include a gly-ser linker.

In one embodiment of the present invention, the complex may further include an immunoglobulin moiety, for example, an Fc fragment. The Fc fragment may be a fragment of human IgG1, IgG2, IgG3, and IgD, but may not be limited thereto. The immunoglobulin moiety may be linked to the EBI3 subunit. The complex further including the immunoglobulin moiety may have an amino acid sequence represented by SEQ ID NO: 9 and may be encoded by a polynucleotide sequence represented by SEQ ID NO: 7 or 8.

Further, the present invention provides a polynucleotide including a gene sequence selected from the group consisting of SEQ ID NOs: 1, 3, 5, 7, 8, 10 and 11, encoding a p40 subunit-EBI3 subunit complex or a p40 subunit-EBI3 subunit-immunoglobulin moiety complex.

Further, the present invention provides a vector including the polynucleotide and a host cell including the vector.

Further, the present invention provides a pharmaceutical composition for the prevention or treatment of immune disease, the composition including the p40 subunit-EBI3 subunit complex or the p40 subunit-EB13 subunit-immunoglobulin moiety complex, and a pharmaceutical composition for the prevention or treatment of immune diseases, the composition including a vector including the complex according to the present invention.

In one embodiment of the present invention, the immune disease may be selected from the group consisting of rheumatoid arthritis, ankylosing spondylitis, experimental autoimmune encephalomyelitis, post transplantation late and chronic solid organ rejection, skin sclerosis, psoriasis, Sjogren's syndrome, inflammatory bowel disease and graft-versus-host disease.

In addition, the present invention provides a standard protein complex for quantitative analysis of the p40 subunit and EBI3 subunit complex including the complex of the present invention.

In addition, the present invention provides a kit for detecting the p40 subunit and EBI3 subunit complex.

In one embodiment of the present invention, the agent measured at the protein level may be selected from the group consisting of an antibody, antibody fragment, aptamer, avidity multimer, and peptidomimetics, that specifically recognizes the full length or fragment of the protein of the p40 subunit and EBI3 subunit complex.

The measurement may be performed by a method selected from the group consisting of Western blot, enzyme linked immunosorbent assay (ELISA), sandwich enzyme linked immunosorbent assay (Sandwich ELISA), radioimmunoassay (RIA), radioimmunodiffusion, immunoelectrophoresis, tissue immunostaining, immunoprecipitation assay, complement fixation assay, FACS, mass spectrometry and protein microarray.

Further, the present invention provides a kit for quantifying the p40 subunit and EBI3 subunit complex.

In addition, the present invention provides a method for preventing and treating immune diseases, the method including administering the pharmaceutical composition to an individual.

Advantageous Effects

The p40 subunit-EBI3 subunit complex according to the present invention is a novel cytokine immunocomplex, exhibits high anti-inflammatory effect compared to conventional heterodimeric cytokines, and has an excellent immunomodulatory function, thereby effectively preventing and treating immune diseases.

DESCRIPTION OF DRAWINGS

FIG. 1 is a schematic diagram of a DNA vector encoding (A of FIG. 1) natural form (B of FIG. 1), an optimized form of p40 subunit-EBI3 subunit complex (opt1), and (C of FIG. 1) p40 subunit-EBI3 subunit/Fc fragment complex (opt2) according to an embodiment of the present invention.

FIGS. 2A and 2B are a nucleotide sequence (SEQ ID NO: 1) and an amino acid sequence thereof (SEQ ID NO: 2), respectively, encoding a natural p40 subunit-EBI3 subunit complex according to an embodiment of the present invention.

FIGS. 3A and 3B are a nucleotide sequence (SEQ ID NO: 3) and an amino acid sequence thereof (SEQ ID NO: 4), respectively, encoding the p40 subunit-EBI3 subunit complex (opt1) in an optimized form according to an embodiment of the present invention.

FIGS. 4A and 4B are a nucleotide sequence (SEQ ID NO: 5) and an amino acid sequence thereof (SEQ ID NO: 6), respectively, encoding the p40 subunit-EBI3 subunit complex (opt2) in an optimized form according to an embodiment of the present invention.

FIGS. 5A, 5B and 5C are nucleotide sequences (a and b) (SEQ ID NOs: 7 and 8) and an amino acid sequence thereof (c) (SEQ ID NO: 9), respectively, encoding the p40 subunit-EBI3 subunit/Fc fragment complex (opt2) in an optimized form according to an embodiment of the present invention.

FIGS. 6A, 6B and 6C are nucleotide sequences (a and b) (SEQ ID NOs: 10 and 11) and an amino acid sequence thereof (c) (SEQ ID NO: 12), respectively, encoding the p40 subunit-EBI3 subunit fragment complex in an optimized form according to an embodiment of the present invention.

FIG. 7 is an ELISA result of confirming whether the p40 subunit-EBI3 subunit complex is generated in mouse DC cells in an embodiment of the present invention.

FIG. 8 is a result of confirming whether the p40 subunit-EBI3 subunit complex is overexpressed by constructing a transformation vector in a natural form in an embodiment of the present invention.

FIG. 14 shows the structure of a vector (a) for constructing an overexpressing mouse of the p40 subunit-EBI3 subunit complex (opt1) and images confirming whether it is overexpressed (b and c) in an embodiment of the present invention.

FIG. 19 shows the effect of modulating transplant rejection disease (GvHD) in mice overexpressing the p40 subunit-EBI3 subunit complex (opt1) in an embodiment of the present invention.

FIG. 20 shows the effect of modulating autoimmune encephalomyelitis (BAE) in mice overexpressing the p40 subunit-EBI3 subunit complex (opt1) in an embodiment of the present invention.

FIG. 21A shows the effect of modulating inflammatory bowel disease (IBD) in mice overexpressing the p40 subunit-EBI3 subunit complex (opt1) in an embodiment of the present invention.

FIG. 23 shows the type II collagen specific autoantibody inhibitory effect of the p40 subunit-EBI3 subunit/Fc fragment complex (opt2) in an autoimmune arthritis animal model in an embodiment of the present invention.

FIG. 24 is a graph showing the inhibitory effect on the proliferation of T cells by the p40 subunit-EBI3 subunit/Fc fragment complex (opt2) in an autoimmune arthritis animal model in an embodiment of the present invention.

FIGS. 27A and 27B show the results of confirming the protein expression of the p40 subunit-EBI3 subunit/Fc fragment complex (opt2) (a) and the result of mass spectrum analysis of the expressed protein (b) in an embodiment of the present invention.

FIG. 33 shows arthritis scores and incidence by p40 subunit-EBI3 subunit/Fc fragment complex (opt2) in an embodiment of the present invention.

FIG. 41 is a result of confirming the overexpression of the p40 subunit-EBI3 subunit complex in Hek293 cells by constructing a human p40-EBI3 complex vector in an embodiment of the present invention.

BEST MODE OF THE INVENTION

Figure 9:
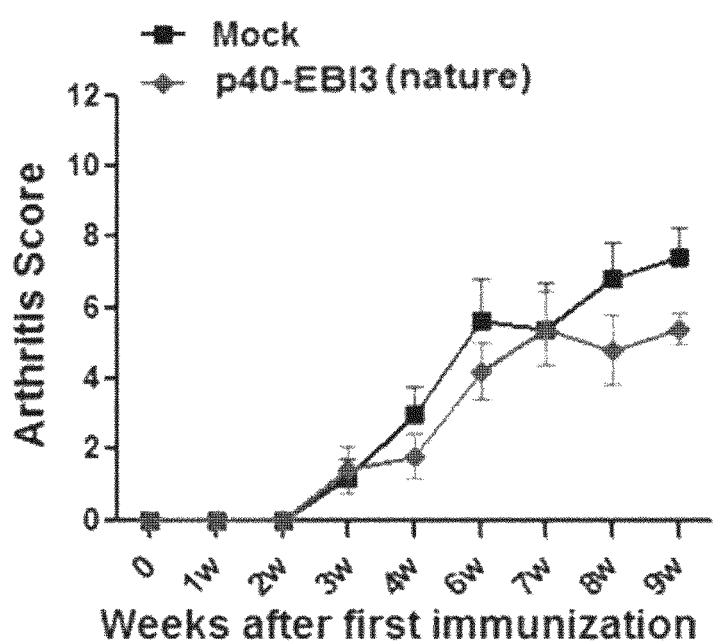
FIG. 9 is a graph showing the results of evaluating the disease inhibitory ability of the p40 subunit-EBI3 subunit complex in an autoimmune arthritis animal model by constructing a transformation vector in a natural form in an embodiment of the present invention.

Hereinafter, exemplary embodiments of the present invention are described in detail with reference to the accompanying drawings. In the following description, detailed descriptions of techniques well known to those skilled in the art may be excluded. Further, in describing the present invention, the detailed description may be excluded if it is determined that a detailed description of the related known function or configuration may unnecessarily obscure the subject matter of the present invention. Further, the terminology used in the present specification is a term used to properly express preferred embodiments of the present invention, which may vary depending on the intention of users or operators or customs in the field to which the present invention belongs.

Therefore, definitions of these terms should be made based on the contents throughout the present specification. Throughout the specification, when a certain part "includes" a certain component, it means that other components may be further included rather than excluding other components unless specifically stated to the contrary.

The term "p40 subunit" used throughout the specification of the present invention refers to the subunit beta of IL-12 (IL-12β) and is a common subunit of IL-12 and IL-23. The term "Epstein-Barr virus induced gene 3 (EBI3) subunit" used throughout the specification of the present invention refers to the subunit beta of IL-27 (IL-27β) encoded by the EBI3 gene in humans.

The term "Fc fragment" or "Fc" used throughout the specification of the present invention refers to a protein including a heavy chain constant region 1 (CH1), a heavy chain constant region 2 (CH2), and a heavy chain constant region 3 (CH3) of an immunoglobulin. The Fc fragment may further include a hinge region of the heavy chain constant region.

The present invention provides a complex formed by linking the p40 subunit and the EBI3 subunit by a linker, and specifically, may be a complex including an amino acid sequence selected from the group consisting of amino acid sequences represented by SEQ ID NOs: 2, 4, 6, and 12. The complex may be encoded by, for example, a polynucleotide sequence selected from the group consisting of polynucleotide sequences represented by SEQ ID NOs: 1, 3, 5, 10 and 11.

Specifically, the complex may be a complex including an amino acid sequence represented by SEQ ID NO: 2 encoded by a polynucleotide sequence represented by SEQ ID NO: 1 (FIGS. 2A and 2B). Further, the complex may be a complex including an amino acid sequence represented by SEQ ID NO: 4 encoded by a polynucleotide sequence represented by SEQ ID NO: 3 (FIGS. 3A and 3B). Further, the complex may be a complex including an amino acid sequence represented by SEQ ID NO: 6 encoded by a polynucleotide sequence represented by SEQ ID NO: 5 (FIGS. 4A and 4B). Further, the complex may be a complex including an amino acid sequence represented by SEQ ID NO: 12 encoded by a polynucleotide sequence represented by SEQ ID NO: 10 or 11 (FIGS. 6A to 6C).

The linker connecting the p40 subunit and the EBI3 subunit may be used as long as it is a linker commonly used in the art without limitation and may be, for example, a gly-ser linker.

In addition, the complex may further include an immunoglobulin moiety to facilitate delivery in vivo. The immunoglobulin moiety may be used without limitation as long as it is commonly used in the art, and may be, for example, an Fc fragment such as a fragment of human IgG1, IgG2, IgG3, and IgD. The immunoglobulin moiety may be linked to the EBI3 subunit. The complex further including the immunoglobulin moiety may have an amino acid sequence represented by SEQ ID NO: 9 encoded by a polynucleotide sequence represented by SEQ ID NO: 7 or 8 (FIGS. 5A, 5B and 5C).

Further, the present invention provides a vector including the polynucleotide and a host cell including the vector.

Figure 40:
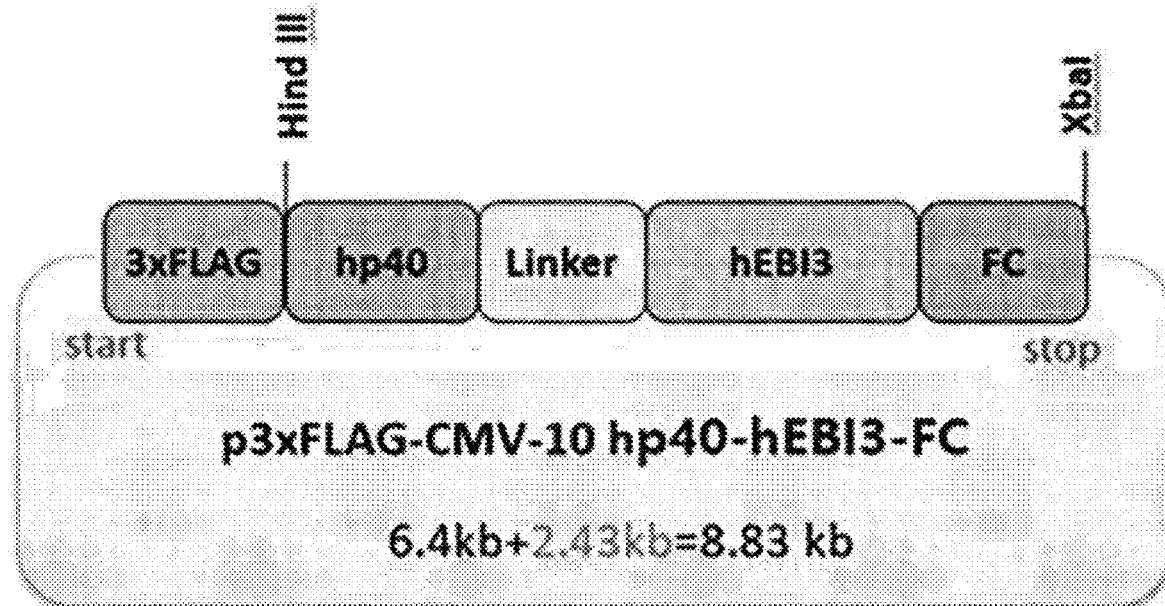
FIG. 40 is a schematic diagram of a human vector encoding a p40 subunit-EBI3 subunit complex (opt) according to an embodiment of the present invention.

The vector includes a polynucleotide consisting of a gene sequence selected from the group consisting of SEQ ID NOs: 1, 3, 5, 7, 8, 10 and 11 encoding a p40 subunit-EBI3 subunit complex or a p40 subunit-EBI3 subunit-immunoglobulin moiety complex. The vector including a polynucleotide encoding the p40 subunit-EBI3 subunit complex may be constructed as shown in, for example, FIGS. 1A, 1B and 40, and the vector including a polynucleotide encoding the p40 subunit-EBI3 subunit-immunoglobulin moiety complex may be constructed, for example, as shown in FIG. 1C.

The term "vector" of the present invention refers to a means for expressing a target gene in a host cell, for example, includes a viral vector such as a plasmid vector, a cosmid vector, a bacteriophage vector, an adenovirus vector, a retroviral vector and an adeno-associated viral vector. Vectors that may be used as the recombinant vector may be produced by manipulating plasmids (e.g., p3xFLAG, pSC101, pGV1106, pACYC177, ColE1, pKT230, pME290, pBR322, pUC8/9, pUC6, pBD9, pHC79, pIJ61, pLAFR1, pHV14, pcDNA3.1, pGEX series, pET series and pUC19, etc.), phage (e.g., λgt4λB, λ-Charon, λΔz1 and M13, etc.) or virus (e.g., SV40, CMV, etc.) often used in the art by a conventional method.

The host cell of the present invention is a cell capable of stably and continuously cloning or expressing the recombinant vector, and any host cell known in the art may be used. The prokaryotic cell may include, for example, *E. coli* strains, such as *E. coli* JM109, *E. coli* BL21, *E. coli* RRI, *E. coli* LE392, *E. coli* B, *E. coli* X 1776, and *E. coli* W3110, *Bacillus subtilis* strains, such as *Bacillus subtilis* and *Bacillus thuringiensis*, and *Enterobacteriaceae* and strains, such as *Salmonella typhimurium, Serratia marcescens* and various *Pseudomonas* species. In the case of transformation to the eukaryotic cell, as the host cell, yeast (*Saccharomyce cerevisiae*), insect cells, plant cells and animal cells, for example, SP2/0, CHO (Chinese hamster ovary) K1, CHO DG44, PER.C6, W138, BHK, COS-7, 293, HepG2, Huh7, 3T3, RIN, HEK293, NIH3T3, MDCK cell lines, and the like may be used, but are not limited thereto.

Transport methods well known in the art may be used for transport (introduction) of the polynucleotide or a vector including the polynucleotide into a host cell. For example, when the host cell is a prokaryotic cell, a $CaCl_2$) method or an electroporation method may be used, and when the host cell is a eukaryotic cell, a microinjection method, calcium phosphate precipitation method, electroporation method, liposome-mediated transfection method, gene bombardment, and the like may be used, but are not limited thereto.

The method of selecting the transformed host cell may be easily carried out according to a method well known in the art using a phenotype expressed by a selection label. For example, when the selection label is a specific antibiotic resistance gene, the transformant may be easily selected by culturing the transformant in a medium containing the antibiotic.

In addition, the present invention provides a pharmaceutical composition for the prevention or treatment of immune diseases, in which the composition includes the p40 subunit-EBI3 subunit complex or the p40 subunit-EBI3 subunit-immunoglobulin moiety complex, and a pharmaceutical composition for the prevention or treatment of immune diseases, in which the composition includes a polynucleotide encoding the p40 subunit-EBI3 subunit complex according to the present invention or a vector including the same.

The immune disease may be an autoimmune disease or an inflammatory disease and, for example, may be selected from the group consisting of Rheumatoid arthritis, ankylosing spondylitis, experimental autoimmune encephalomyelitis, post transplantation late and chronic solid organ rejection, skin sclerosis, psoriasis, Sjogren's syndrome, inflammatory bowel disease and graft-versus-host disease.

The term "treatment" in the present invention, unless otherwise stated, means that a disease or a disorder or one or more symptoms of the disease or the disorder to which the term is applied is reversed or alleviated or the progress thereof is inhibited or prevented, and the term "treatment" used in the present invention means a treating action. Thus, the treatment or therapy of immune diseases such as osteoarthritis in mammals may include one or more of the following:

(1) inhibiting the growth of autoimmune diseases or inflammatory diseases, that is, inhibiting their development;
(2) preventing the spread of autoimmune diseases or inflammatory diseases, that is, preventing metastasis;
(3) alleviating autoimmune diseases or inflammatory diseases;
(4) preventing recurrence of autoimmune diseases or inflammatory diseases; and
(5) palliating the symptoms of autoimmune diseases or inflammatory diseases.

The composition of the present invention may include a pharmaceutically effective amount of a complex, a polynucleotide encoding the complex, or a vector including the polynucleotide alone, or may include one or more pharmaceutically acceptable carriers, excipients, or diluents. In the above, the expression "pharmaceutically effective amount" refers to an amount sufficient to prevent, ameliorate, and treat symptoms of autoimmune diseases or inflammatory diseases.

The expression "pharmaceutically acceptable" means that the composition is physiologically acceptable and is non-toxic without causing allergic or other similar adverse reactions, such as gastroenteric trouble or dizziness, when administered to humans. Examples of carriers, excipients and diluents include lactose, dextrose, sucrose, sorbitol, mannitol, xylitol, erythritol, maltitol, starch, gum acacia, alginate, gelatin, calcium phosphate, calcium silicate, cellulose, methyl cellulose, polyvinylpyrrolidone, water, methyl hydroxybenzoate, propyl hydroxybenzoate, talc, magnesium stearate, and mineral oils. In addition, fillers, anti-aggregating agents, lubricants, wetting agents, flavoring agents, emulsifying agents and preservatives may additionally be included.

In addition, the compositions of the present invention may be formulated using methods known in the art to provide a rapid, sustained, or delayed release of the active ingredient after administration to a mammal. The formulation may be in the form of powders, granules, tablets, emulsions, syrups, aerosols, soft or hard gelatin capsules, sterile injectable solutions, and sterile powders.

In the present invention, the dosage of the active ingredient of the composition may be appropriately selected according to various factors such as the route of administration, the patient's age, gender, weight, and severity, and the composition according to the present invention may be administered in combination with a known compound having an effect of preventing, ameliorating or treating symptoms.

The appropriate dosage of the pharmaceutical composition of the present invention may be prescribed in various ways according to factors such as formulation method, method of administration, recipient's age, weight, gender, pathological condition, food, administration time, route of administration, excretion rate and response sensitivity. The dosage of the pharmaceutical composition of the present invention is preferably $1 \times 10^3$ to $1 \times 10^{12}$ cells/kg per day.

In addition, the present invention provides a standard protein complex for quantitative analysis of the p40 subunit and EBI3 subunit complex including the complex of the present invention.

In addition, the present invention provides a kit for detecting the p40 subunit and EBI3 subunit complex, the kit including an agent for measuring the complex of the present invention at the protein level.

In the kit of the present invention, the agent for measuring the complex of the present invention at the protein level may be an antibody, antibody fragment, aptamer, avidity multimer or peptidomimetic that specifically recognizes the full protein length of the marker or a fragment thereof.

The method of measuring the complex of the present invention at the protein level in the kit of the present invention may be performed by one or more methods selected from the group consisting of Western blot, enzyme linked immunosorbent assay (ELISA), sandwich ELISA, radioimmunoassay (RIA), radio immunodiffusion method, Immunoelectrophoretic, tissue immunostaining, immunoprecipitation assay, complement fixation assay, FACS, mass spectrometry, or protein microarray, and more preferably sandwich ELISA, but is not limited thereto.

The term "antibody" as used herein refers to a specific protein molecule directed against an antigenic site as a term known in the art. For the purposes of the present invention, an antibody refers to one that specifically binds to the p40 subunit and/or the EBI3 subunit of the present invention, and the method for preparing the antibody may be performed using well-known methods. Here, this includes partial peptides that may be made from the protein. The form of the antibody of the present invention is not particularly limited. The antibody of the present invention includes a portion of polyclonal antibody, monoclonal antibody, or anyone having antigen-binding properties and all immunoglobulin antibodies. Furthermore, the antibody of the present invention also includes special antibodies such as humanized antibodies.

The kit may further include tools and/or reagents for collecting a biological sample from a subject or patient, as well as tools and/or reagents for preparing genomic DNA, cDNA, RNA, or protein from the sample.

In addition, the present invention provides a kit for quantifying the p40 subunit and EBI3 subunit complex, the kit including the complex of the present invention as a standard protein complex.

In addition, the present invention provides a method for preventing and treating immune diseases, the method including administering to an individual a pharmaceutically effective amount of the pharmaceutical composition.

The pharmaceutical composition of the present invention is administered in a therapeutically effective amount or in a pharmaceutically effective amount. The term "pharmaceutically effective amount" means an amount sufficient to treat a disease at a reasonable benefit/risk ratio applicable to medical treatment. Effective dosage levels may be determined according to factors such as subject type, severity, age, gender, activity of the drug, sensitivity to the drug, time of administration, route of administration, rate of excretion, duration of treatment, drugs used concurrently, and other factors well known in the medical field.

[Modes of the Invention]

Hereinafter, the present invention is described in more detail by examples. It will be apparent to those of ordinary skill in the art that these examples are only for illustrative purposes, but the scope of the present invention is not limited to these examples.

Example 1: Confirmation of Natural Complex In Vivo

It was confirmed whether the complex according to the present invention exists naturally in vivo.

In order to identify whether the p40-EBI3 complex exists naturally, assuming the fact that IL-12, IL-23, and IL-27 cytokines, which are commonly present IL-12 family cytokines, are expressed in DC and APC, DC cells (CD11c+ cells) were isolated, stimulated, and cultured for three days, and then the ELISA of p40-EBI3 was measured in the supernatant.

First, single cells were isolated from spleen tissues, splenocytes changed into a teasing slide using 5% RPMI, and then centrifuged at 4° C. for 5 minutes at 1300 rpm to remove supernatant. Then, ACK buffer was added, and the RBC was removed. They were centrifuged at 4° C. for 5 minutes at 1300 rpm to remove supernatant, and the cells were released again. Then, MACs buffer was added, and the cells were filtered through a strainer, and then the cells were counted. After centrifuging again at 1300 rpm for 5 minutes at 4° C., the supernatant was removed, and CD11c beads were attached at 10 µl per $1 \times 10^7$. The isolated cells were seeded at $1 \times 10^6$/ml in a 24 well plate and stimulated under stimulation conditions of LPS 100 ng/ml+IFN-γ 25 ng/ml, zymosan 5 g/ml and con A 5 µg/ml. They were cultured for three days.

As a result of checking ELISA by covering EBI3 capture and detecting with p40, the p40-EBI3 complex was expressed under stimulation conditions such as LPS+IFN-γ, Zymosan, and ConA, and this result indicates that p40-EB13 complex is naturally expressed (FIG. 7).

Preparation Example 1: Preparation of p40-EBI3 Complex

The p40-Linker (3xGGGGS)-EBI3 complex was prepared in a natural form of cDNA (SEQ ID NO: 1). Then the obtained cDNA was cut with 5'HindIII and 3'NotI restriction enzymes, and then they were ligated with p3xFLAG-CMV-10 vector, which was an expression vector cut with the same restriction enzyme. Then, they were transformed to obtain colonies, and clones were selected. The selected clones were subjected to sequencing by obtaining DNA obtained by separating the vector. The experiment to confirm overexpression was conducted with clones that matched 100% from the sequencing results.

An overexpression vector was prepared in HEK293 cells and transfection was performed. The supernatant was collected two days after the medium was changed the day after transfection. When overexpression was confirmed by performing ELISA with the supernatant, it was confirmed that p40-EBI3 complex was significantly higher (See FIG. 8). This complex is a complex (nature) with a natural sequence (nature), has the amino acid sequence represented by SEQ ID NO: 2 (FIG. 2B), and is encoded by the polynucleotide sequence represented by SEQ ID NO: 1 (FIG. 2A).

In order to prepare the optimal complex (opt1) type, the p40-Linker (3xGGGGS)-EBI3 type complex was optimized in GenScript. The obtained cDNA was cut with HindIII and XbaI, and then it was ligated with the expression vector p3xFLAG-CMV-10, which was cut with the same enzyme site. It was transformed to obtain colonies, and clones were selected. The selected clone was confirmed to have a DNA sequence represented by SEQ ID NO: 3 by sequencing the DNA obtained by separating the vector (FIG. 3A). The clone whose DNA sequence was confirmed was transduced into Hek293 cells. After three days, a protein was extracted from the cell. Western blot was performed with this protein to select the final clone whose expression was confirmed.

Example 2: Effect on Autoimmune Arthritis Animal Model

In order to evaluate the in vivo efficacy of the p40-EBI3 complex, arthritis was induced in normal DBA1/J mice, and they were injected with the p40-EBI3 complex DNA vectors of the natural and optimal form (OPTI) prepared as in Preparation Example 1. Then, the arthritis inhibition effect was evaluated. Mock vector was injected as a control. A vector cultured with *E. coli* was used as a prep. An endotoxin-free kit was used to eliminate the effect on endotoxin.

100 μg of the vector was injected once a week from one week after inducing arthritis to mice to the end of the experiment. As the first vector injection, 100 μg of the vector was intravenously administered to the tail of the mouse (IV: intravenous). As the second vector injection, after removing the hair on the muscle of the mouse's hind limb (right), 100 μg of the vector was intramuscularly administered with an insulin syringe, and then transferred to an electroporator (IM: intramuscular). As the third vector injection, in the same manner as the second vector injection method, the vector was injected into the opposite leg of the right hind limb of the mouse injected with the vector in the previous week. The experiment was conducted for 3 weeks with one set from the first to the third vector injection method, and the above method was repeated until the animal experiment was terminated.

After the end of the experiment, the arthritis scores of DBA1/J mice were scored as follows.

0 point
  Hindpaw: No erythema, no difference from the normal mouse foot visually, the clear and normal shape of the bone confirmed by looking at the exterior.
  Forepaw: No erythema, no difference from normal mouse foot
1 point
  Hindpaw: one swollen toe/obvious erythema without swelling on the sole of the foot/slight swelling the back, sole or heel the foot
  Forepaw: 1 swollen toe/obvious erythema without swollen sole of the foot
2 points
  Hindpaw: (with erythema) 2 swollen toes/1 or 2 swollen toes or slightly rounded swollen back, sole or heel the foot
  Forepaw: (with erythema) 2 swollen toes/1 or 2 swollen toes or swollen ankle
3 points
  Hindpaw: (with erythema) 1 to 4 swollen toes or whole swollen back, sole or heel the foot/slightly plump due to inflammatory edema in which the shape of the calcaneus is barely revealed, and the back, sole or heel the foot and ankle are swollen
  Forepaw: (with erythema) 1 to 4 swollen toes or the thick ankle due to the increase in inflammatory tissue in the ankle area
4 points
  Hindpaw: almost developed erythema/3 or more swollen toes, the whole swollen foot, and severe erythema and swelling and overall plump
  Forepaw: almost developed erythema/3 or more swollen toes and unnatural movement due to the whole swollen ankles and feet In the incidence evaluation, if one foot of the mouse was swollen, it was evaluated as 25%, and if all four feet were swollen, it was evaluated as 100%. At least 5 mice per group were evaluated and averaged.

Arthritis Inhibitory Effect

Figure 10:
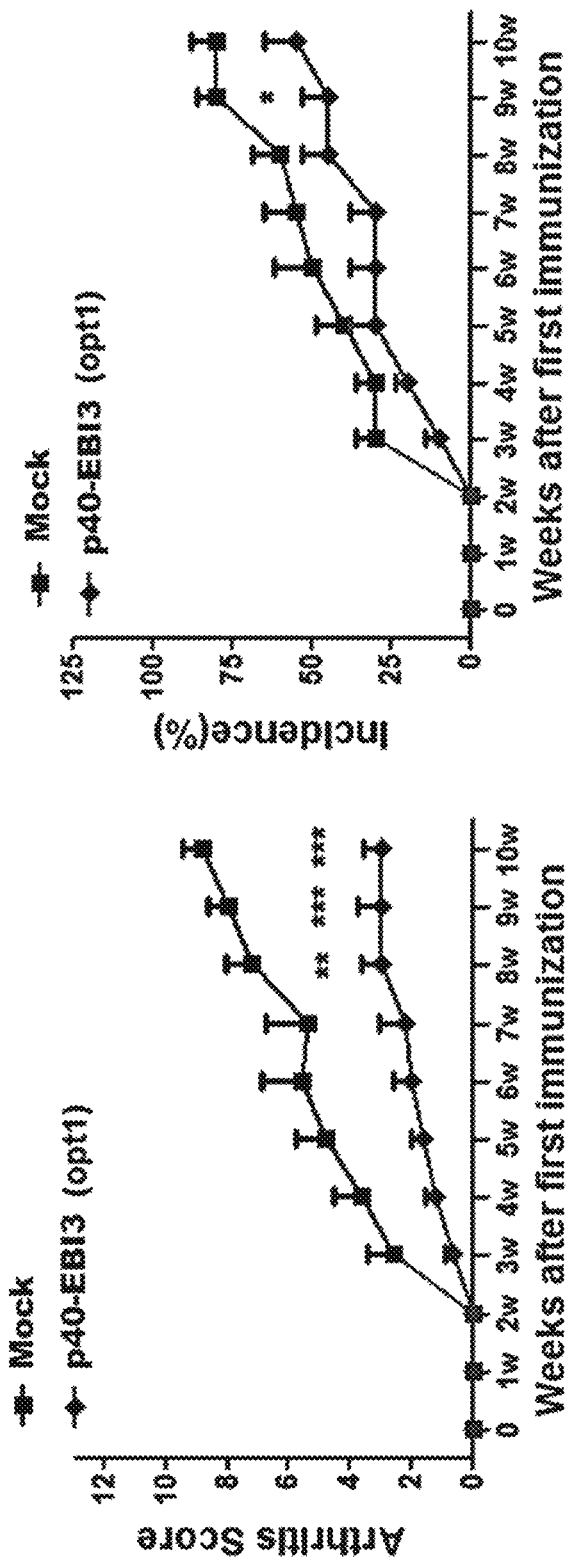
FIG. 10 is a graph showing the arthritis score and incidence of autoimmune arthritis by the p40 subunit-EBI3 subunit complex (opt1) in an embodiment of the present invention.

FIG. 9 shows the results of arthritis score evaluation in an autoimmune arthritis animal model using a natural p40-EBI3 complex (nature) DNA vector. It was confirmed that the arthritis inhibitory effect was improved compared to the control. FIG. 10 shows the results of arthritis score and incidence evaluation in an autoimmune arthritis animal model using the optimal p40-EBI3 complex (opt1) DNA vector. It was confirmed that the arthritis inhibitory effect was superior and the incidence of arthritis was also reduced compared to the control.

Autoantibody Inhibitory Ability

In order to evaluate whether the p40-EBI3 complex inhibits the production of autoantibodies expressed in B cells, serum was isolated from the mice injected with the p40-EBI3 complex, and the expression of type II collagen (CII) was measured using the ELISA method.

Figure 11:
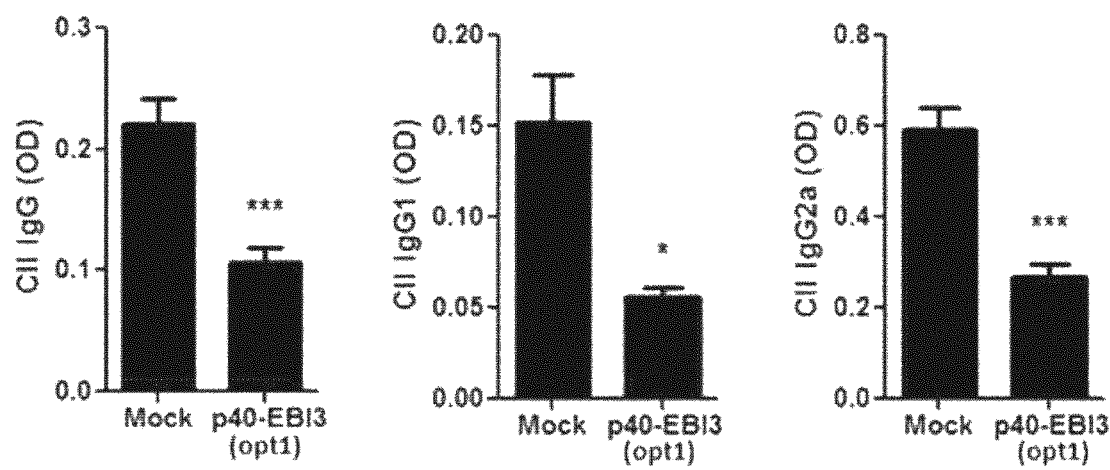
FIG. 11 is a graph showing the autoantibody inhibitory ability by the p40 subunit-EBI3 subunit complex (opt1) in an embodiment of the present invention.

FIG. 11 shows the autoantibody inhibitory ability by the optimal form of the p40-EBI3 complex (opt1). It was confirmed that the expression of antigen-specific IgG was remarkably inhibited compared to the control group.

Effect on Degree of Joint Destruction

In order to analyze the degree of arthritis improvement according to the p40-EBI3 complex (opt1) treatment, the degree of joint damage in an autoimmune arthritis mouse animal model was examined by histological technique. The hind paws of each mouse were fixed in 10% formalin and decalcified from the bone. Then, a block was made with paraffin. A joint segment (7 um) was obtained from this. The joint segment was stained with hematoxylin and eosin (H&E). It was stained with Safranin O to confirm the degree of cartilage destruction.

Figure 12:
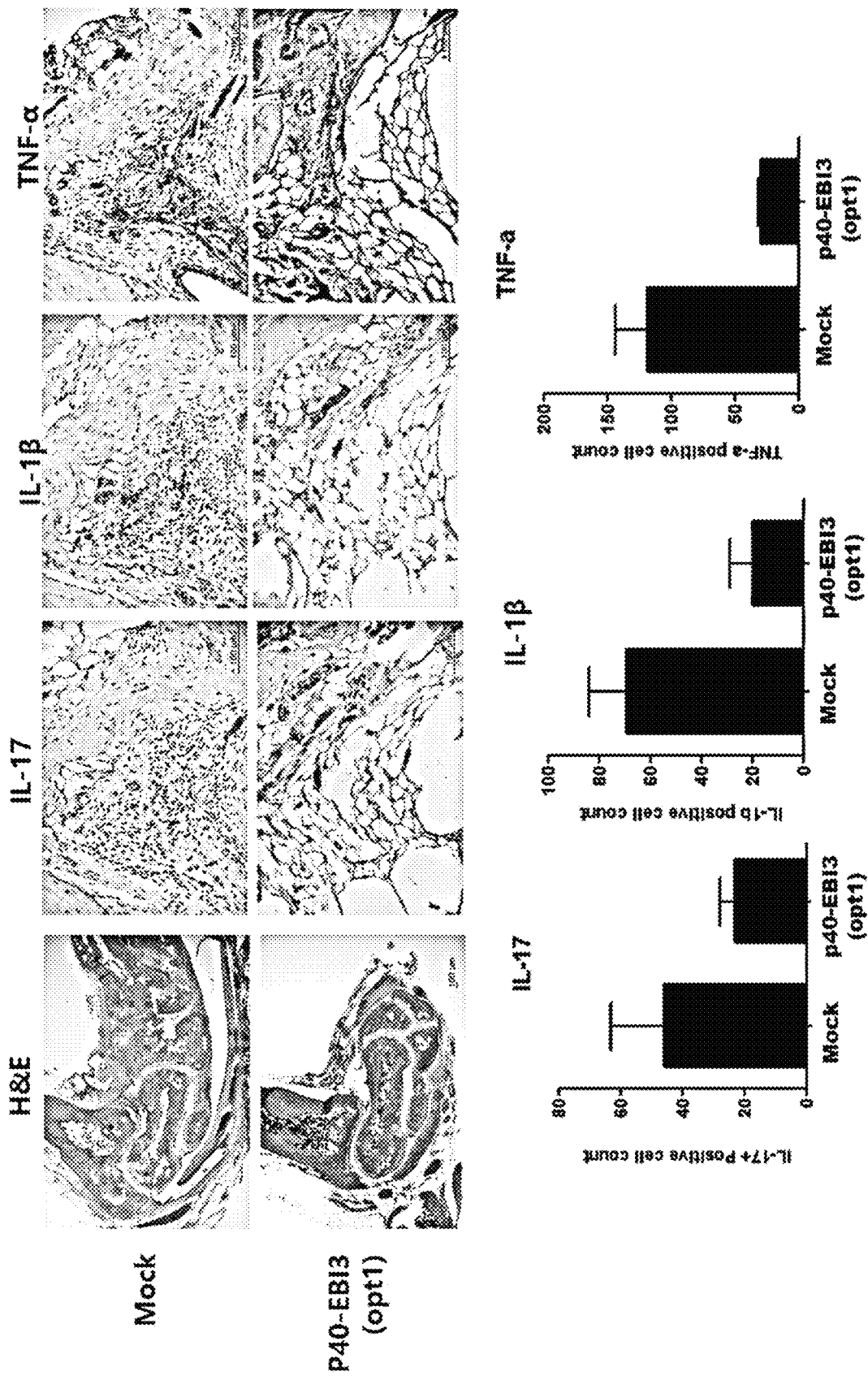
FIG. 12 is a graph showing a result image of H&E staining and inflammatory cytokine expression of a joint of an arthritis animal model in an embodiment of the present invention.
Figure 13:
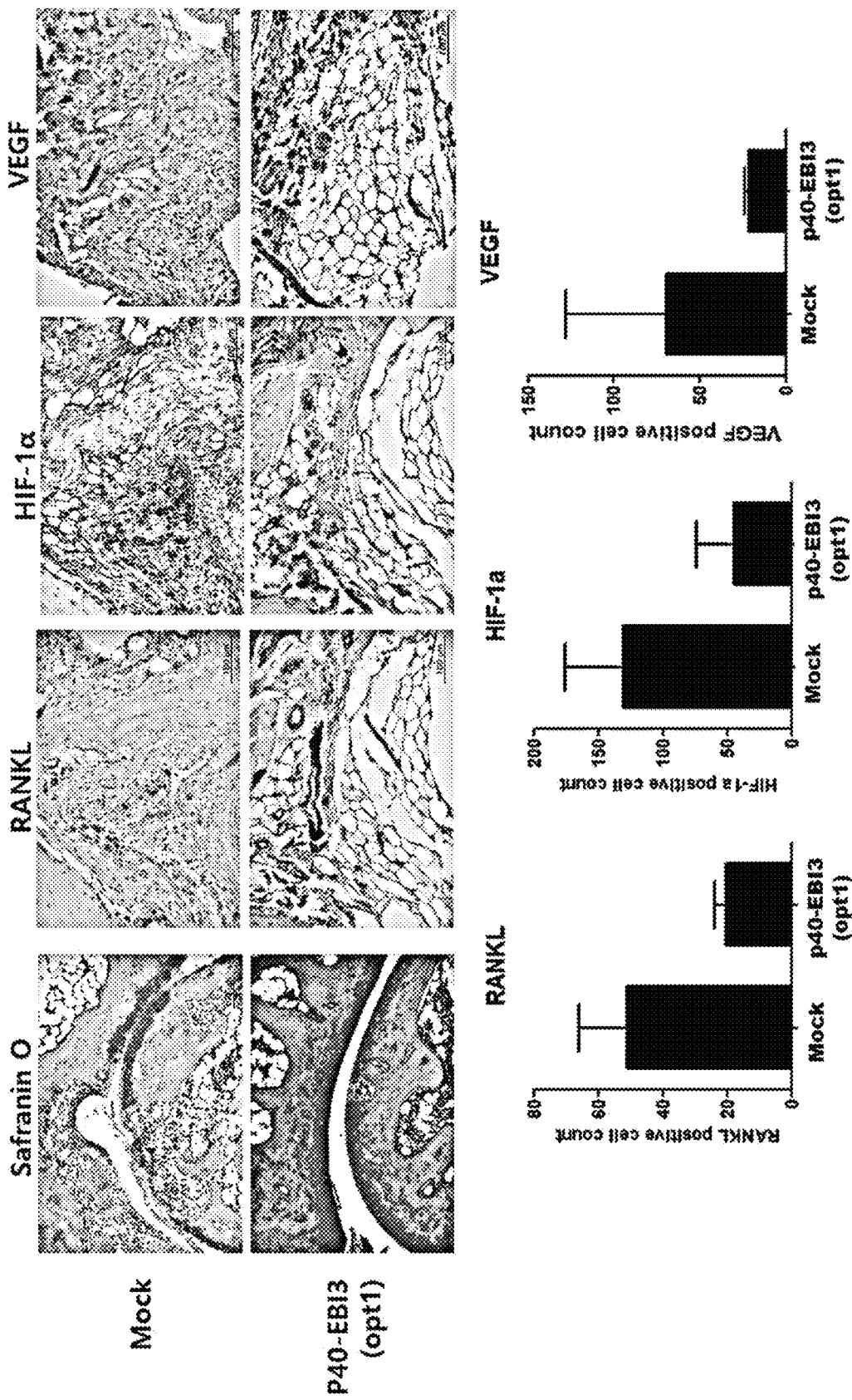
FIG. 13 is a graph showing a result image of safranin O staining, joint destruction factors, and angiogenesis factors expression of a joint of an arthritis animal model in an embodiment of the present invention.

FIG. 12 shows the results of H&E staining and the expression of IL-17, IL-1β, and TNFα. It was confirmed that the degree of joint destruction was mild compared to the control group, and the expression of IL-17, IL-1β, and TNFα was significantly reduced. FIG. 13 shows the results of safranin O staining and the expression of RANKL, HIF-1α and VEGF. It was confirmed that the degree of cartilage damage was mild compared to the control group, and the expression of RANKL, HIF-1α and VEGF was significantly reduced.

Example 3: Effect of p40-EBI3 Complex (opt1) in Overexpressing Mice Preparation of p40-EB13 Complex (opt1) Overexpressing Mice The pcDNA3.1+3xHA vector was cut with 5'Hind III and 3'Xba I, and then the p40-Linker-EBI3 cut with 5'Hind III and 3'Xba I was ligated. The clones generated after transformation in E. coli were sequenced, and the clones with the proper inserts were selected. Then, overexpression of HA, p40, and EBI3 was confirmed in the protein lysate obtained after transfection into NIH3T3 cells. The clones with the most overexpression were selected and transfected into ES cells, followed by microinjection, to produce overexpressing mice as C57BL/6 lineage mice. As a result, the transgene was identified in F1 obtained through F0, and generation was maintained. The structure of the overexpression vector is as described in FIG. 14A. The transgene was confirmed by genotyping in F1 obtained through F0, which was animalized by making overexpressing mice (Tg) (FIG. 14B). WB was performed to confirm protein expression in the spleen of mice that confirmed the transgene in genotyping. Since the overexpressing mouse is a model with HA-tag, as a result of confirming with HA, the p40-EBI3 complex was identified to confirm overexpression (FIG. 14C).

Confirmation of p40-EBI3 Complex in p40-EBI3 Complex (opt1) Overexpressing Mice

Figure 15:
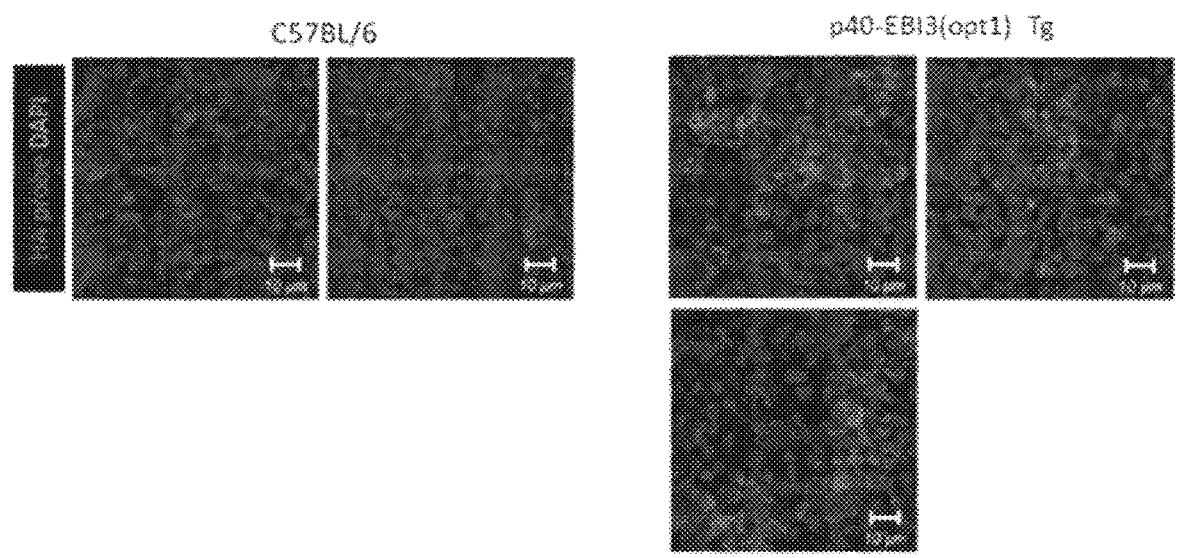
FIG. 15 shows the results of confirming the expression of the p40 subunit-EBI3 subunit complex in mice overexpressing the p40 subunit-EBI3 subunit complex (opt1) in an embodiment of the present invention.

In order to confirm whether the p40-EBI3 complex was actually overexpressed in the overexpressing mouse, the HA-tag was confirmed with a confocal microscope. Since the overexpressing mouse is a model with HA-tag, as a result of confirming with HA, it was confirmed that HA, that is, the p40-EBI3 complex, was overexpressed compared to the control C57BL/6 (FIG. 15).

Regulation of Osteoclast Differentiation Inhibition in p40-EBI3 Complex (opt1) Overexpressing Mice The cells of the monocyte family obtained by separating the bone marrow of p40-EBI3 complex overexpressing mice and normal mice were differentiated into osteoclast progenitor cells with M-CSF. In osteoclasts obtained by stimulating recombinant RANKL with M-CSF, the number of TRAP-positive cells and RNA expression levels of osteoclast differentiation markers were compared.

Figure 16:
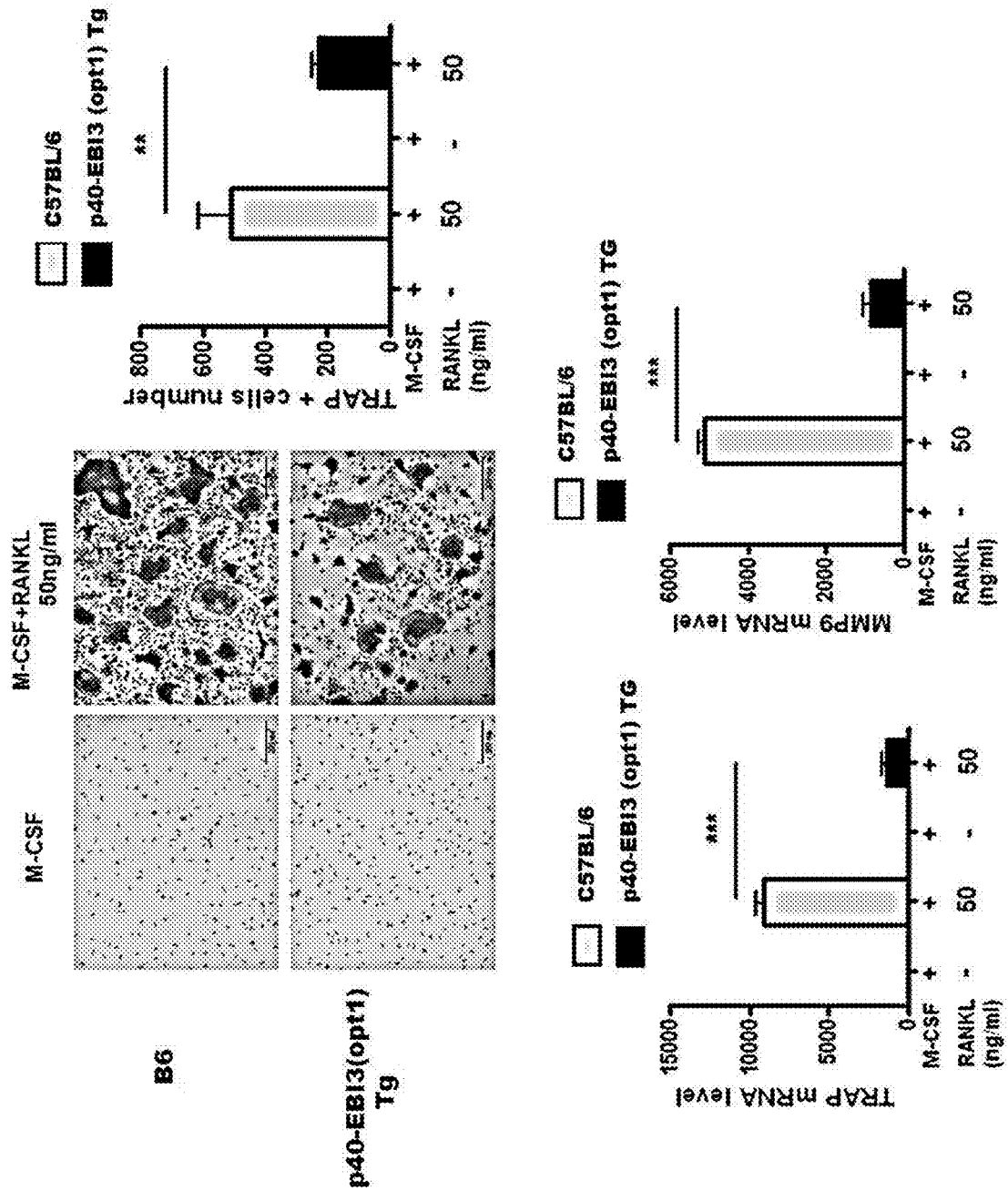
FIG. 16 shows the effect on the regulation of osteoclast differentiation inhibition in BM cells in mice overexpressing the p40 subunit-EBI3 subunit complex (opt1) in an embodiment of the present invention.

As shown in FIG. 16, the results confirm that in the cells obtained from p40-EB13 overexpressing mice, the number of TRAP-positive cells (top of FIG. 16) and RNA expression levels of osteoclast differentiation markers (bottom of FIG. 16) were decreased, so that the differentiation into osteoclasts was significantly reduced.

Figure 17:
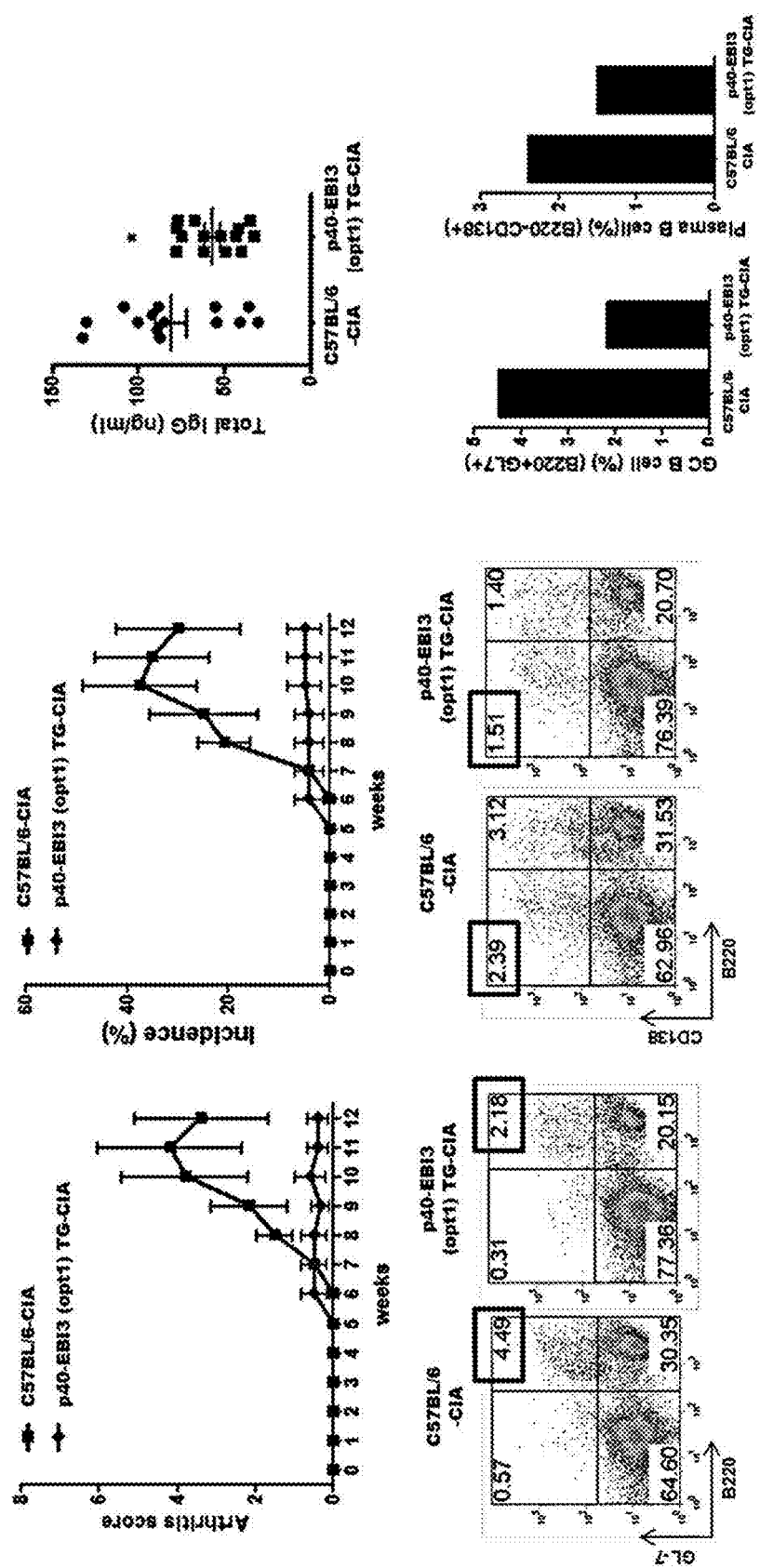
FIG. 17 shows the inhibitory effect on arthritis in mice overexpressing the p40 subunit-EBI3 subunit complex (opt1) in an embodiment of the present invention.

Regulation of Autoimmune Arthritis in p40-EBI3 Complex (opt1) Overexpressing Mice In order to evaluate the in vivo efficacy of p40-EBI3 complex overexpressing mice, arthritis was induced in normal C57BL/6 and overexpressing mice, and the arthritis inhibitory effects were evaluated. As shown in FIGS. 17A and 17B, the p40-EBI3 complex overexpressing mice had a superior arthritis inhibitory effect than the control group, and the arthritis incidence rate was also significantly suppressed.

When the level of IgG was measured in serum obtained from mice four weeks after arthritis was induced, antibody production was decreased in overexpressing mice (FIG. 17C). Therefore, it was confirmed that the p40-EBI3 complex can regulate the production of antibodies when excessive immune reactions occur in many environments.

It was confirmed that the antibody production was reduced in the serum of mice at four weeks after arthritis induction. In order to confirm whether it actually regulates B cells that produce antibodies, splenocytes were obtained from each mouse and B cells were identified. As shown in FIGS. 17D to 17F, the results reveal that GC B cells (B220+GL7+), which are important for antibody production, were decreased in p40-EBI3 complex overexpressing mice, and plasma B cells (B220⁻ CD138⁺) cells which produce antibodies were significantly reduced.

Figure 18:
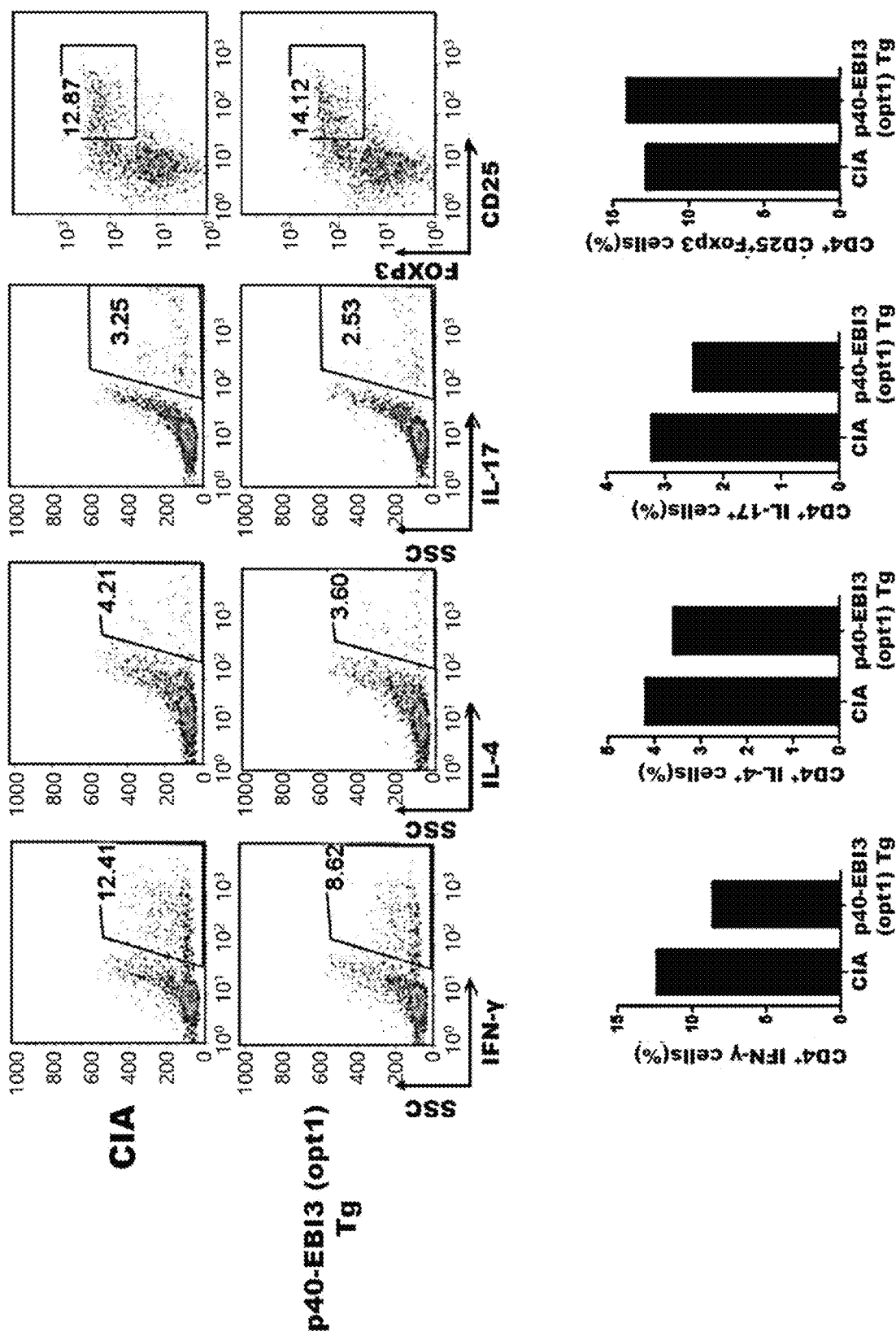
FIG. 18 shows changes in expression of T helper cells in mice overexpressing the p40 subunit-EBI3 subunit complex (opt1) in an embodiment of the present invention.

Changes in Expression of T Helper Cells in p40-EBI3 Complex (opt1) Overexpressing Mice In order to confirm the distribution of T helper cells, cells were isolated from the spleen of mice after arthritis induction, and then T helper cells were analyzed with FACs. As a result, it was confirmed that IFN-γ, IL-4, and IL-17 were slightly decreased and Treg cells were slightly increased (FIG. 18).

Regulation of Transplant Rejection Disease in p40-EBI3 Complex (opt1) Overexpressing Mice In order to evaluate the in vivo efficacy of p40-EBI3 complex overexpressing mice in diseases caused by immune rejection such as transplant rejection disease, the survival rate of graft-versus-host disease was measured after transplanting p40-EBI3 complex overexpressing mouse cells. For this, first, a graft-versus-host disease (GvHD) model was constructed. BALB/c (H-2k/d) mice were used as recipients, and C57BL/6 (H-2 kb) (disease control) or p40-EBI3 complex overexpressing mice (H-2 kb) were used as donors. On the day of bone marrow transplantation, the host was irradiated with 800 cGy for total body irradiation (TBI) as a pre-marrow eradication treatment, and bone marrow cells ($5 \times 10^6$) and splenocytes ($1 \times 10^7$) isolated from two donor mice were injected into the tail vein. Then, bone marrow transplantation was performed. As a result, it was observed that as time passed, 20% or more of the mice died after 40 days in the disease control group, whereas 70% or more of the mice transplanted with the cells of the p40-EBI3 complex overexpressing mice survived (FIG. 19).

Regulation of Autoimmune Encephalomyelitis (EAE) in p40-EBI3 Complex (opt1) Overexpressing Mice Normal C57BL/6 and p40-EBI3 Tg mice were injected with MOG peptide and pertussis toxin to induce encephalomyelitis. Then, the degree of disease was evaluated according to the clinical symptoms of the mice in which encephalomyelitis was induced. As a result, it was confirmed that the disease was reduced by about 20% in p40-EBI3 Tg mice compared to the encephalomyelitis control group (FIG. 20).

Figure 21B:
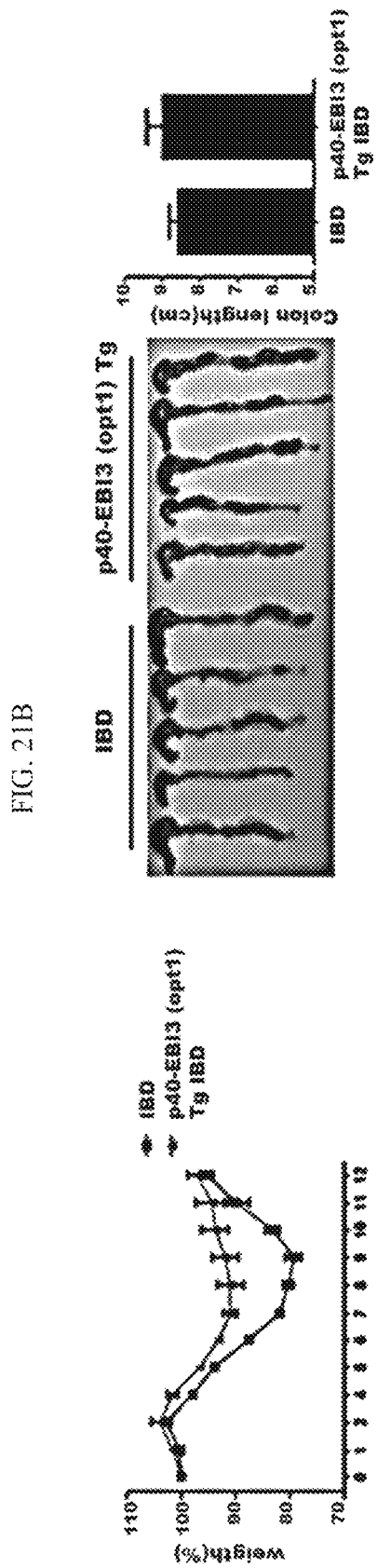
FIG. 21B shows the change in body weight and large intestinal length in mice overexpressing the p40 subunit-EBI3 subunit complex (opt1) in an embodiment of the present invention.

Regulation of Inflammatory Bowel Disease in p40-EBI3 Complex (opt1) Overexpressing Mice Autoimmune inflammatory bowel disease was induced by injecting DSS (dextran sodium sulfate) into C57BL/6 and p40-EBI3 Tg mice. At this time, the reduced weight was measured. Compared to the IBD control group, the p40-EBI3 Tg mouse group showed less reduction in body weight by about 20% (FIG. 21B). In addition, the degree of survival was evaluated. It was confirmed that the survival of the p40-EBI3 Tg group was 20% or higher than that of the IBD control group (FIG. 21A). DSS was injected at 2.5% and autoimmune inflammatory bowel disease was induced by weak inflammation. It was confirmed that the body weight was decreased less, and the length of the intestine was not shortened in the group of p40-EBI3 overexpressing mouse group (FIG. 21B).

Preparation Example 2: Preparation of p40-EB13-FC Complex (opt2)

The linker (3xGGGGS)-EBI3 fragment cut with HindIII and NotI was ligated to an overexpression vector. The overexpression vector was again obtained from the produced colony. After the overexpression vector was cut with HindIII, the p40 fragment cut with HindIII was ligated thereto. The vector was obtained again from the obtained colonies. The vector was cut with NotI and then the IgG-Fc fragment cut with NotI was ligated thereto. The expression vector (FIG. 1C) was transformed to obtain a colony. DNA obtained by separating the vector and E. coli were stored as glycerol stock. The selected clones were sequenced to confirm a DNA sequence including a gene sequence represented by SEQ ID NO: 7 or 8. The selected clones were transduced into NIH3T3 cells. Three days later, proteins were extracted from the cells. Western blot was performed on this protein. A clone in which overexpression was confirmed was selected.

Example 4: Inhibitory Effect of p40-EBI3-FC Complex (opt2) on Autoimmune Arthritis In order to evaluate the in vivo efficacy of the p40-EBI3-FC complex, arthritis was induced in normal DBA1/J mice, and the p40-EBI3-FC complex DNA vector prepared as in Preparation Example 2 was injected to evaluate the arthritis inhibitory effect as the method described in Example 2. As a control, mock-Fc vector was injected.

Arthritis Inhibitory Effect

Figure 22:
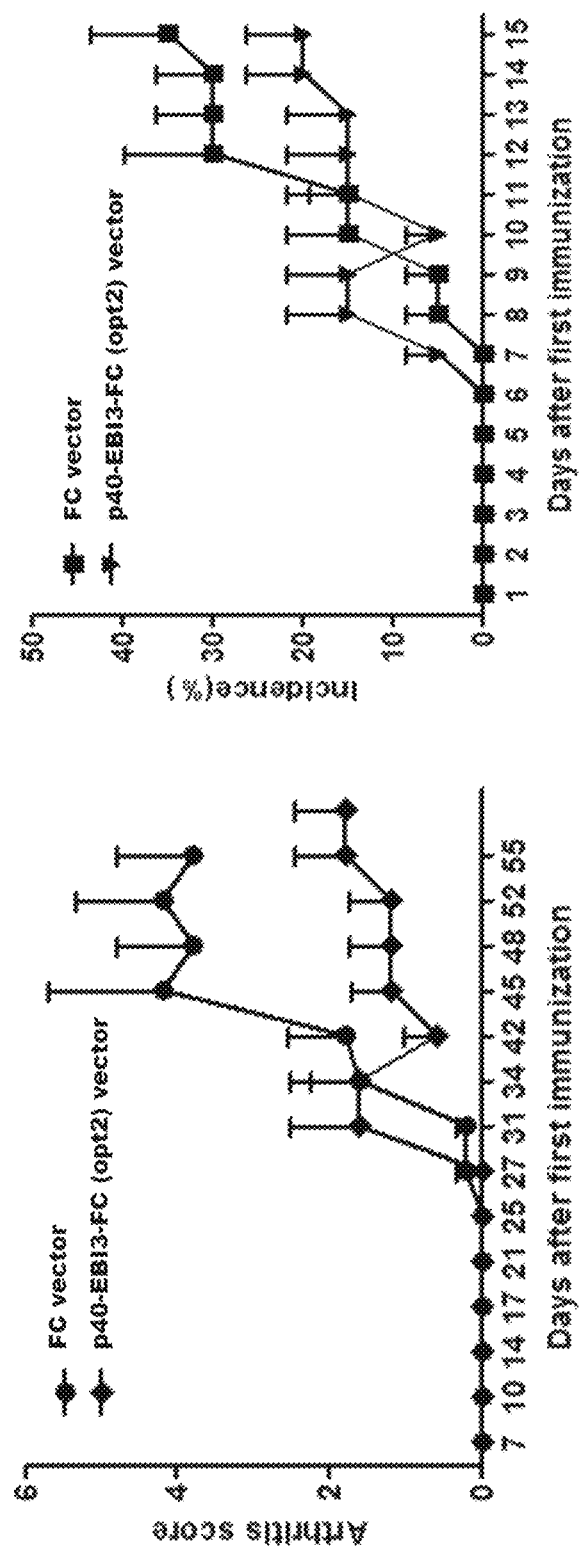
FIG. 22 shows the arthritis score and incidence by the p40 subunit-EBI3 subunit/Fc fragment complex (opt2) in an autoimmune arthritis animal model in an embodiment of the present invention.

FIG. 22 shows the results of arthritis score and incidence evaluation in an autoimmune arthritis animal model using the optimal p40-EBI3-FC complex DNA vector. It was confirmed that compared to the control group, the arthritis inhibitory effect was excellent, and the arthritis incidence rate was also suppressed at a level of 20%.

Autoantibody Inhibitory Ability

In order to evaluate whether the p40-EBI3-FC complex inhibits the production of autoantibodies expressed in B cells, serum was isolated from the mice injected with the p40-EBI3-FC complex vector. The expression of type II collagen (CII) was measured using the ELISA method.

FIG. 23 shows the autoantibody inhibitory ability by the p40-EBI3-FC complex. It was confirmed that the expression of antigen-specific IgG was remarkably suppressed compared to the control group.

T Cell Proliferation Inhibitory Effect

In order to analyze the effect on T cell activity, cells were isolated from the spleen of autoimmune arthritis mice injected with the p40-EBI3-FC complex vector. The isolated cells were stimulated with anti-CD3 for three days and were treated by 3H-thymidine isotope. Then, the degree of proliferation activity was evaluated. As a result, it was confirmed that T cell proliferation of the mice inserted with the p40-EBI3-FC complex vector was significantly reduced compared to that of the control group (FIG. 24).

Effect on Degree of Joint Destruction

Figure 25:
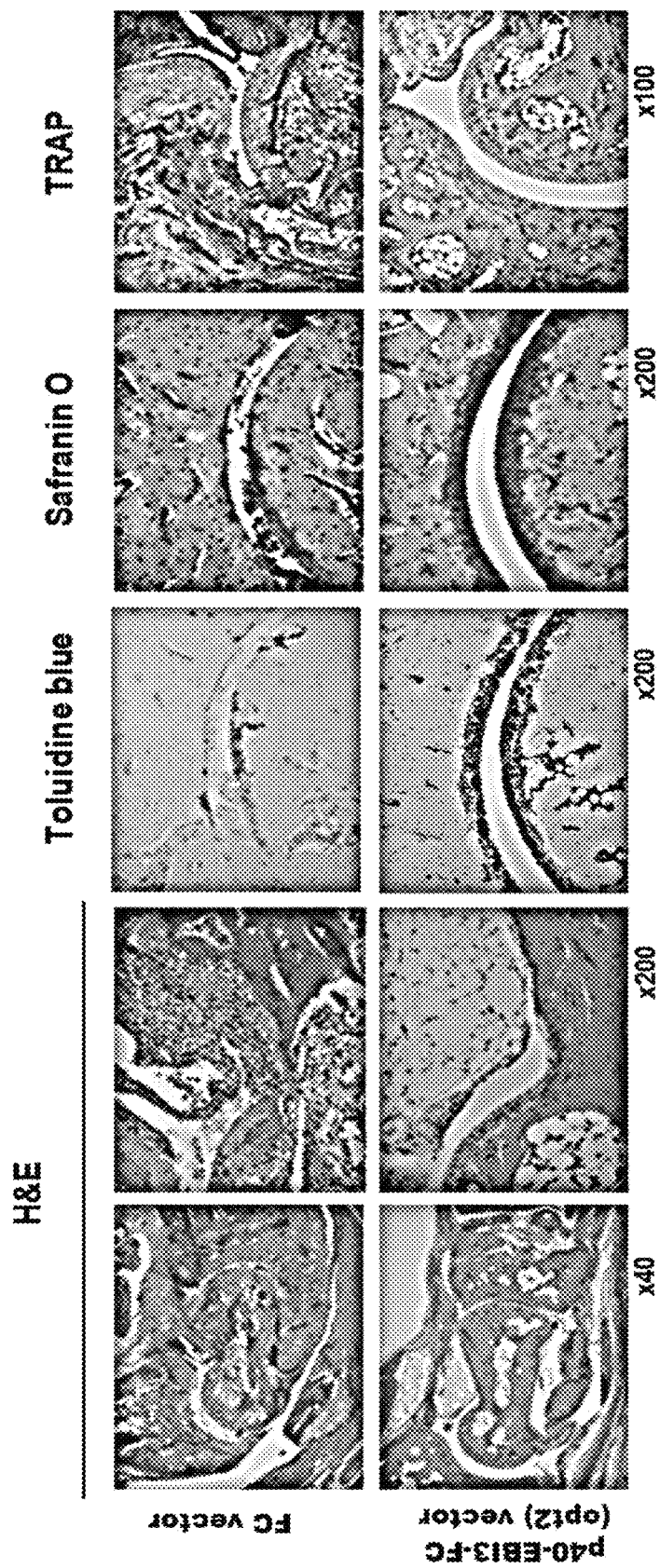
FIG. 25 is a comparison of the degree of joint destruction by the p40 subunit-EBI3 subunit/Fc fragment complex (opt2) in an autoimmune arthritis animal model in an embodiment of the present invention with a control group.

In order to analyze the degree of arthritis improvement according to the p40-EBI3-FC complex vector treatment, the degree of joint damage in an arthritis mouse animal model was examined through histological technique. The hind paws of each mouse were fixed in 10% formalin and decalcified from the bone. Then, a block was made with paraffin. A joint segment (7 μm) was obtained from this. The joint segment was stained with hematoxylin and eosin (H&E). Further, toluidine blue and safranin O staining were performed to confirm the degree of cartilage destruction. In order to confirm the degree of osteoclasts differentiation, the main cause of bone destruction, TRAP staining was also performed. As shown in FIG. 25, the results indicate that bone destruction, cartilage damage, and osteoclast differentiation were significantly reduced in the mice injected with the p40-EBI3-FC complex so that p40-EBI3-FC may reduce joint destruction.

Figure 26:
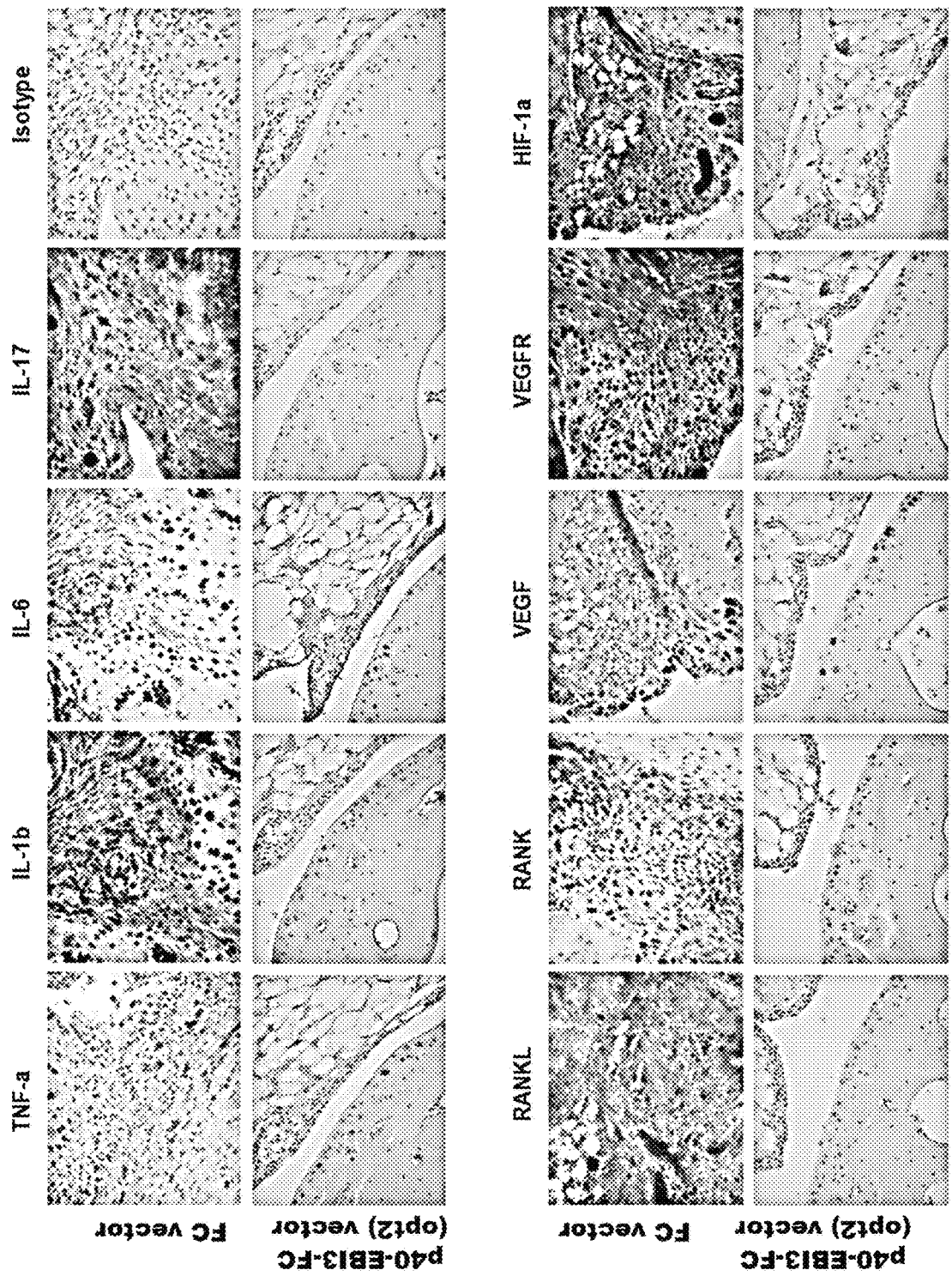
FIG. 26 is a comparison of the effect of p40 subunit-EBI3 subunit/Fc fragment complex (opt2) on the expression of inflammatory cytokines, joint destruction factors, and angiogenesis factors in an autoimmune arthritis animal model in an embodiment of the present invention with the control group.

Effect on Expression of Inflammatory Cytokine, Joint Destruction Factor And Angiogenesis Factor In order to confirm the effect of the p40-EBI3-FC complex on the expression of inflammatory cytokines, joint destruction factors, and angiogenesis factors, the expression of inflammatory cytokines, joint destruction factors, and angiogenesis factors in the joints of the arthritis mouse animal model injected with the p40-EBI3-FC complex vector was confirmed by IHC. As shown in FIG. 26, the result indicates that all of the control groups were overexpressed, but the mice inserted with the p40-EBI3-FC complex vector had no expression. Therefore, it was confirmed that the p40-EBI3-FC complex inhibits the expression of factors that play a critical role in joint destruction and arthritis induction to inhibit the promotion and activity of arthritis.

Preparation Example 3: Preparation of p40-EBI3-FC Complex (opt2) Protein

Construction of p40-EBI3-FC Complex-Expressing Cell Line and Selection Of Expressing Cells CHO-DG44 cells were transduced with a p40-EBI3-FC DNA vector including a gene sequence represented by SEQ ID NO: 7 or 8. After 6 hours, the medium was changed with 10% dialyzed FBS MEM. When the cells grew 95% or more, passage culture was performed. Then, the cells were diluted and plated so as to contain a single cell in a 96 well plate. After culturing these cells, cells highly expressing the p40-EBI3-FC complex were selected from the culture medium. The cells were transferred and cultured in a 150 mm dish. After the culture, MTX was treated for each concentration. Only cells that survived were selected, and only cells with high expression of p40-EBI3-FC were selected. Thus, the p40-EBI3-FC protein was selected.

Purification of p40-EBI3-FC Complex Protein

A cell line having high p40-EBI3-FC expression was cultured for 3 days in a medium exclusively for CHO-DG44 cells, and then a medium was obtained. Using the HiTrap protein A HP column, the medium obtained from the cells was put and pumped in the column. Then, the binding buffer was flowed, and the elute buffer was added and pumped at the end.

Confirmation of Expression of Purified p40-EBI3-FC Complex

Figure 27A:
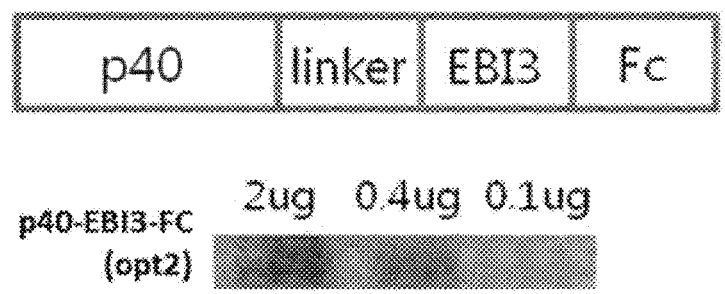

The western blot method was used, and the purified p40-EBI3-FC protein was confirmed using anti-mouse IgG-Fc. Its expression was confirmed according to the concentration of the purified p40-EBI3-FC (FIG. 27A).

Purified p40-EBI3-FC protein was stained with Coomassie Blue after SDS electrophoresis. The gel was cut and sent to Genomine Co., Ltd. Peptide mass fingerprinting (PMF) was performed, and LC-MS/MS was performed with Ettan MALDI-ToF for mass spectrum analysis of the cut peptides. As a result, EBI3, p40, and Fc were confirmed, indicating that the protein expression was accurate (FIG. 27B).

Measurement of Endotoxin in Purified p40-EBI3-FC Complex

It was measured whether or not the purified p40-EBI3-FC contained endotoxin. When endotoxin was measured by the LAL assay, 0.15 EU/ml was identified in 1 μg of purified protein, which was lower than 0.4 EU/ml of normal and lower than <1.0 EU/ml, the endotoxin level of commercially available recombinant protein.

Example 5: Inhibition of Inflammatory Cytokines by p40-EBI3-FC Complex (opt2) Protein Inhibition of Inflammatory Cytokines in T Cells and Non-T Cells The medium cultured for 3 days of CHO-DG44 cells overexpressing p40-EBI3-FC was purified by HiTrap protein A HP column. Then, it was treated with the purified p40-EBI3-FC complex protein of Preparation Example 3. Thus, experiments were performed on CD4 T cells and non-T cells. To verify the effect of the p40-EBI3-FC complex protein, IL-27 containing the EBI3 subunit, the p40 subunit contained in IL-12, and the p80, homodimer bound by disulfide consisting of two p40 chains included in IL-12 were used as a control.

Figure 28:
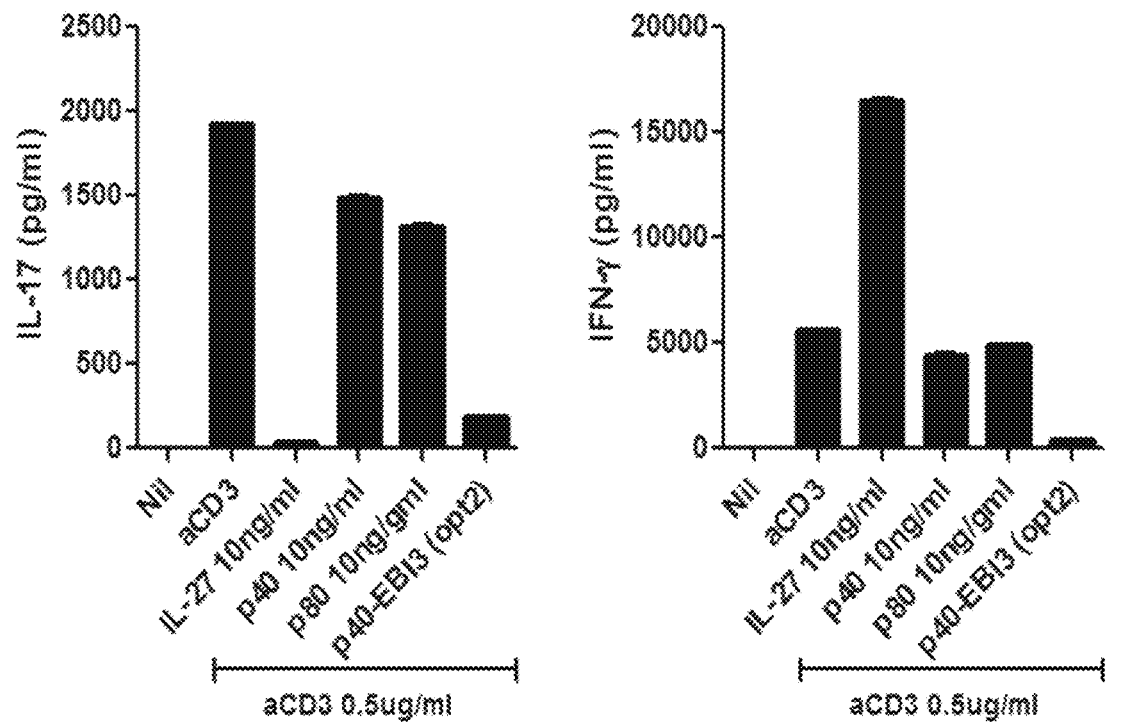
FIG. 28 is a graph showing the inhibitory effect of inflammatory cytokines by the p40 subunit-EBI3 subunit/Fc fragment complex (opt2) in an embodiment of the present invention.
Figure 29:
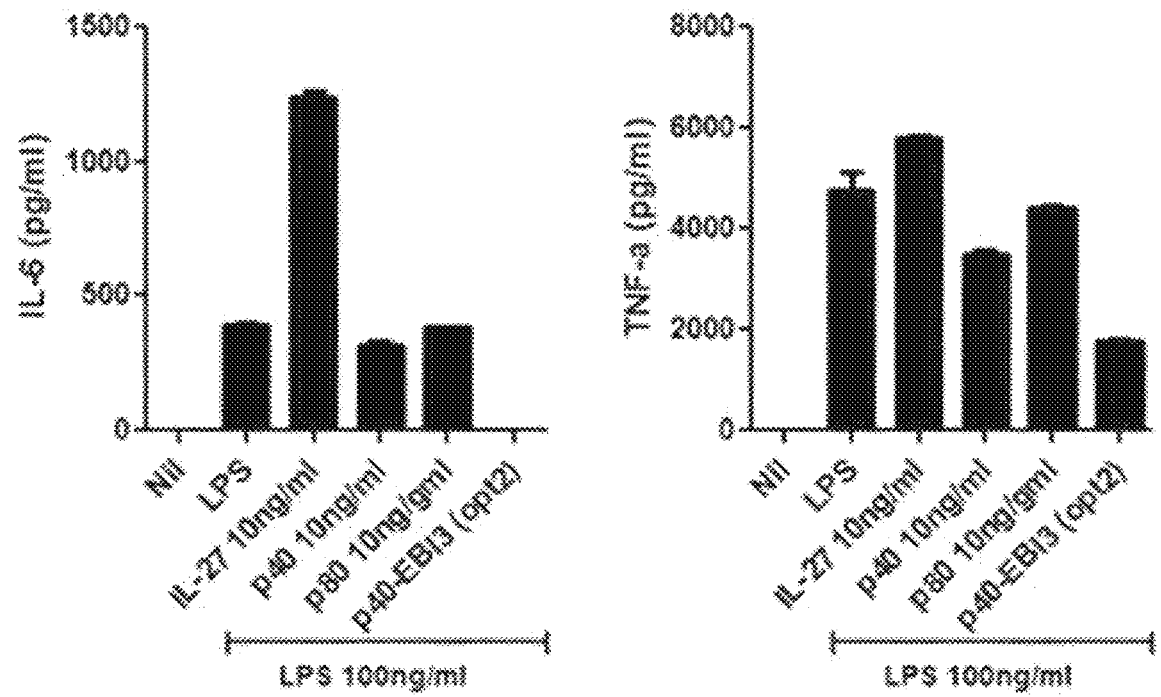
FIG. 29 is a graph showing the inhibitory effect of inflammatory cytokines by the p40 subunit-EBI3 subunit/Fc fragment complex (opt2) in an embodiment of the present invention.

FIG. 28 shows the inhibitory effect of p40-EBI3-FC complex protein on IL-17 and IFN-γ in CD4 T cells. FIG. 29 shows the inhibitory effect of p40-EBI3-FC complex protein on IL-6 and TNF-α in non-T cells. The experiment was performed by stimulating anti-CD3 0.5 g/ml in CD4 T cells under the condition of immune response activity. The result indicates that the group treated with p40-EBI3-FC protein had a decrease in IL-17 and IFN-γ compared to anti-CD3 alone and showed their effects compared to a control. In the same way, the experiment was performed by stimulating LPS under the condition of immune response activation in non-T cells. The results show that they had an inhibitory effect on IL-6 and TNF-α compared to LPS alone.

Inhibition of Inflammatory Cytokines in Splenocytes

Figure 30:
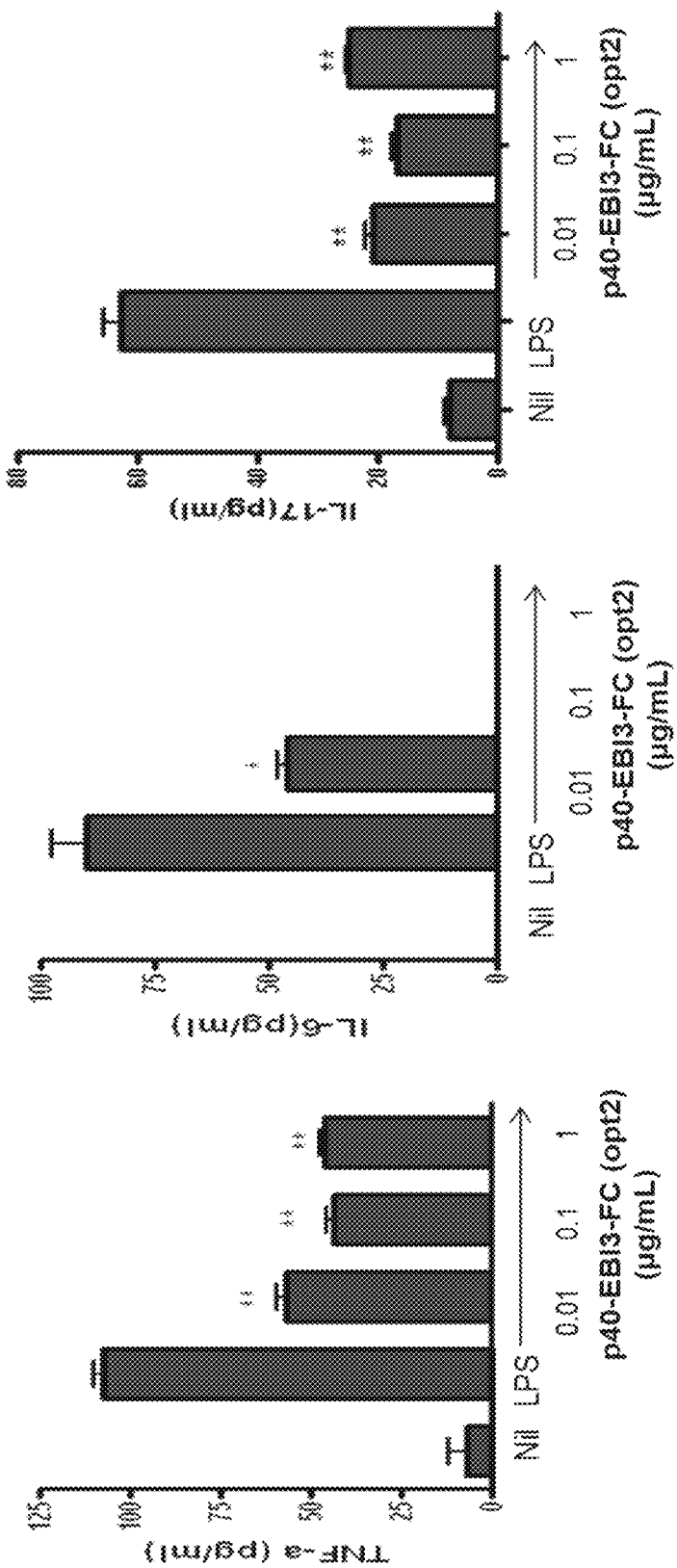
FIG. 30 is a graph showing the inhibitory effect of inflammatory cytokines by the p40 subunit-EBI3 subunit/Fc fragment complex (opt2) in an embodiment of the present invention.

After separating the cells from the spleen of DBA1/J normal mice, the cells were treated with LPS at a concentration of 100 ng/ml. At this time, they were treated with the p40-EBI3-FC complex protein prepared as in Preparation Example 3 at a concentration of 0.01 μg/ml, 0.1 μg/ml, and 1 μg/ml. Thus, the inhibitory effect on inflammatory cytokines expressed by LPS was observed. As shown in FIG. 30, the p40-EBI3-FC complex protein suppressed the expression of inflammatory cytokines in a concentration-dependent manner, and particularly, remarkably suppressed the expression of IL-6 and IL-17 inflammatory cytokines.

Example 6: Regulation of Th17-Treg Cell Activity by p40-EBI3-FC Complex (opt2) Protein In order to evaluate the efficacy of p40-EBI3-FC on regulatory T cell differentiation, the cells were treated with p40-EBI3-FC at a concentration of 1 μg/ml under conditions of differentiating into each T helper cell (Table 1).

Then, it was observed whether the differentiation of each T helper was inhibited and at the same time, the expression of regulatory T cells expressing Foxp3 was increased.

Figure 31:
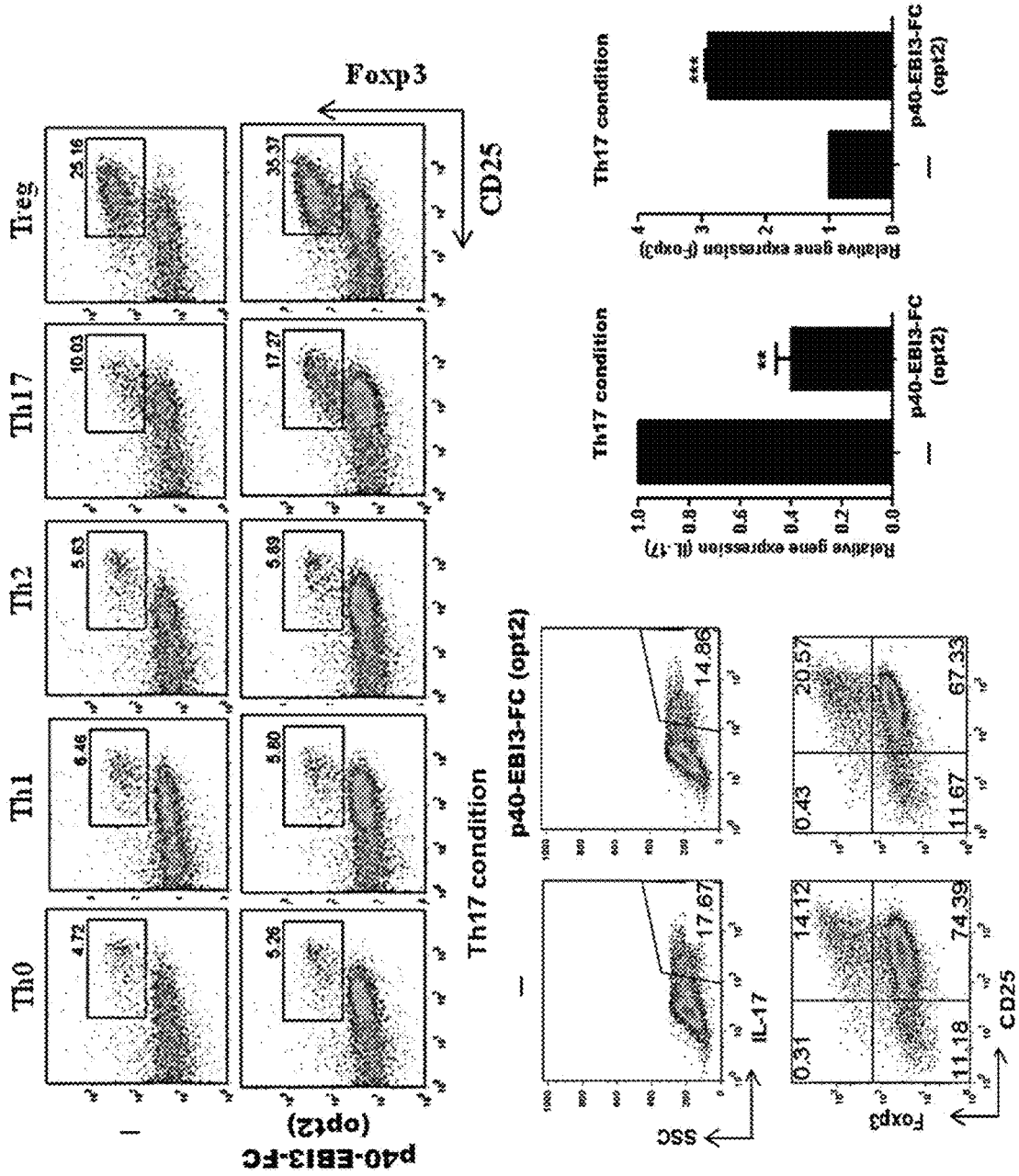
FIG. 31 shows the active effect on the differentiation of regulatory T cells by the p40 subunit-EBI3 subunit/Fc fragment complex (opt2) in an embodiment of the present invention.

As shown in FIG. 31, the p40-EBI3-FC complex protein significantly increased Foxp3-expressing cells under Treg differentiation conditions, and particularly, increased the expression of Foxp3-expressing cells under Th17 cell differentiation conditions. These results suggest that the p40-EBI3-FC complex protein inhibits the differentiation of the pathogen cells and may differentiate into cells expressing Foxp3 in an environment in which pathogenic cells are differentiated.

In addition, it was confirmed that in the cells treated with the p40-EBI3-FC complex protein under Th17 cell differentiation conditions, the number of IL-17-producing cells was significantly decreased, and rather, the differentiation into Treg was promoted. Therefore, the p40-EBI3-FC complex protein may function to decrease pathogenic cells and increase immunoregulatory cells.

Figure 32:
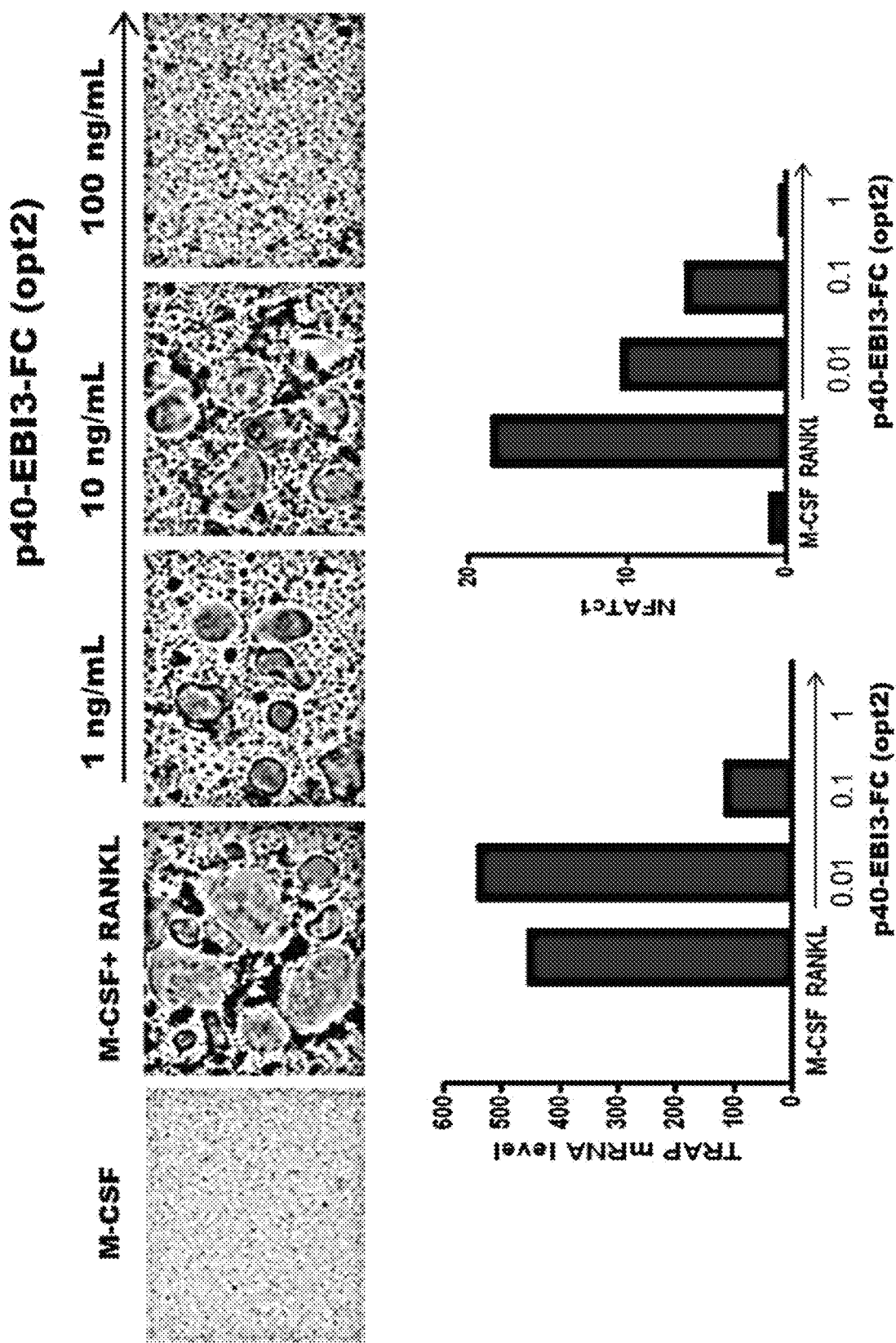
FIG. 32 shows the effect on the regulation of the osteoclast differentiation inhibition by the p40 subunit-EBI3 subunit/Fc fragment complex (opt2) in an embodiment of the present invention.

Example 7: Regulation of Osteoclast Differentiation by p40-EBI3-FC Complex (opt2) Protein The osteoclasts differentiation in autoimmune diseases such as autoimmune arthritis is a process of pathogenesis. Thus, it was evaluated whether the p40-EBI3-FC complex protein has the inhibitory effect on the osteoclasts differentiation. Bone marrow was isolated from an autoimmune arthritis animal model, and then osteoclasts were induced. At this time, they were treated with the p40-EBI3-FC complex protein to confirm the degree of osteoclasts differentiation. As shown in FIG. 32, the differentiation of osteoclasts was suppressed in a concentration-dependent manner of the p40-EBI3-FC complex protein, and the differentiation of osteoclasts was significantly suppressed at a concentration of 100 ng/ml. These results confirm that the p40-EBI3-FC complex protein may regulate not only the expression of inflammatory cytokines but also the pathogenesis of osteoclast differentiation in an autoimmune arthritis animal model. Further, the genes of the osteoclast differentiation marker TRAP and the active transcription factor NFATc1 were also significantly suppressed in a concentration-dependent manner of the p40-EBI3-FC complex protein (FIG. 32).

Example 8: Regulation of Autoimmune Arthritis by p40-EBI3-FC Complex (opt2) Protein Inhibition of Autoimmune Arthritis by p40-EBI3-FC Complex Protein In order to evaluate the in vivo efficacy of the p40-EBI3-FC complex protein, the p40-EBI3-FC complex protein was injected during arthritis induction. As shown in FIG. 33, the

TABLE 1

| Mouse T helper cell differentiation condition |
|---|
| Mouse effector T cell polarizing condition |

| | |
|---|---|
| Th0 | anti-CD3 0.5 μg/ml + anti-CD28 1 μg/ml |
| Th1 | anti-CD3 0.5 μg/ml + anti-CD28 1 μg/ml + anti-IL-4 2 μg/ml + rIL-12 10 ng/ml |
| Th2 | anti-CD3 0.5 μg/ml + anti-CD28 1 μg/ml + anti-IFN-γ 2 μg/ml + rIL-4 10 ng/ml |
| Th17 | anti-CD3 0.5 μg/ml + anti-CD28 1 μg/ml + anti-IFN-γ 2 μg/ml + anti-IL-4 μg/ml * rTGF-β 2 ng/ml + rIL-6 20 ng/ml |
| Treg | anti-CD3 0.5 μg/ml + anti-CD28 1 μg/ml + anti-IFN-γ 2 μg/ml + anti-IL-4 2 μg/ml * TGF-β 5 ng/ml | results indicate that the p40-EBI3-FC complex protein exhibited an arthritis inhibitory effect, which was a result showing that the p40-EBI3-FC complex protein may act effectively in vivo. It was confirmed that the incidence of disease was also significantly suppressed.

Inhibition of Autoantibodies by p40-EBI3-FC Complex Protein

Figure 34:
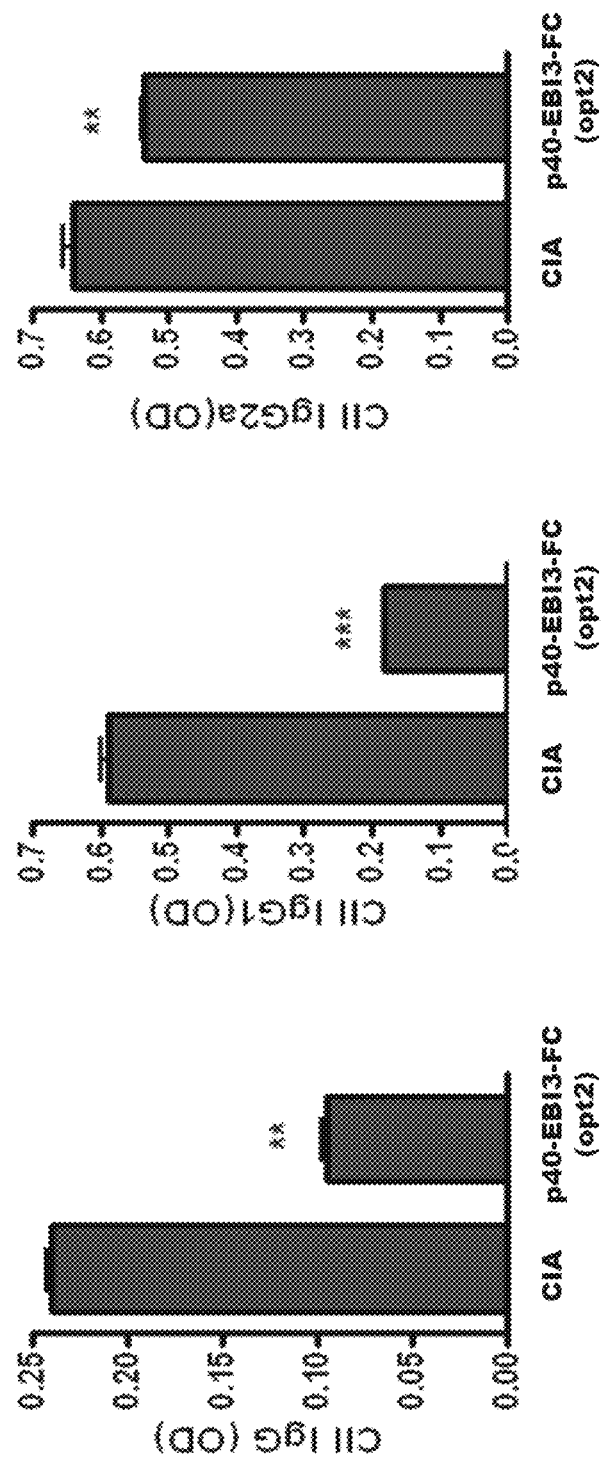
FIG. 34 is a graph showing the type II collagen specific autoantibody inhibitory ability of p40 subunit-EBI3 subunit/Fc fragment complex (opt2) in an embodiment of the present invention.

In order to evaluate whether the p40-EBI3-FC complex protein inhibits the production of autoantibodies expressed in B cells, serum was separated from mice injected with the p40-EBI3-FC complex protein, and the expression of type II collagen (CII) was measured using the ELISA method. As shown in FIG. 34, it was confirmed that the p40-EBI3-FC complex protein remarkably inhibited the expression of antigen-specific IgG.

Inhibition of T Cell Proliferation by p40-EB13-FC Complex Protein

Figure 35:
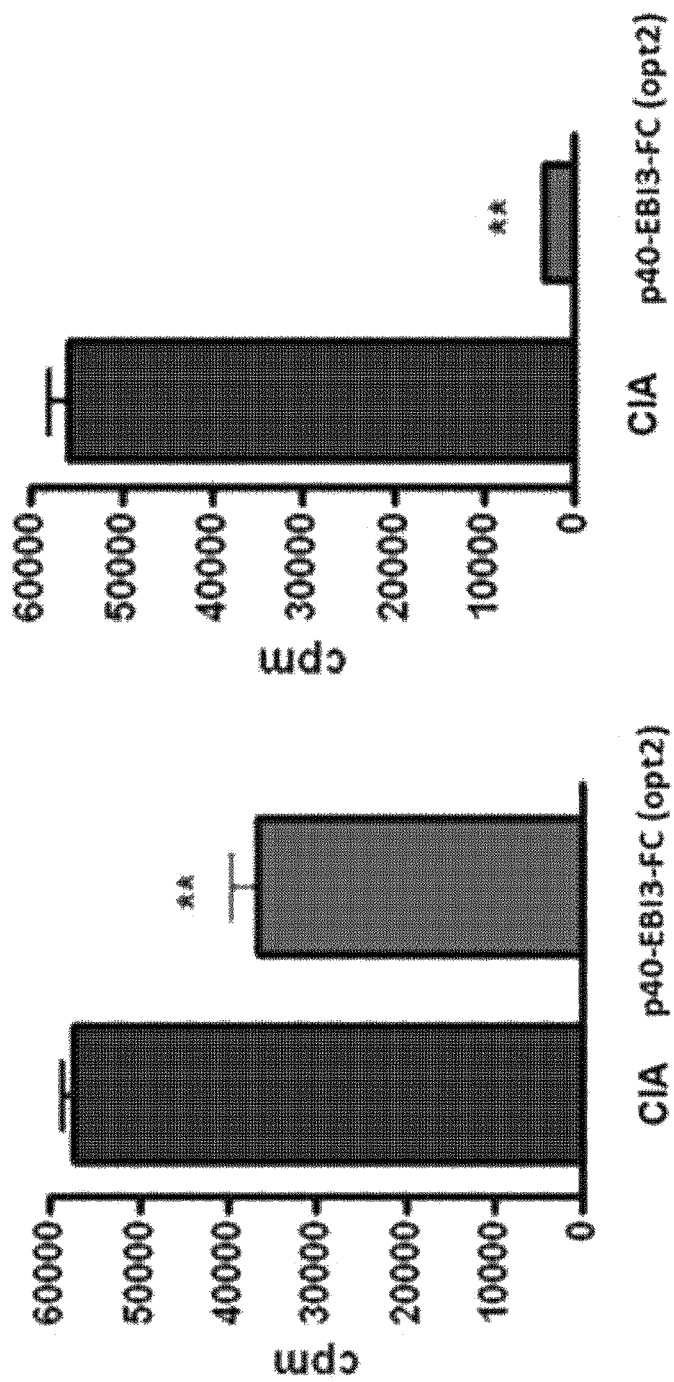
FIG. 35 is a graph showing the ability of the p40 subunit-EBI3 subunit/Fc fragment complex (opt2) to inhibit the proliferation of T cells in an embodiment of the present invention.

In order to analyze the effect on T cell activity, cells were separated from the spleen of autoimmune arthritis mice injected with p40-EBI3-FC complex protein, and the separated cells were stimulated with anti-CD3 for three days, and then were treated with 3H-thymidine isotope. Then, the degree of proliferation activity was evaluated. As shown in FIG. 35, it was confirmed that the p40-EBI3-FC complex protein inhibited the proliferative differentiation of T cells.

Effect on Degree of Joint Destruction by p40-EB13-FC Complex Protein

Figure 36:
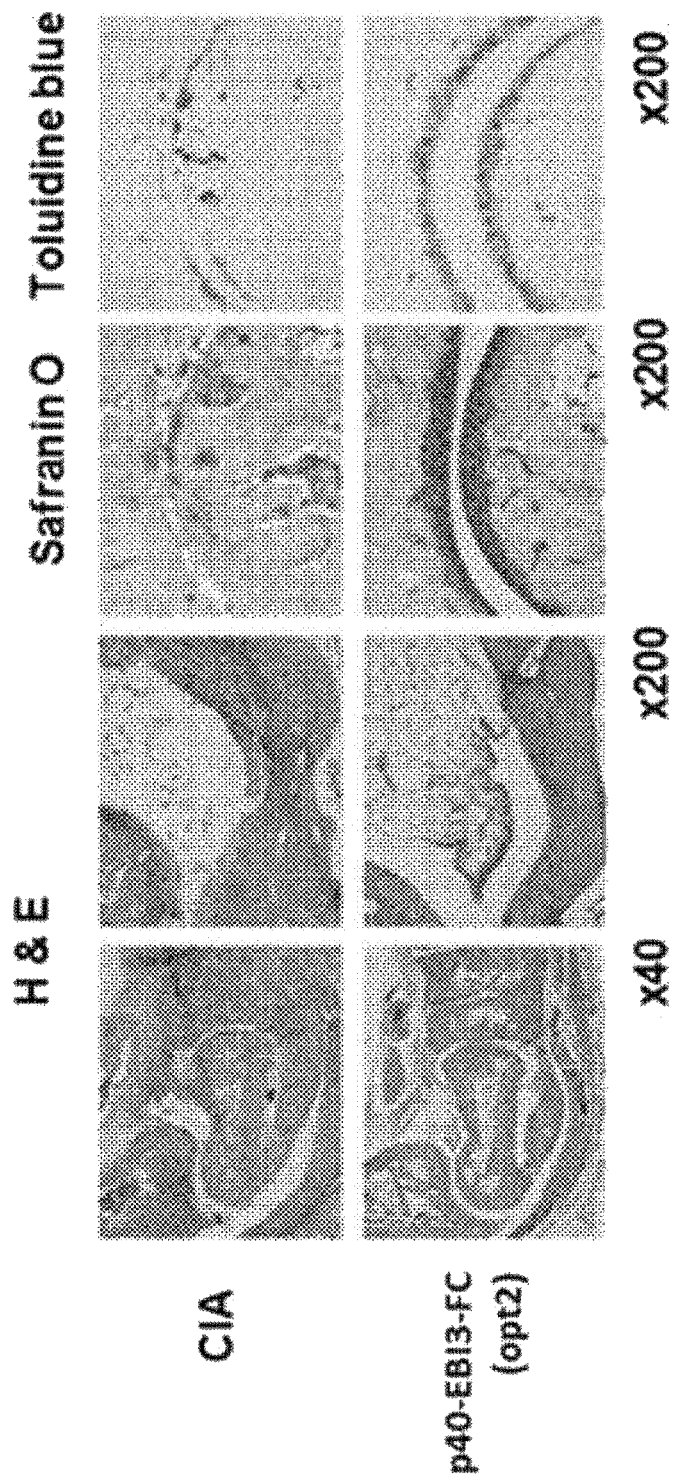
FIG. 36 is an image of a joint staining result showing the effect of the p40 subunit-EBI3 subunit/Fc fragment complex (opt2) on the degree of joint destruction in an embodiment of the present invention.

In order to analyze the degree of arthritis improvement according to the p40-EBI3-FC complex protein treatment, the p40-EBI3-FC complex protein was injected into an arthritis mouse animal model, and then the degree of joint damage was examined through histological technique. The hind paws of each mouse were fixed in 10% formalin and decalcified from the bone. Then, a block was made with paraffin. A joint segment (7 μm) was obtained from this. The joint segment was stained with hematoxylin and eosin (H&E). Further, toluidine blue and safranin O staining were performed to confirm the degree of cartilage destruction. In order to confirm the degree of osteoclasts differentiation, the main cause of bone destruction, TRAP staining was also performed. As shown in FIG. 36, the results indicate that bone destruction, cartilage damage, and osteoclast differentiation were significantly reduced in the mice injected with the p40-EBI3-FC complex protein so that p40-EBI3-FC complex protein may reduce joint destruction.

Figure 37:
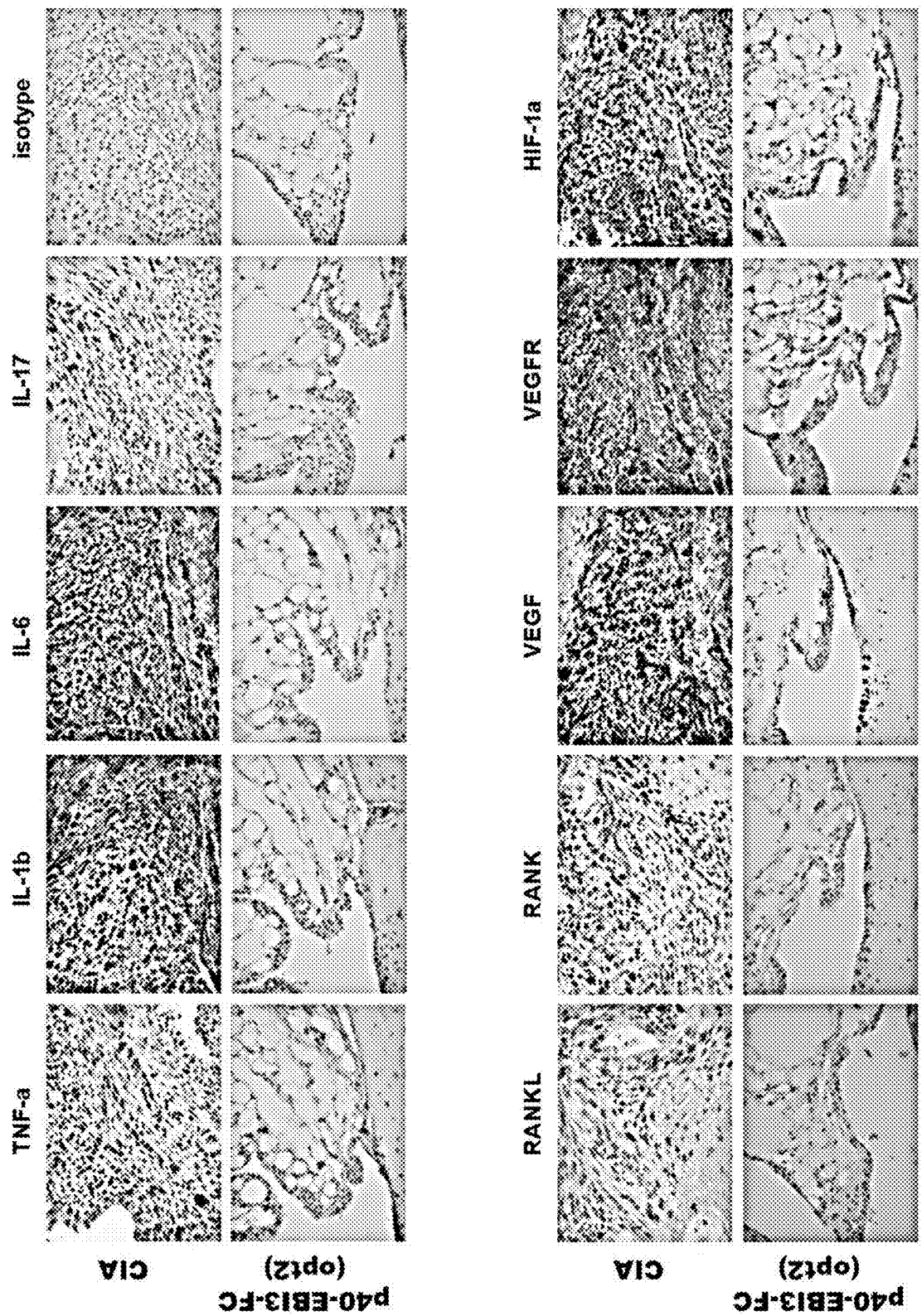
FIG. 37 is an IHC result image showing the effect of the p40 subunit-EBI3 subunit/Fc fragment complex (opt2) on the expression of inflammatory cytokines, joint destruction factors, and angiogenesis factors in an embodiment of the present invention.

Effect on Expression of Inflammatory Cytokine, Joint Destruction Factor And Angiogenesis Factor by p40-EBI3-FC Complex Protein In order to confirm the effect of the p40-EBI3-FC complex protein on the expression of inflammatory cytokines, joint destruction factors, and angiogenesis factors, the expression of inflammatory cytokines, joint destruction factors, and angiogenesis factors in the joints of the arthritis mouse animal model injected with the p40-EBI3-FC complex protein was confirmed by IHC. As shown in FIG. 37, the result indicates that all of the control groups were overexpressed, but the mice inserted with the p40-EBI3-FC complex protein had no expression. Therefore, it was confirmed that the p40-EBI3-FC complex protein inhibits the expression of factors that play a critical role in joint destruction and arthritis induction to inhibit the promotion and activity of arthritis.

Figure 38:
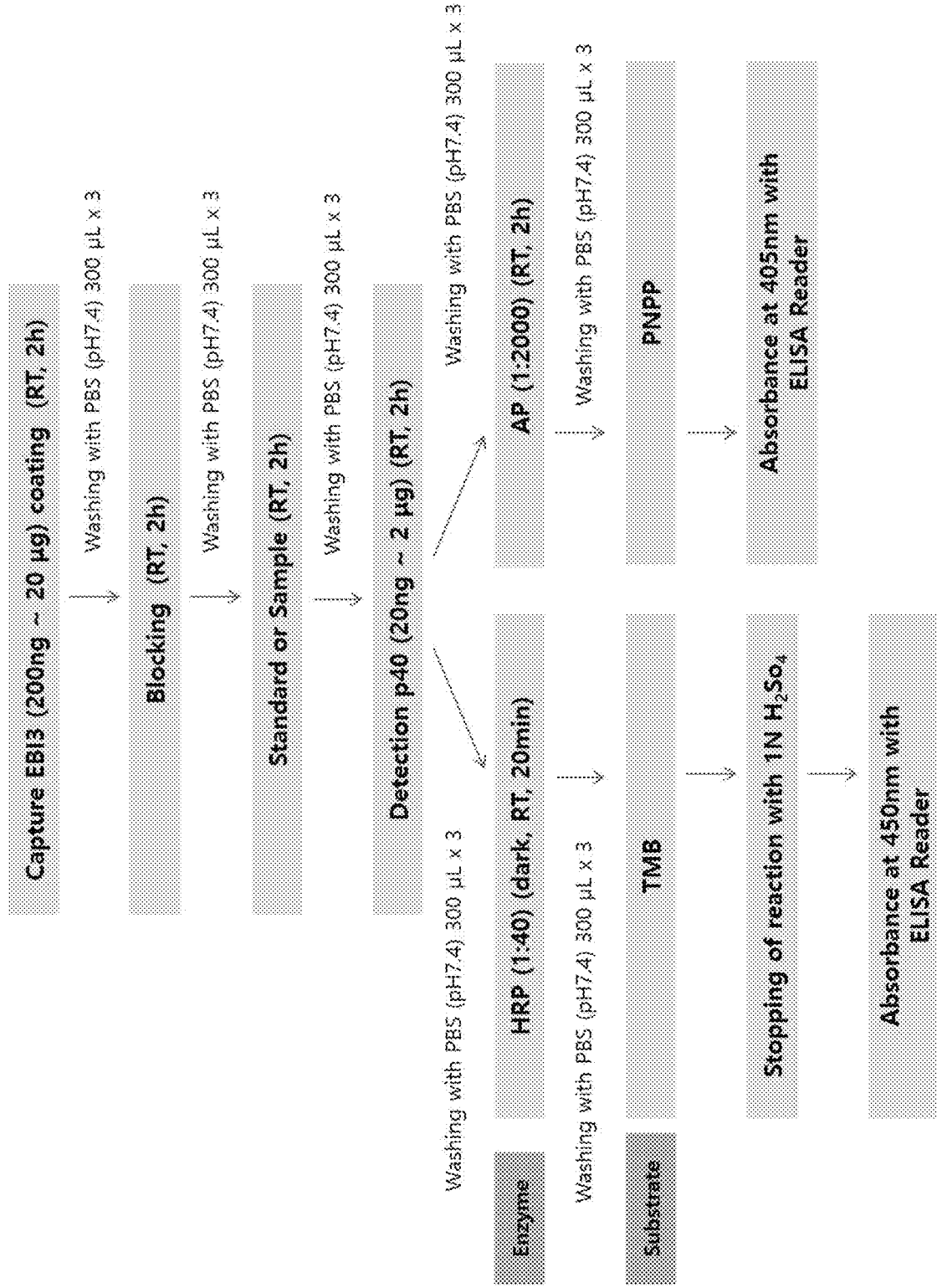
FIG. 38 a diagram showing the Sandwich ELISA analysis process performed to confirm whether the mouse p40-EBI3-FC complex protein may be used as a standard material for the mouse p40-EBI3-FC complex ELISA kit.
Figure 39:
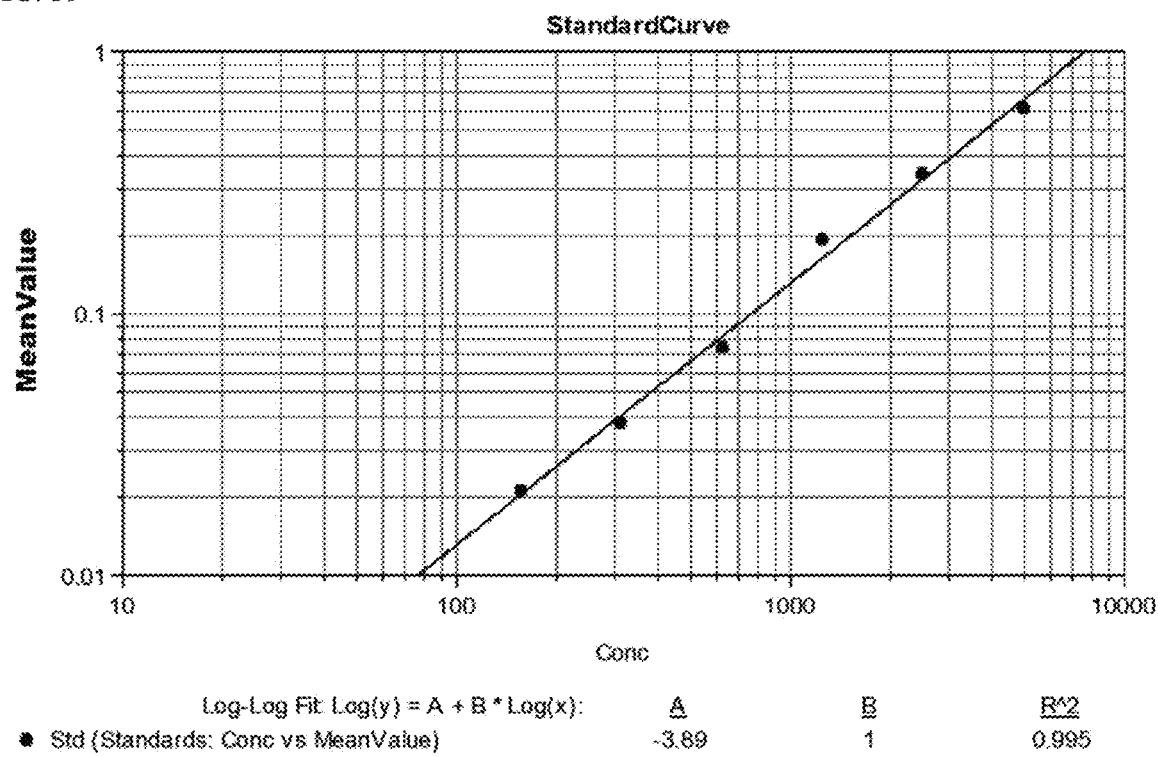
FIG. 39 is a diagram confirming whether the mouse p40-EBI3-FC complex protein may be used as a standard material for the mouse p40-EBI3-FC complex ELISA kit by the Sandwich ELISA analysis method.

Example 9: Establishment of Quantification System of Mouse p40-EB13 Complex Protein In order to establish an ELISA system capable of quantifying the mouse p40-EBI3 complex, the Sandwich ELISA method was performed in the same manner as in FIG. 38 to confirm whether the mouse p40-EBI3-FC complex protein prepared in Preparation Example 3 can be used as a standard material for the mouse p40-EBI3-FC complex ELISA kit. At this time, the EBI3 antibody was used as the capture antibody and the p40 antibody was used as the detection antibody. Specifically, capture EBI3 AB (200 ng to 20 ug) was dissolved in a coating buffer, and 50 ul was added to a 96-well plate and reacted at room temperature for 2 hours. Then, they were washed with 300 μl of the washing buffer three times. 200 μl of the blocking buffer was added and reacted at room temperature for 2 hours. Then, they were washed with 300 μl of the washing buffer three times. p40-EBI3-FC complex protein was added as standard material, and 50 μl of the sample was added and reacted at room temperature for 2 hours. Then, they were washed with 300 μl of the washing buffer three times. Detection p40 AB (20 ng to 2 ug) was added and reacted at room temperature for 2 hours. Then, they were washed with 300 μl of the washing buffer three times. 50 ul each obtained by diluting AP (alkaline phosphatase) at a ratio of 1:2000 was added and reacted at room temperature for 2 hours or 50 ul each obtained by diluting HRP (horseradish peroxidase) at a ratio of 1:40 was added and reacted at room temperature for 20 minutes with blocking light. Then, they were washed with 300 μl of the washing buffer three times. In the case of using AP, 50 ul of PNPP buffer in DEA was added for color development. In the case of using HRP, 50 ul of TMB was added to check the color development, and then 50 ul of stop solution was added to stop the reaction. Thereafter, the absorbance was measured at 405 nm when using AP and at 450 nm when using HRP. As a result of conducting the experiment by diluting 5 ng/ml of the standard material by 1/2 to the start point as described above, it was confirmed that since the $R^{\wedge 2}$ value was 0.995 close to 1 (FIG. 39), the p40-EBI3-FC complex protein prepared in the present invention may be a standard material capable of quantifying the p40-EBI3 complex.

Preparation Example 4: Preparation of Human p40-EBI3 Complex

In order to prepare the optimal human p40-EBI3 complex form, the complex of the p40-Linker (3xGGGGS)-EBI3 form was optimized in GenScript. The obtained cDNA was cut with HindIII and XbaI, and then ligated with the expression vector p3xFLAG-CMV-10, which was cut with the same enzyme site. Then, they were transformed to obtain colonies, and clones were selected. From the selected clones, DNA obtained by separating the vector was sequenced to obtain a final clone. The clone with the DNA sequence confirmed was transduced into Hek293 cells. Three days later, the protein was extracted from the cell. Western blot was performed on this protein to select the final clone whose expression was confirmed.

An overexpression vector was prepared in Hek293 cells, and transfection was performed. The supernatant was collected two days after the medium was changed the day after transfection. When overexpression was confirmed by performing ELISA with the supernatant, a significantly higher p40-EBI3 complex was confirmed (FIG. 41). The nucleotide sequence encoding the prepared human p40-EBI3 complex included the nucleotide sequences represented by SEQ ID NOs: 10 and 11, and its amino acid sequence included the sequence represented by SEQ ID NO: 12 (FIGS. 6A to 6C).

Example 10: Establishment of Quantification System of Human p40-EBI3 Complex Protein In order to establish an ELISA system capable of quantifying the human p40-EBI3 complex, the Sandwich ELISA method was performed in the same manner as in FIG. 38 to confirm whether the human p40-EBI3-FC complex protein prepared in Preparation Example 4 can be used as a standard material for the human p40-EBI3-FC complex ELISA kit. At this time, the EBI3 antibody was used as the capture antibody, and the p40 antibody was used as the detection antibody. Specifically, capture EBI3 AB (200 ng to 20 ug) was dissolved in a coating buffer, and 50 ul was added to a 96-well plate and reacted at room temperature for 2 hours. Then, they were washed with 300 μl of the washing buffer three times. 200 μl of the blocking buffer was added and reacted at room temperature for 2 hours. Then, they were washed with 300 μl of the washing buffer three times. p40-EBI3-FC complex protein was added as standard material, and 50 μl of the sample was added and reacted at room temperature for 2 hours. Then, they were washed with 300 μl of the washing buffer three times. Detection p40 AB (20 ng to 2 ug) was added and reacted at room temperature for 2 hours. Then, they were washed with 300 μl of the washing buffer three times. 50 ul each obtained by diluting AP (alkaline phosphatase) at a ratio of 1:2000 was added and reacted at room temperature for 2 hours or 50 ul each obtained by diluting HRP (horseradish peroxidase) at a ratio of 1:40 was added and reacted at room temperature for 20 minutes with blocking light. Then, they were washed with 300 μl of the washing buffer three times. In the case of using AP, 50 ul of PNPP buffer in DEA was added for color development. In the case of using HRP, 50 ul of TMB was added to check the color development, and then 50 ul of stop solution was added to stop the reaction. Thereafter, the absorbance was measured at 405 nm when using AP and at 450 nm when using HRP.

Hereinabove, preferred embodiments of the present invention are described mainly. It will be understood by those skilled in the art that the present invention may be implemented in a modified form without departing from the essential characteristics of the present invention. Therefore, the disclosed examples should be considered in descriptive sense only and not for purposes of limitation. The scope of the present invention is defined not by the detailed description, but by the appended claims, and all differences within the scope equivalent thereto should be construed as being included in the present invention.

The invention claimed is:

1. A complex formed by linking p40 subunit and EBI3 subunit by a linker, wherein the complex includes an amino acid sequence selected from the group consisting of amino acid sequences represented by SEQ ID NOs: 2, 4, 6 and 12.

2. A complex formed by linking p40 subunit and EBI3 subunit by a linker, wherein the complex is encoded by a polynucleotide sequence selected from the group consisting of polynucleotide sequences represented by SEQ ID NOs: 1, 3, 5, 10 and 11.

3. The complex of claim 1, wherein the complex further includes an immunoglobulin moiety.

4. The complex of claim 3, wherein the immunoglobulin moiety is an Fc fragment.

5. The complex of claim 3, wherein the immunoglobulin moiety is linked to the EBI3 subunit.

6. The complex of claim 3, wherein the complex includes an amino acid sequence represented by SEQ ID NO: 9.

7. The complex of claim 3, wherein the complex is encoded by a polynucleotide sequence represented by SEQ ID NO: 7 or 8.

8. A polynucleotide comprising a gene sequence selected from the group consisting of SEQ ID NOs: 1, 3, 5, 7, 8, 10 and 11.

9. A vector comprising the polynucleotide of claim 8.

10. A host cell comprising the vector of claim 9.

11. A pharmaceutical composition for prevention or treatment of an immune disease, the composition comprising the complex of claim 1.

12. The composition of claim 11, wherein the immune disease is selected from the group consisting of rheumatoid arthritis, ankylosing spondylitis, experimental autoimmune encephalomyelitis, post transplantation late and chronic solid organ rejection, skin sclerosis, psoriasis, Sjogren's syndrome, inflammatory bowel disease and graft-versus-host disease.

13. A pharmaceutical composition for prevention or treatment of an immune disease, the composition comprising the vector of claim 9.

14. The composition of claim 13, wherein the immune disease is selected from the group consisting of rheumatoid arthritis, ankylosing spondylitis, experimental autoimmune encephalomyelitis, post transplantation late and chronic solid organ rejection, skin sclerosis, psoriasis, Sjogren's syndrome, inflammatory bowel disease and graft-versus-host disease.

15. A standard protein complex for quantitative analysis of p40 subunit and EBI3 subunit complex comprising the complex of claim 1.

16. A kit for detecting p40 subunit and EBI3 subunit complex, the kit comprising an agent for measuring the complex of claim 1 at a protein level.

17. The kit of claim 16, wherein the agent measured at the protein level is selected from the group consisting of an antibody, antibody fragment, aptamer, avidity multimer, and peptidomimetics, that specifically recognizes full length or fragment of the protein of the p40-EBI3.

18. The kit of claim 16, wherein the measurement is performed by a method selected from the group consisting of Western blot, enzyme linked immunosorbent assay (ELISA), sandwich enzyme linked immunosorbent assay (Sandwich ELISA), radioimmunoassay (RIA), radioimmunodiffusion, immunoelectrophoresis, tissue immunostaining, immunoprecipitation assay, complement fixation assay, FACS, mass spectrometry and protein microarray.

19. A kit for quantifying p40 subunit and EBI3 subunit complex comprising the complex of claim 1 as a standard protein complex.

20. A method for treating an immune disease, the method comprising administering the pharmaceutical composition of claim 11 to an individual in a pharmaceutically effective amount.

21. A method for treating an immune disease, the method comprising administering the pharmaceutical composition of claim 13 to an individual in a pharmaceutically effective amount.

* * * * *